(12) United States Patent
Kilar et al.

(10) Patent No.: US 9,596,514 B2
(45) Date of Patent: *Mar. 14, 2017

(54) METHOD AND APPARATUS FOR PROVIDING USER CONTROL OF ADVERTISING BREAKS ASSOCIATED WITH A MEDIA PROGRAM

(71) Applicant: Hulu, LLC, Santa Monica, CA (US)

(72) Inventors: Jason A. Kilar, Santa Monica, CA (US); Jean-Paul Colaco, Manhattan Beach, CA (US); Richard W. Tom, Marina Del Rey, CA (US); Jessica Page Ivy, Venice, CA (US)

(73) Assignee: HULU, LLC, Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/463,303

(22) Filed: Aug. 19, 2014

(65) Prior Publication Data

US 2014/0359667 A1 Dec. 4, 2014

Related U.S. Application Data

(63) Continuation of application No. 13/246,645, filed on Sep. 27, 2011, now Pat. No. 8,850,471.

(Continued)

(51) Int. Cl.
| | |
|---|---|
| *H04N 5/445* | (2011.01) |
| *H04N 21/472* | (2011.01) |
| *G06Q 30/02* | (2012.01) |
| *H04N 7/16* | (2011.01) |
| *H04N 7/173* | (2011.01) |
| *H04N 21/234* | (2011.01) |
| *H04N 21/2343* | (2011.01) |
| *H04N 21/258* | (2011.01) |
| *H04N 21/475* | (2011.01) |
| *H04N 21/658* | (2011.01) |

(Continued)

(52) U.S. Cl.
CPC ....... *H04N 21/47217* (2013.01); *G06Q 30/02* (2013.01); *H04N 7/163* (2013.01); *H04N 7/17318* (2013.01); *H04N 21/23424* (2013.01); *H04N 21/23439* (2013.01); *H04N 21/25891* (2013.01); *H04N 21/26208* (2013.01); *H04N 21/4755* (2013.01); *H04N 21/6582* (2013.01); *H04N 21/812* (2013.01)

(58) Field of Classification Search
CPC .................... H04N 21/458; H04N 21/4622
USPC .................... 725/32, 34, 37, 88, 89
See application file for complete search history.

(56) References Cited

U.S. PATENT DOCUMENTS

| | | |
|---|---|---|
| 2002/0184047 A1 | 12/2002 | Plotnick et al. |
| 2003/0063130 A1 | 4/2003 | Barbieri et al. |

(Continued)

OTHER PUBLICATIONS

International Search Report and Written Opinion from International Application No. PCT/US2011/053508 mailed Feb. 17, 2012.

*Primary Examiner* — Jivka Rabovianski
(74) *Attorney, Agent, or Firm* — Fountainhead Law Group P.C.

(57) ABSTRACT

A method, apparatus, article of manufacture, and a memory structure for presenting an advertisement for playback in conjunction with a streamed media program are described. The method permits the user to control advertising breaks and in particular, the timing of advertising breaks associated with the media program.

21 Claims, 50 Drawing Sheets

Related U.S. Application Data

(60) Provisional application No. 61/386,913, filed on Sep. 27, 2010.

(51) Int. Cl.
   *H04N 21/81* (2011.01)
   *H04N 21/262* (2011.01)

(56) References Cited

U.S. PATENT DOCUMENTS

| | | |
|---|---|---|
| 2003/0149618 A1 | 8/2003 | Sender et al. |
| 2005/0149968 A1 | 7/2005 | Konig et al. |
| 2010/0057576 A1 | 3/2010 | Brodersen et al. |
| 2011/0145856 A1* | 6/2011 | Agarwal et al. ............... 725/32 |
| 2012/0110616 A1 | 5/2012 | Kilar et al. |

* cited by examiner

FIG. 3G

Master Playlist

338

```
#EXTM3U
#EXT-X-VERSION:2
#EXT-X-TARGETDURATION:14
#EXT-X-MEDIA-SEQUENCE:0
#EXT-X-ALLOW-CACHE:NO
#EXTINF:4,
http://assets.huluim.com/prerolls/np/abc-preroll-480k_1000/segment0.ts
#EXT-X-DISCONTINUITY
#EXTINF:10,
http://ads.hulu.com/published_staging/IO105288/Office_Race_30_KROR9303_Hulu_Mezz_30fps_Stagi561041_samourai.tar/segment0.ts
#EXTINF:11,
http://ads.hulu.com/published_staging/IO105288/Office Race 30_KROR9303 Hulu Mezz 30fps Stagi561041 samourai.tar/segment1.ts
#EXTINF:10,
http://ads.hulu.com/published_staging/IO105288/Office_Race_30_KROR9303_Hulu_Mezz_30fps_Stagi561041_samourai.tar/segment2.ts
#EXT-X-DISCONTINUITY
#EXT-X-KEY:METHOD=AES-128,URI="https://hulus-a.akamaihd.net/hulu12/11/50000011/agave50000011_586724_samourai.tar/
agave50000011_586724_samourai.key?v=0&authToken=1275...F449
#EXTINF:10,
https://hulus-a.akamaihd.net/hulu12/11/50000011/agave50000011_586724_samourai.tar/segment0.ts?authToken=1275...a744c
#EXTINF:10,
https://hulus-a.akamaihd.net/hulu12/11/50000011/agave50000011_586724_samourai.tar/segment1.ts?authToken=1275...7ea20
#EXTINF:11,
https://hulus-a.akamaihd.net/hulu12/11/50000011/agave50000011_586724_samourai.tar/segment2.ts?authToken=1279...2e
```

340
342A
346A
346B
346C
342B
350
348A
348B
348C

PID  filename  token

Segment Playlist

FIG. 3H

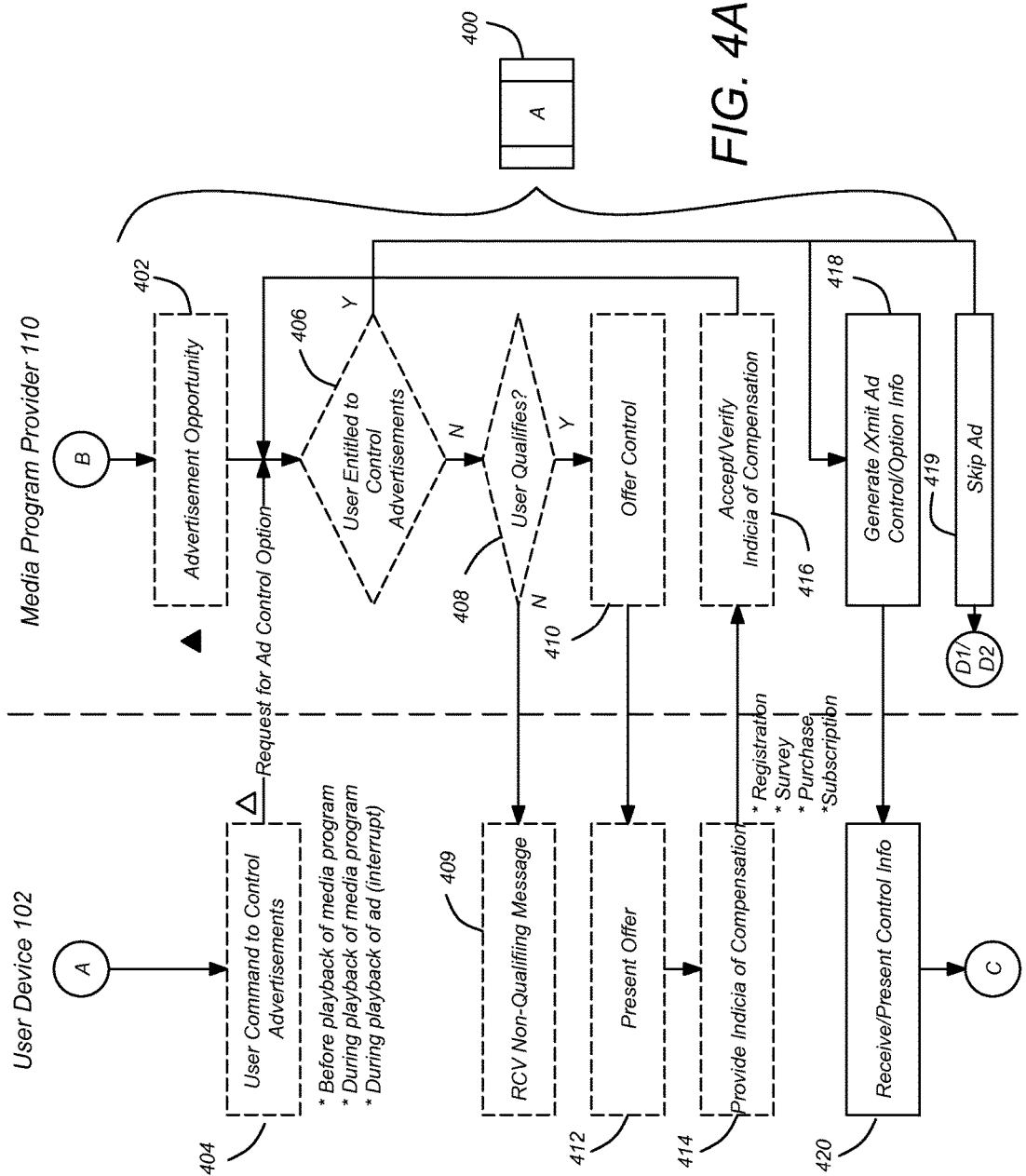

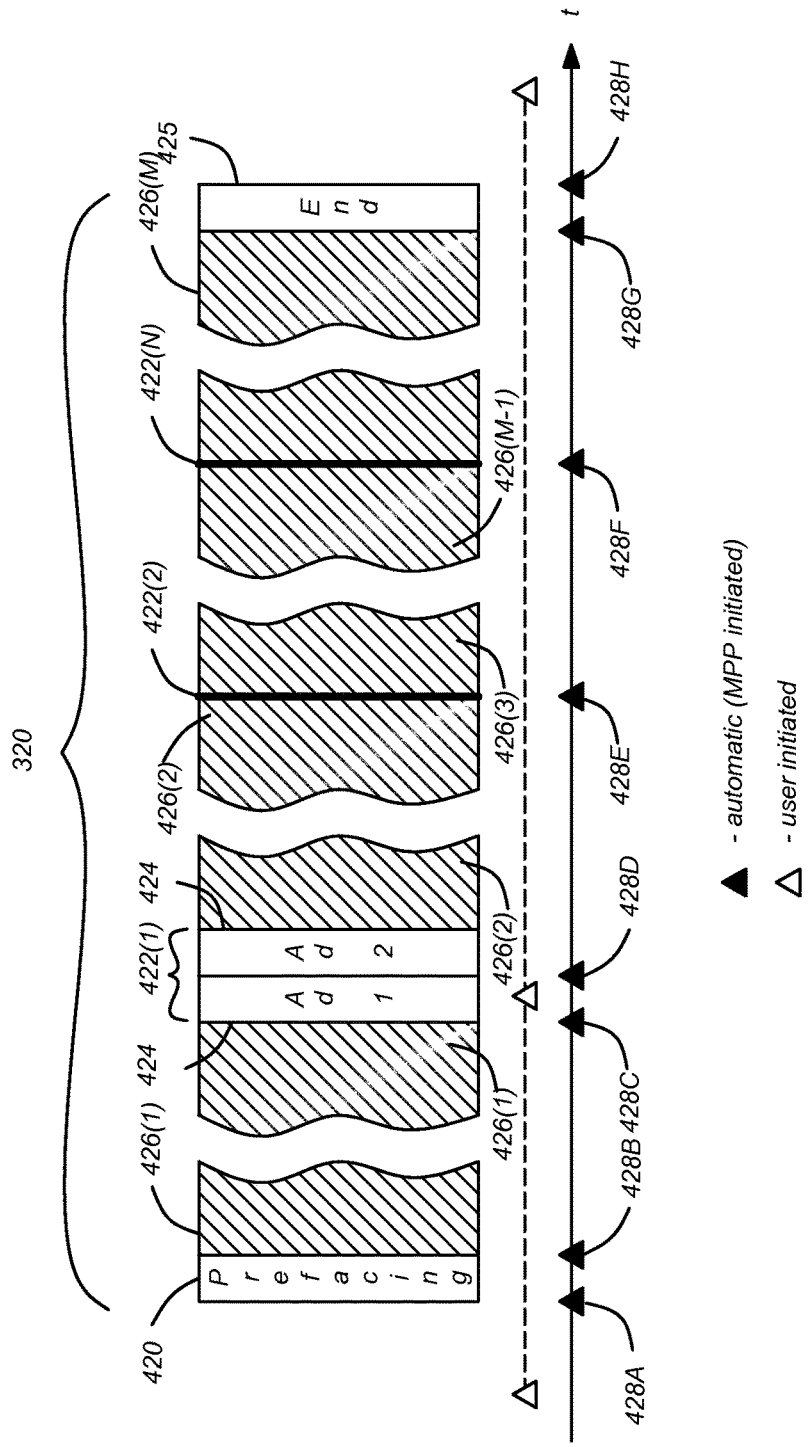

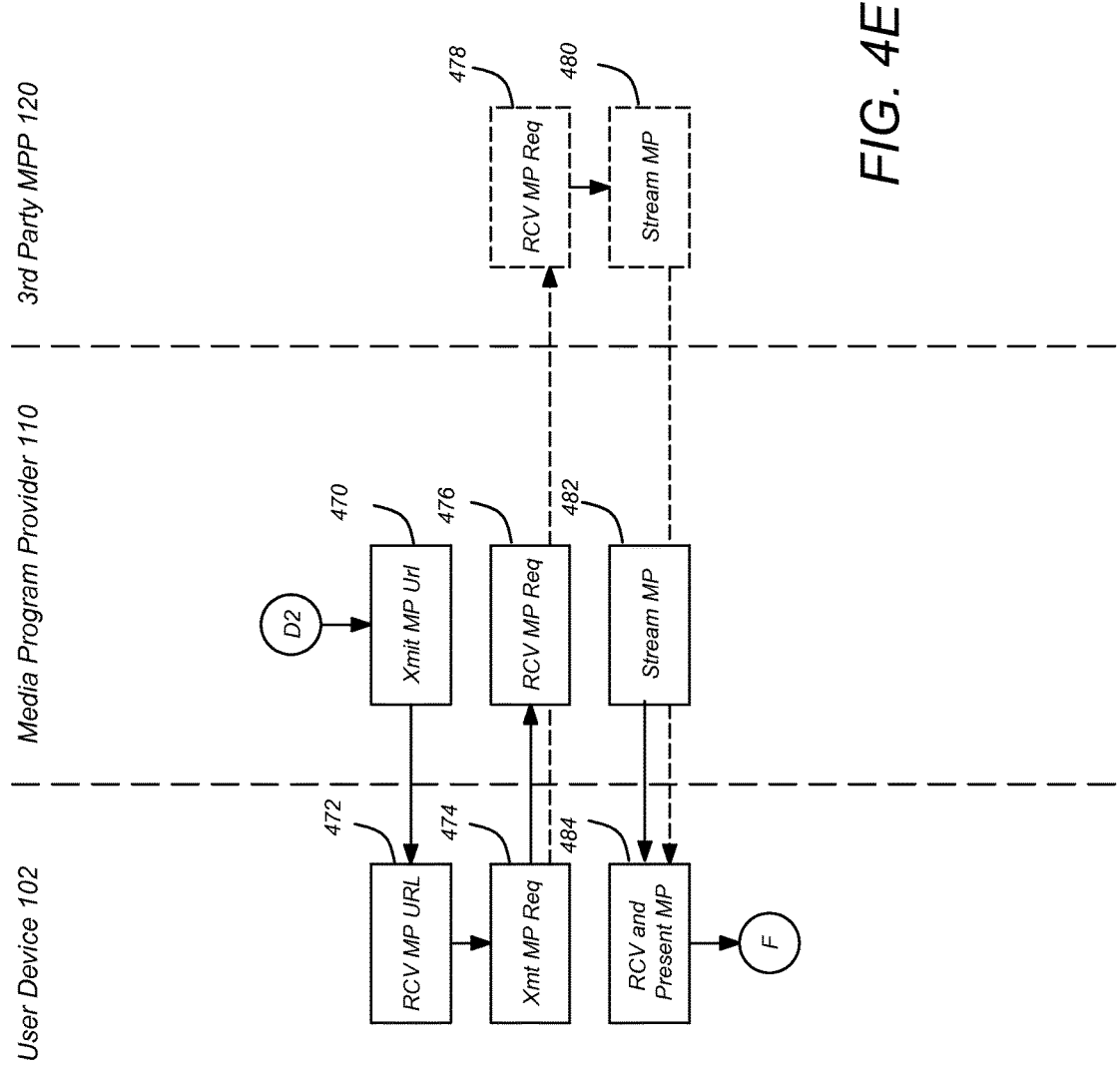

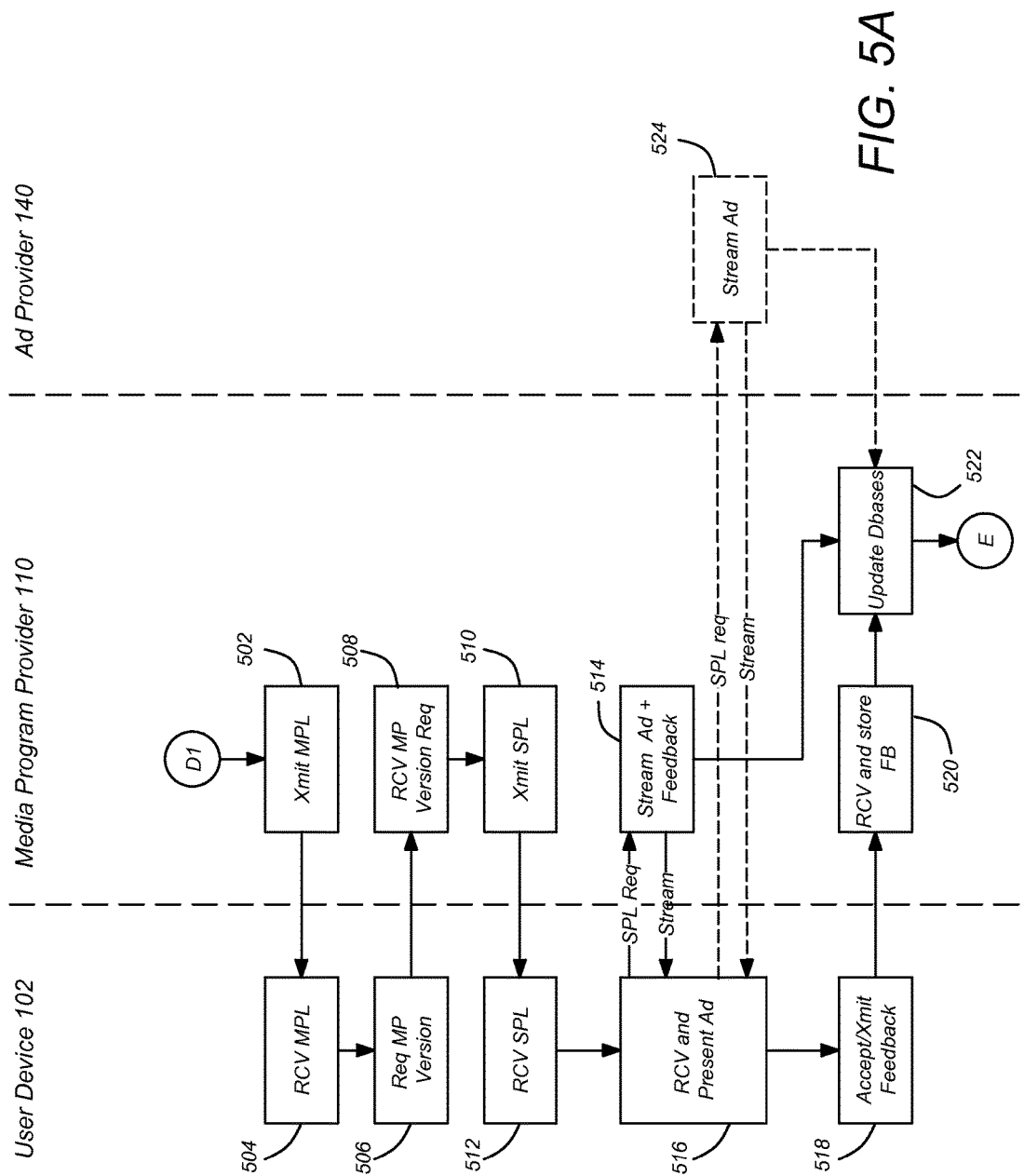

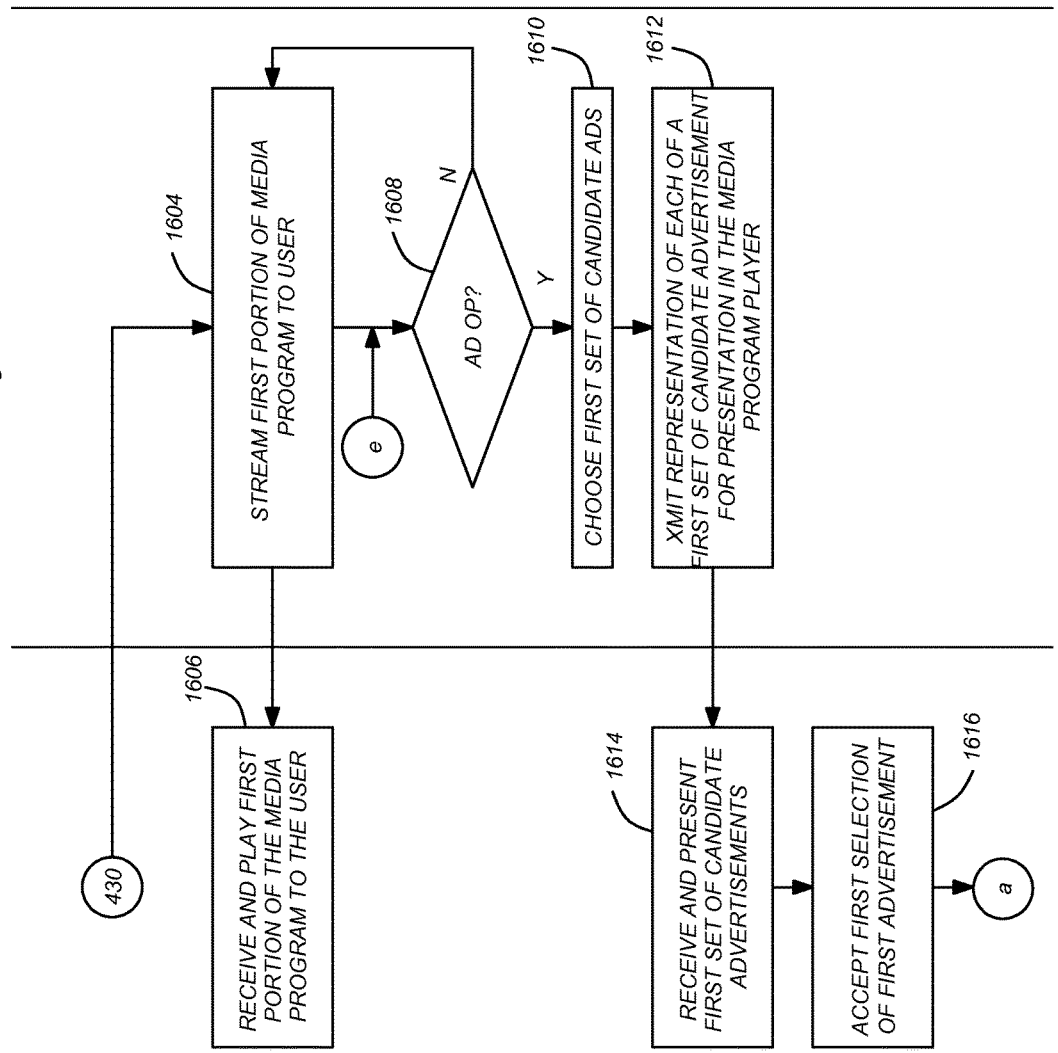

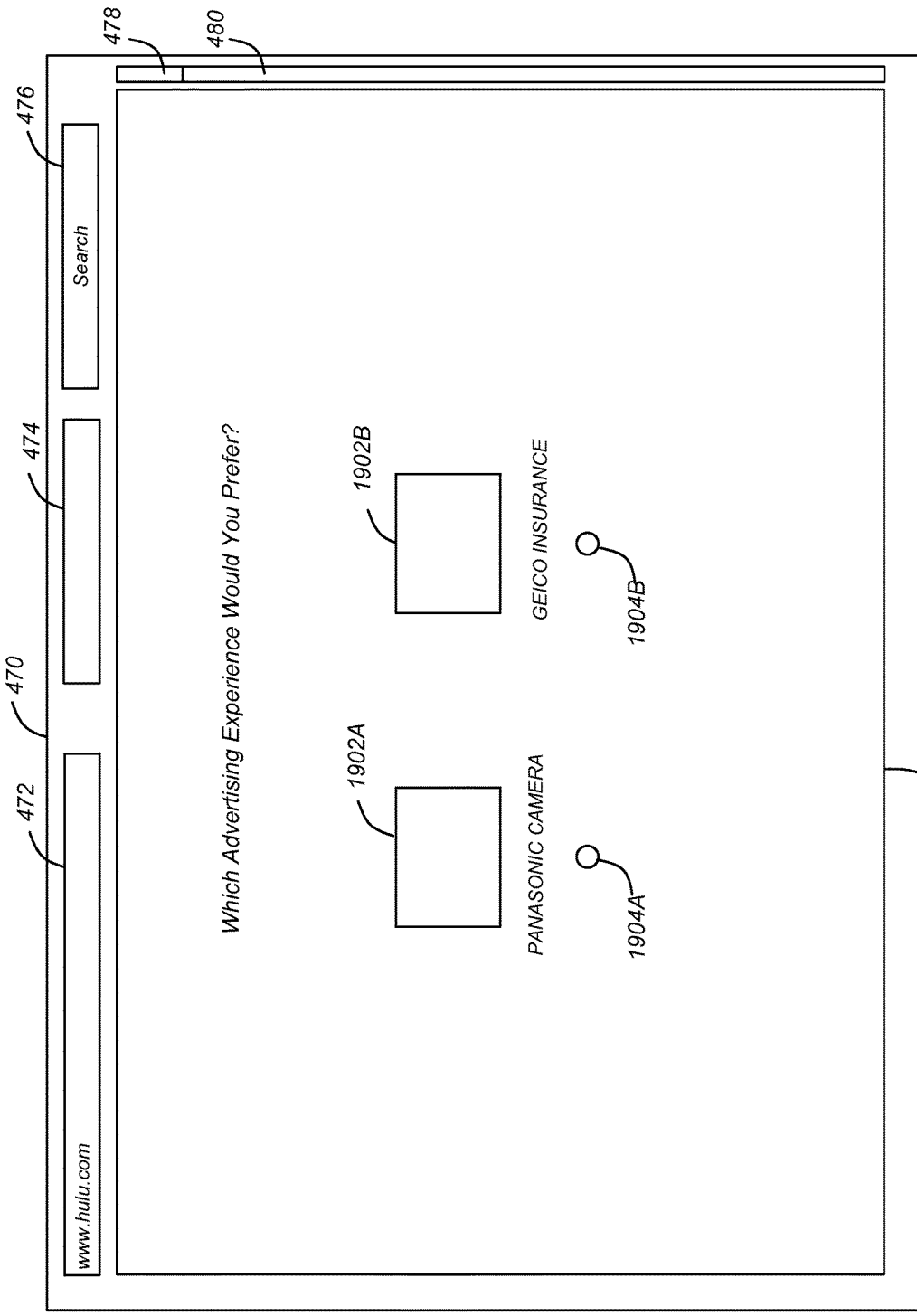

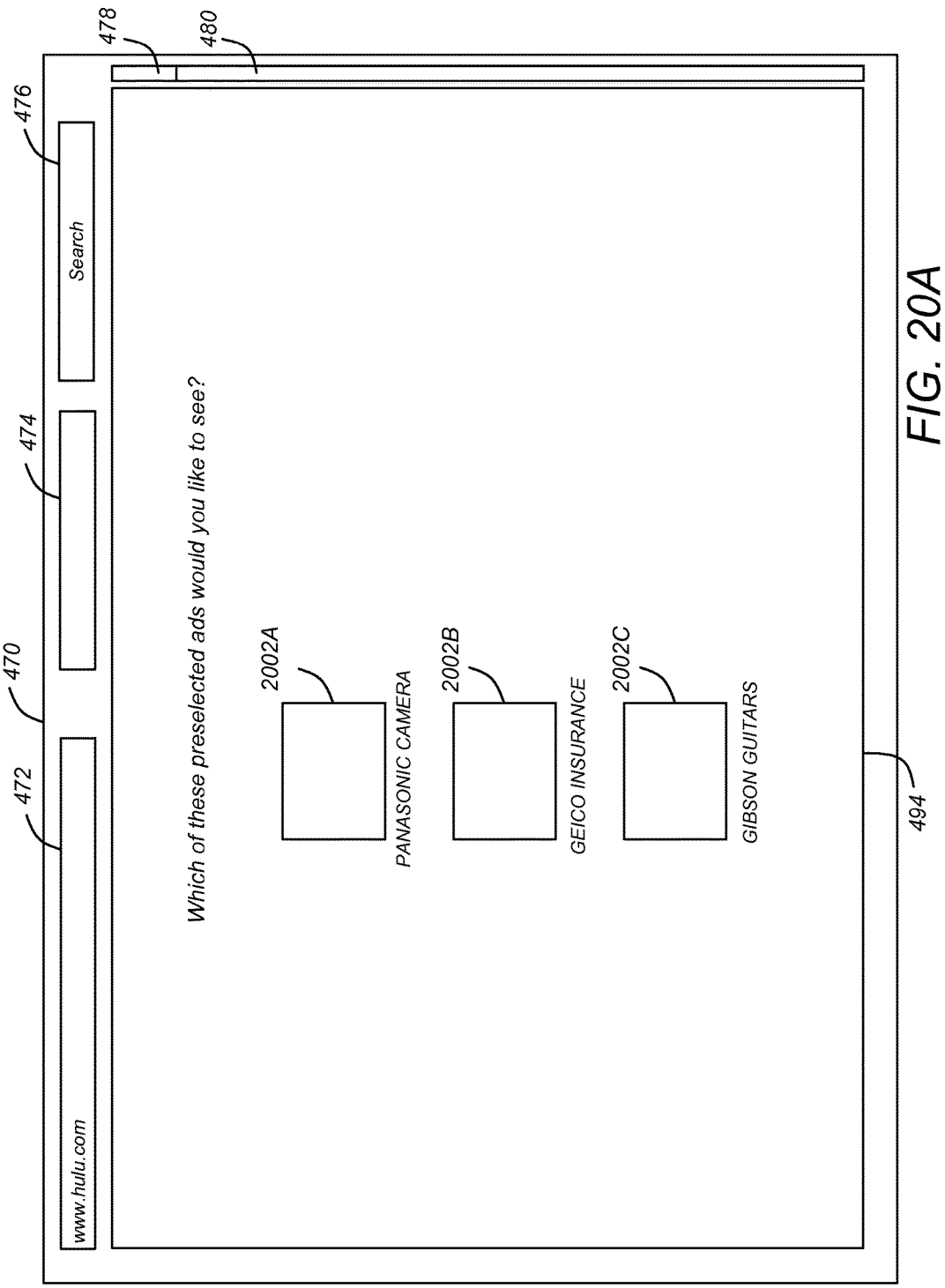

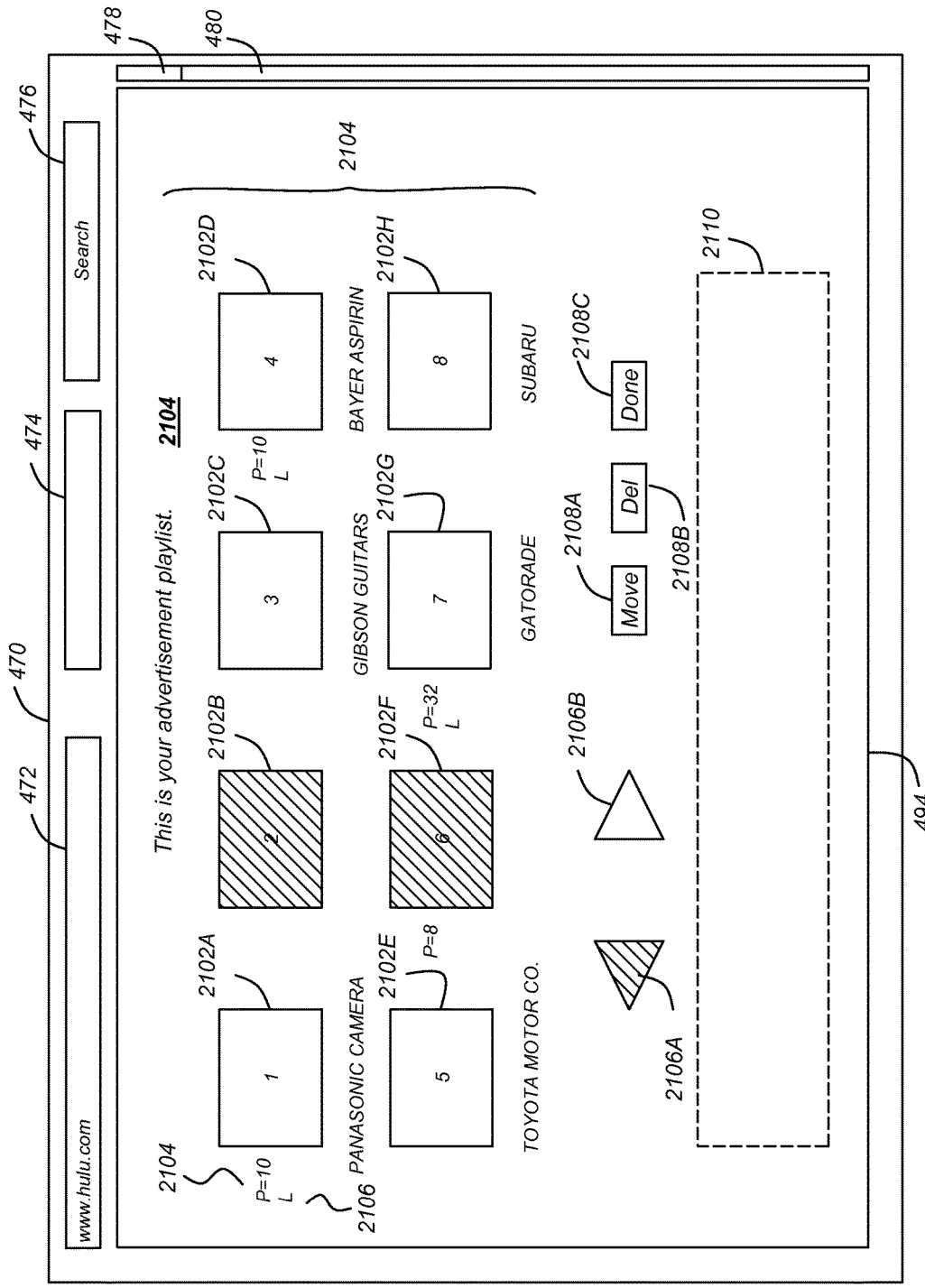

METHOD AND APPARATUS FOR PROVIDING USER CONTROL OF ADVERTISING BREAKS ASSOCIATED WITH A MEDIA PROGRAM

CROSS-REFERENCE TO RELATED APPLICATIONS

This application is a continuation of U.S. patent application Ser. No. 13/246,645 filed Sep. 27, 2011, entitled "METHOD AND APPARATUS FOR PROVIDING USER CONTROL OF ADVERTISING BREAKS ASSOCIATED WITH A MEDIA PROGRAM," which claims the benefit of U.S. Provisional Patent Application Ser. No. 61/386,913, entitled "METHOD AND APPARATUS FOR PROVIDING DIRECTED ADVERTISING BASED ON USER PREFERENCES," by Richard W. Tom, Jason Kilar, Eric. I Feng, Hua Zheng, Jean-Paul Colaco and William Z. Holt, filed Sep. 27, 2010, which application is hereby incorporated by reference herein.

BACKGROUND OF THE INVENTION

1. Field of the Invention

The present invention relates to systems and methods for providing streaming media to users, and in particular, to a system and method for directed advertising in said streaming media.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user device for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user would have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user device 102 using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device 102 at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

The delivery of media programs can be accomplished under a variety of models. In one model, the user pays for the viewing of the media program (for example, using a pay-per-view service). In another model widely adopted by broadcast television shortly after its inception, sponsors pay for the presentation of the media program in exchange for the right to present advertisements during or adjacent to the presentation of the program.

The advent of DVRs has had a profound effect upon the advertising model described above. DVRs permit the user to record media programs (in advance or during their broadcast), and permit the user to easily bypass advertisements presented during the media program by use of trick-play functions such as fast forward and reverse.

However, DVRs are not capable of these operations with media programs provided as streaming media. In such cases, the user must view the advertisements. The fact that users cannot skip advertisements within streamed media using a DVR-like device is both a strength and a weakness of this media program delivery paradigm. It is a strength, because advertisers can be assured that the viewers are actually watching the advertisements placed within the media program and not skipping them. However, it also represents a barrier to the widespread viewing of media programs via streaming media because users prefer to skip advertisements that are not of interest.

Systems that offer users some modicum of control are known in the art. For example, the systems disclosed in U.S. Patent Publication 2003/0154475, by Rodriguez, published Aug. 14, 2003, U.S. Patent Publication 2008/0127251, by Watchfogel, published May 29, 2008, U.S. Patent Publication 2003/0149975, by Elderling, published Aug. 7, 2003, and U.S. Patent Publication 2008/0196060 by Varghese.

However, none of the foregoing references teaches the ability for the user to directly control the temporal location of advertisements presented with the media program, and for creating and managing advertisement playlists. The present invention satisfies this need.

SUMMARY OF THE INVENTION

To address the requirements described above, a method and apparatus for presenting an advertisement for playback in conjunction with a media program is disclosed herein. In one embodiment, the method comprises the steps of presenting an representation of a first temporal location of an advertisement break within a media program, accepting a command to move the advertisement break from the first temporal location to a second temporal location, and playing the media program and playing the advertisement during the advertising break according to the second temporal location. The method may also be described as comprising the steps of transmitting first data describing a representation of a first temporal location of an advertisement break within a media program, receiving second data describing a command to move the advertisement break from the first temporal location to a second temporal location, and transmitting the media program and the advertisement during the advertising break according to the second temporal location.

In another embodiment, the apparatus comprises a user interface, for presenting an representation of a first temporal location of an advertisement break within a media program and for accepting a command to move the advertisement break from the first temporal location to a second temporal location and a media program player for playing the media program and playing the advertisement during the advertising break according to the second temporal location. In yet another embodiment, the apparatus comprises a content management system for transmitting first data describing a representation of a first temporal location of an advertisement break within a media program and for receiving second data describing a command to move the advertisement break from the first temporal location to a second temporal location and a server for transmitting the media program and the advertisement during the advertising break according to the second temporal location.

The foregoing provides a number of advantages over prior art systems and methods. First, it reduces the number of skipped advertisements by allowing the user to directly select which advertisement they would like and when they would like to see them. This actively engages the user in the process, and reduces the possibility that the user will be subject to advertisements that are not of interest. It also presents choices in a simple, direct user interface that takes little time relative to the advertisements itself, a factor that is critical in inviting user participation.

Second, it provides a system that is easy to use and effective for both advertisers and users. Advertisers can be assured that the users that are viewing their advertisements are interested in seeing them, and advertisers are not saddled with additional operational requirements or restrictions to participate in the process. Because user choices indicate which advertisements are desired by the users and which are not, the media program provider can also collect data regarding such choices and pass them on to the advertisers (whether for a fee or as a free service), thus providing valuable feedback regarding advertisement effectiveness and favorability. The system and method also provides users with some modicum of control over what advertisements they will see and when they will see them, enhancing the user experience and making users more likely to actively view the advertisements. The collection of relevant user viewing data is assured, while accomplished non-intrusively.

Third, it provides a system that assures that advertisements are relevant to the user's interests and needs, thus making the most of the advertisement opportunity. It also assures that the latest user input is factored into decisions regarding which advertisements and advertisement options are presented to the user.

Fourth, it provides a system that can substantially increase advertising revenues. Media program providers can charge a premium for advertisements shown (or ad impressions recorded) for advertisements that were selected by active user participation, because the level of user engagement, brand recall, and brand favorability for such advertisements will be substantially increased over advertisements that are simply provided to the user without user input.

Finally, the ability to actively control when advertisements are presented in conjunction with a media program allows the user to define their own advertisement experience by placing advertisements where desired. The ability to create and manage advertising playlists allows the user to select which advertisements they wish to see, while reducing the user interface required to do so. There is a need for such capability because it more actively engages the user in the advertising experience, and results in advertisements that are more likely to be viewed. The ability to define and manage playlists allows the user to directly select advertisements for an entire media program or many media programs, without requiring the user to make such choices at advertising breaks or advertising opportunities.

BRIEF DESCRIPTION OF THE DRAWINGS

Referring now to the drawings in which like reference numbers represent corresponding parts throughout:

FIGS. 3B-3H are diagrams illustrating a content delivery subsystem and operations that can be used to deliver media programs and advertisements for presentation to a user via an HTTP live streaming protocol;

FIGS. 4A-4F are diagrams illustrating exemplary method steps that can be used to provide one or more advertisements with a streamed media program having one or more advertising breaks;

FIGS. 5A and 5B are diagrams illustrating the transmission of advertisements to the user in an HTTP live streaming embodiment when advertising options are selected before and after commencing playback of the media program, respectively;

FIGS. 16A-16D are diagrams illustrating exemplary process steps that can be used to practice an embodiment of the invention in which playback of an advertisement can be interrupted to provide the user with further advertisement control;

FIG. 19 is a diagram of a user interface presented to the user to present an option of choosing a first advertisement or a second advertisement;

FIGS. 20A and 20B are diagrams illustrating another embodiment of the invention in which the user is provided with a first set of advertisements that have been preselected for viewing with the media program; and FIGS. 21A-FIG. 21C are diagrams presenting one embodiment of how a queue or playlist of advertisements can be selected, edited, and controlled.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
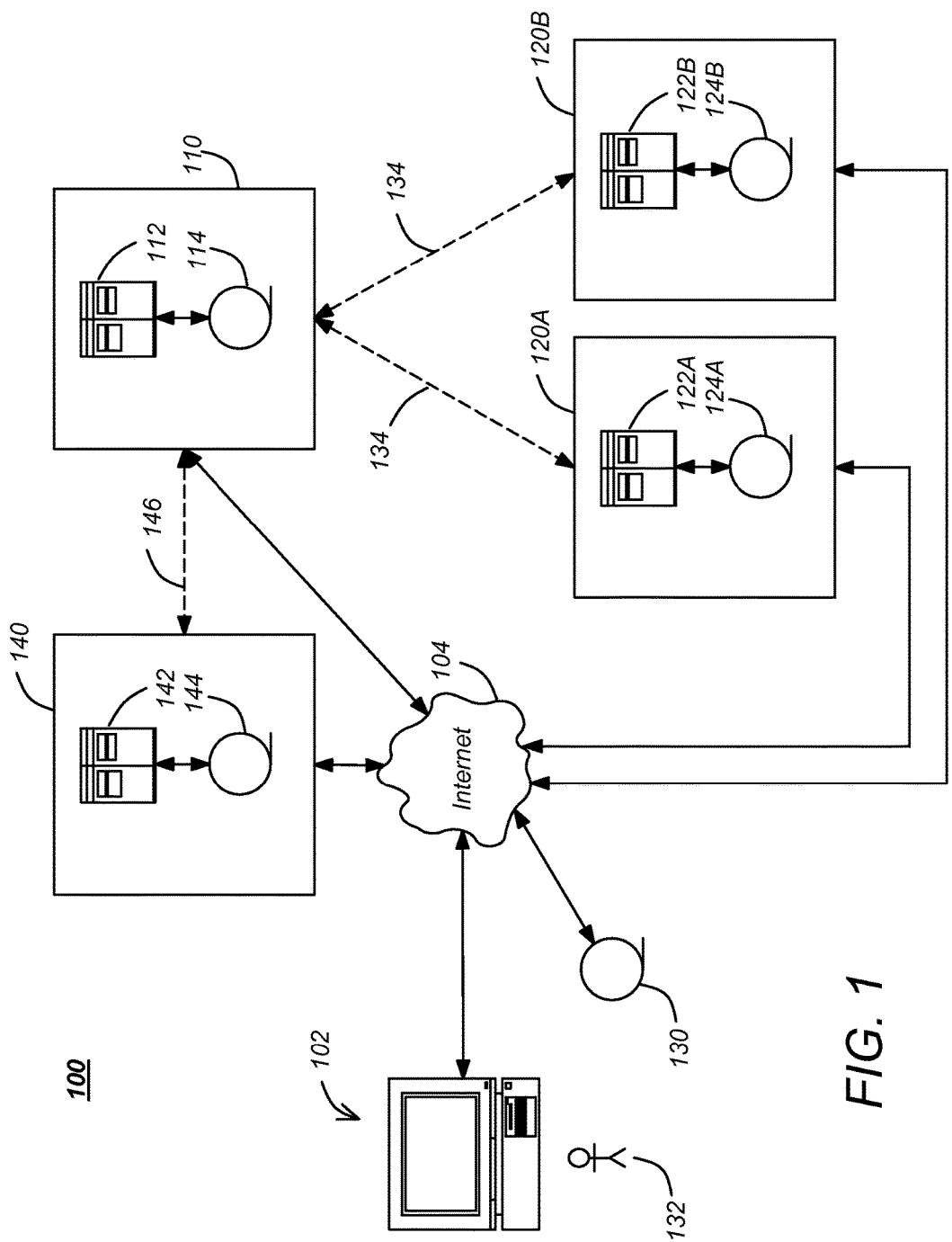
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 may stream media programs to the user's computer 102 directly from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user's computer 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the computer 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device 102 at the appropriate time. As described further below, the media program provider 110 may include the advertisement provider 140.

In one embodiment, the advertisements are integrated with the streamed or downloaded video from the media program provider 110. In another embodiment, the advertisements are not integrated with the media program, but are instead transmitted to the user device 102 separately from the media program, and replayed at the appropriate time using indices that indicate when each advertisement should be presented. For example, advertisements can be indexed and streamed or downloaded to the user device 102, and such advertisements can be played back to the user 132 at times indicated by corresponding indices in the media program.

Figure 2:
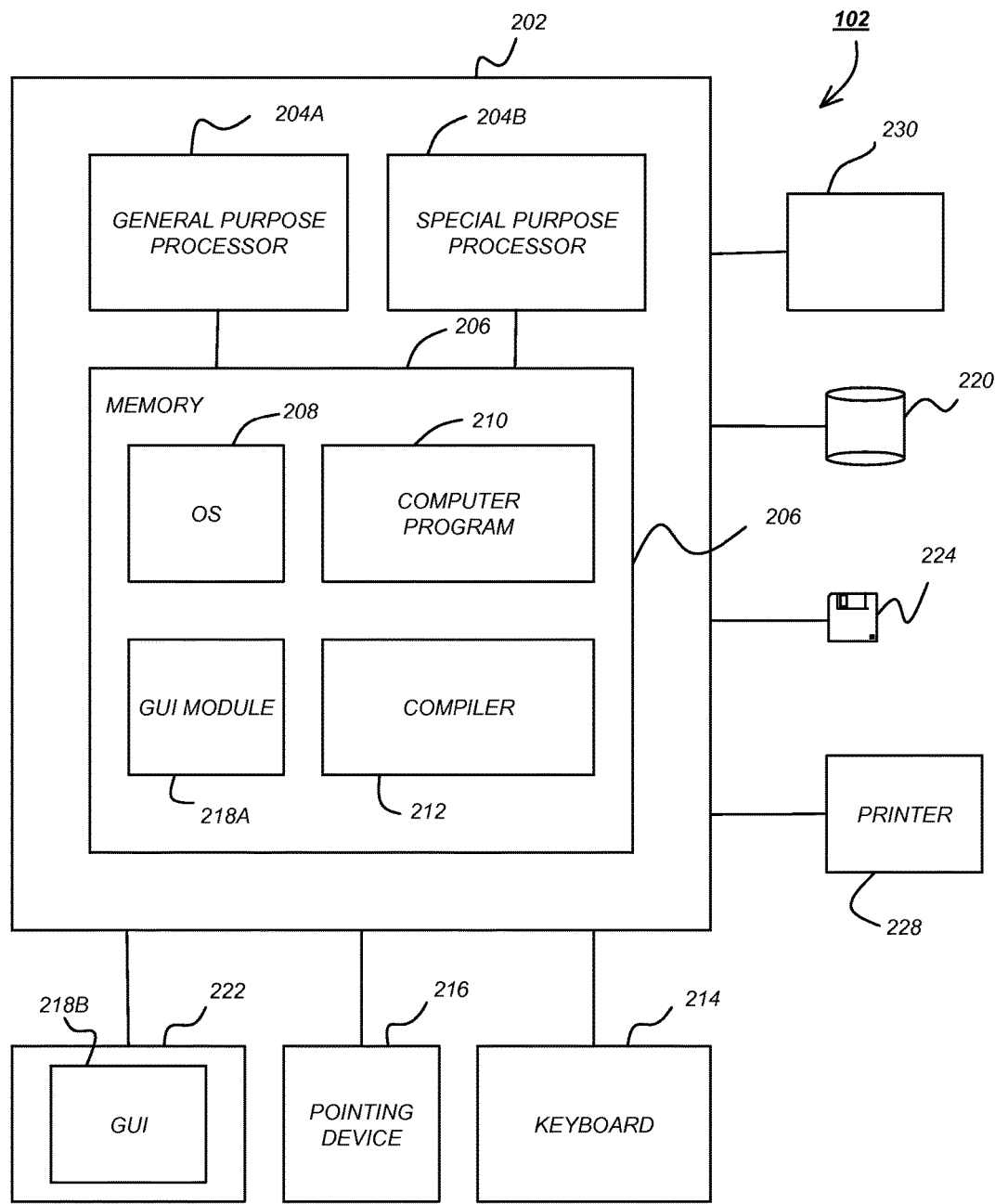
FIG. 2 illustrates an exemplary computer system that could be used to implement the present invention.

FIG. 2 illustrates an exemplary computer system 202 that could be used to implement elements of the present invention, including the user device 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands.

Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user device" is referred to herein, it is understood that a user device 102 may include portable devices such as IPODs, IPHONEs, IPADs, cellphones, portable MP3 players, video game consoles, notebook computers, pocket computers, personal data assistants (PDAs) or any other device with suitable processing, communication, and input/output capability.

Figure 3A:
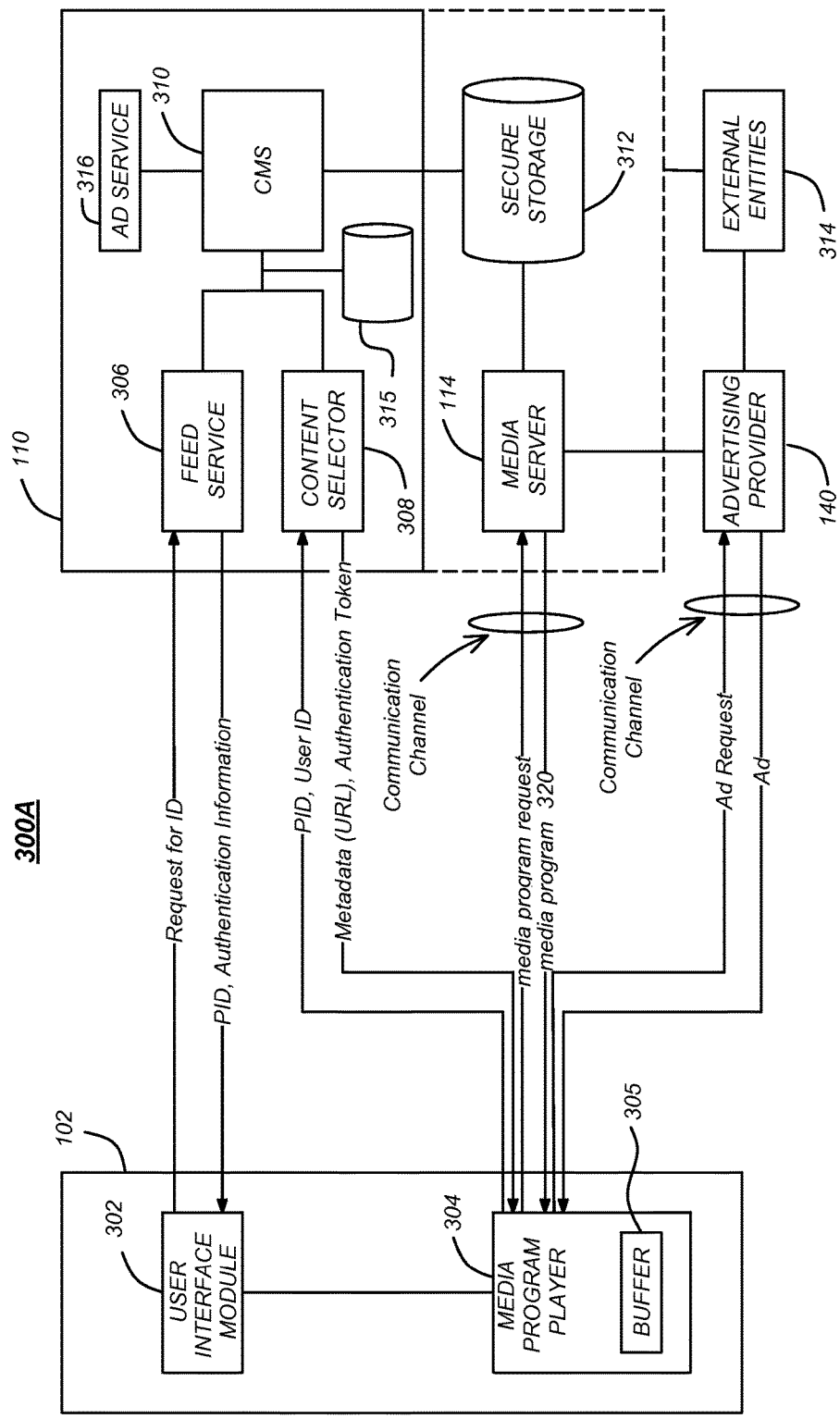
FIG. 3A is a diagram illustrating a content delivery subsystem and operations that can be used to deliver media programs and advertisements for presentation to a user via standard streaming protocols.

FIG. 3A is a diagram illustrating a first embodiment of a content delivery subsystem (CDS) 300A and top-level operations that can be used to deliver media programs and advertisements for presentation to the user 132.

Transmitting Media Content and Advertisements Using Streaming Protocols

The media programs an advertisements may be delivered according to any suitable protocol, including the hypertext transfer protocol (HTTP), transmission control protocol (TCP), real time transport protocol (RTP), and real time streaming protocol (RTSP). TCP, RTP and RTSP all provide information to the sender of the media program information regarding the transmission of the media program to the media program player 304.

In one embodiment, the information ordinarily provided in accordance with the transfer or transmission protocol can be used the media server 114 to determine which data was received and presented by the media program player 304 and which data was not, without requiring the user device 102 to store such information and transmit it to the media program provider 110 in a separate message or via a separate communications channel. In another embodiment, the transfer or transmission protocol is augmented to include a beacon service that provides information regarding the streaming or playback of the media program. Both embodiments are further described below.

RTP uses a real time control protocol (RTCP) which is used for session control and includes receiver reports having reception statistics from participants. RTCP is used to gather statistics on the quality of the transmission of the media program during the session and transmit this information to session source (e.g. the media server 114) to enable adaptive media encoding. RTP is more fully described in "RTP: A Transport Protocol for Real-Time Applications," by H Schulzrinne et. al, July 2003 (available at http://tools.ietf.org/html/rfc3550), which is hereby incorporated by reference herein.

RTSP uses control messages sent by the client to the server to control the transmission of data to the client. For example, RTSP defines a speed request header field that requests that the media server deliver the data to the media program player at a particular speed, consistent with the media server's ability and desire to provide the media at that speed. RTSP is more fully described in "Real Time Streaming Protocol (RTSP)," IETF, 1998 published by the Network Working Group, which is available at http://tools.ietf.org/html/rfc2326 and is hereby incorporated by reference herein.

TCP uses an end to end flow control protocol in which the receiver of the data specifies, in a receive window field, the amount of additional data that it is willing to buffer. The sender then sends only up to that amount of data and will not send more unless the sender receives an acknowledgement message and another update in the window field. If the receiver specifies a zero window field, the transmitter stops sending data and starts a persist timer. The TCP sender will attempt recovery by sending a small package.

In the embodiment illustrated in FIG. 3A, the content delivery subsystem 300 includes the user device 102, a media program provider 110, and an advertisement provider 140. The media program provider 110 comprises a feed service 306, a content selector 308 and a content management service 310.

In one embodiment, when the user 132 selects a media program 320 using the user interface module 302 of the user device 102, the media program provider simply begins transmitting the media program to the media program player 304. In another embodiment, instead of transmitting the media program immediately upon receipt of the user selection, the user 132 is provided with a resource locator such as a URL at which the media program 320 may be obtained. This may be accomplished by transmitting an identifier from the user device 102 to the MPP 110 and in response, receiving the URL where the media program may be obtained. The media program player 304 can then transmit a media program request to the received URL to initiate the streaming of the media program 320 from the MPP 110.

Media program content providers (who generate the media programs 320 provided in the CDS 300) may require that the dissemination of the media program 320 to approved entities such as the MPP 100, and not allow dissemination of the media program 320 through unauthorized channels. This can be accomplished using several different techniques.

One method to discourage unauthorized dissemination is to vary the URL associated with the media program with time, for example, by changing the URL associated with the media program every day. After the URL expires, it is unusable for purposes of obtaining access to the media program.

Another method is to encrypt or otherwise protect the URL, so that it is usable only by approved media program players. When the user 132 selects a media program using the user interface module 302 of the user device 102, a message is transmitted from the user device 102 to the media program provider 110 requesting the media program identifier (PID) of the selected media program. The feed service 306 receives the request, and using information obtained from secure storage 312 via the content management service 310, the feed service 306 determines the PID for the selected media program and transmits a message having PID to the user device 102. The user device 102 receives the PID. The message from the feed service 306 may also include authentication information that is later used to secure the transmission of the URL as described below. In one embodiment, the PID is not time-invariant. In other words, the PID for a given media program 320 does not change with time and will always be associated with that media program 320.

The user device then transmits the PID associated with the selected media program 320 and a user or user device ID to the content selector 308 of the media program provider 110. The content selector 308 forwards the information to the content management service (CMS) 310, which may use the advertisement service 318 to select advertisements or advertisement options that are appropriate for the user and selected media program, using information stored in secure storage 312. This may be accomplished as described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein.

The content management service 310 forwards the selected advertisements and advertisement options to the content selector 308. The content selector transmits information from which the user device 102 may obtain the selected media program from the media server 114, as well as one or more advertisements from the advertising provider 140. In the illustrated embodiment, this information includes the address (e.g. URL) where the desired media program and advertisement(s) can be obtained from the media server 114. The content selector 308 then transmits metadata comprising the URL to the user device 102. This metadata may include an authorization token computed from a user device identifier, and information defining one or more advertising breaks within the media program. This authorization token may be used to permit authorized user devices 102 to receive the media program and prevent unauthorized user devices from doing so. For example, the authorization token can be transmitted by the user device 102 to the media server 114 along with or independent of the media program request, and the media server 114 may compare the received authorization token with a database of valid authorization tokens (optionally associated with user IDs) to determine if the media program 320 should be streamed to the user device 102. Or, the user device 102 later compares to the authorization information received from the feed service 306 as described above with the authorization token to assure that the user device 102 receiving the URL is the same user device 102 that requested the media program.

Alternatively, metadata (and hence, the URL) received from the content selector 308 is encrypted using private or public keys shared between the MPP 110 and the user device 102 to protect the URL from disclosure. This assures that a different user device 102 will not be able to obtain the URL by which the media program 320 of interest can be obtained. Further, the user device 102 or media program player 304 may implement a symmetric or asymmetric public and/or private key security procedure by which the URL is encrypted with the appropriate key and cannot be decrypted by the user device 102 unless the user device has the appropriate key. Transmission of the keys necessary to decrypt the URL may be accomplished in the messages from the feed service 306 or the content selector 308.

Other schemes may also be implemented in which authentication information is not transmitted by the feed service 306, but rather, the authentication token from the content selector 308 is derived from the User ID of the requesting user or user device 102, and the user device 102 must use this User ID to recover or derive the authentication token and obtain the URL. In this case, a user device 102 with a different user ID will not be able to recover the URL.

In any case, the user device 102 transmits a media program request to the media server 114 at a specified address or URL associated with the selected media program 320. The media server 114 retrieves the media program 320 from secure storage 312, and transmits the media program 320 to the user device 102. The user device 102 receives the transmitted media program 320, and may temporarily store the media program in buffer 305. Buffer 305 may include hardware and/or software buffering, and may be resident in the media program player 305, or elsewhere in the user device 102.

If the user 132 enters trick play commands (e.g. to reverse, fast forward, fast reverse, pause playback or to temporally move playback to a different point in the media program or advertisement by selecting and moving a progress bar as described further below), those commands are provided from the media program player 304 to the media server 114/advertising provider 140, and the media server 114/advertising provider 140 responds by streaming the appropriate media program 320 stream to the media program player 304. Based on such commands or the other housekeeping and stream control data described above, the media server 114, advertising provider 140 and media program provider 110 can remotely determine what the user 132 is viewing, and without need for the user device 102 to store viewing information or to transmit such information to the MPP 110.

The user device 102 may also request advertisements from the advertising provider 140. As described further below, all of the advertisements to be played in conjunction with the media program 320 may be selected before the media program 320 is streamed to the user device 102, or such advertisements and/or candidate advertisements selected shortly before (about ten seconds, for example) an advertising break in the media program as described further below.

Typically, media server 114 has a plurality of versions of the media program, each suitable for communication channels of different throughput or bandwidth. Using information received from the user device 102 or elsewhere, the media player 114 determines the most appropriate version of the media program to transmit to the user device 102. This determination can be based, for example, upon the bandwidth or available bit rate of the communication channel used to transmit the media program to the user device 102, the throughput of the user device 102 and the size and speed of the buffer 305 implemented in the user device 102.

The user device 102 then receives and presents the media program. Typically, the media program data is stored in a hardware or software buffer 305 in the user device 102, and retrieved in a first-in-first-out (FIFO) manner. Since the average bit rate of the delivered media program version is less than the bandwidth capability of the communications channel, the buffer 305 fills while the media program is being played. Buffered data is available even when the communication channel bandwidth or the bit rate of the media program changes, and hence, the buffered data can be used to reduce choppy playback.

If the user device 102 determines that the media program is not being delivered at the required bit rate (the rate at which the data is consumed to play the media program exceeds the rate that the data is received to an extent wherein the buffer 305 cannot adequately prevent choppy playback), the user device 102 may send a message to the media server 114 requesting a different version of the media program (e.g. one suitable for transmission at a lower bit rate). Conversely, if the user device 102 determines that the media program is being delivered at greater than the required bit rate, the user device 102 may send a message to the media server requesting a version of the media program suitable for transmission at a higher bit rate. This may provide the user 132 with a higher resolution version of the media program.

Although the advertisement provider 140 and media server 114 is illustrated as a separate architectural entity than the media program provider 110, the advertisement provider 140 (and advertisement server 142) may be integrated with the media program provider 110 (that is, the media program provider 110 may also provide the advertisements). The CDS 300 provides a means to provide media programs and advertisements across a plurality of distribution networks, which may include www.hulu.com, www.imdb.com, www.aol.com or www.msn.com.

Metadata related to media program and advertisement content as well as streaming information may be stored in the content delivery system 300 in database 312, as is data describing where the media programs and advertisements may be found within or external to the CDS 300.

The user device 102 may include an interface module 302 and a media program player 304. The interface module 302 includes instructions performed by the user device 102 that are used to present information and media programs to the user 132 and to accept user input, including commands. Exemplary user devices 102 are a desktop computer, a laptop computer, or a portable device such as an IPOD, IPHONE, IPAD, a portable telephone, or a PALM device.

Figure 3B:
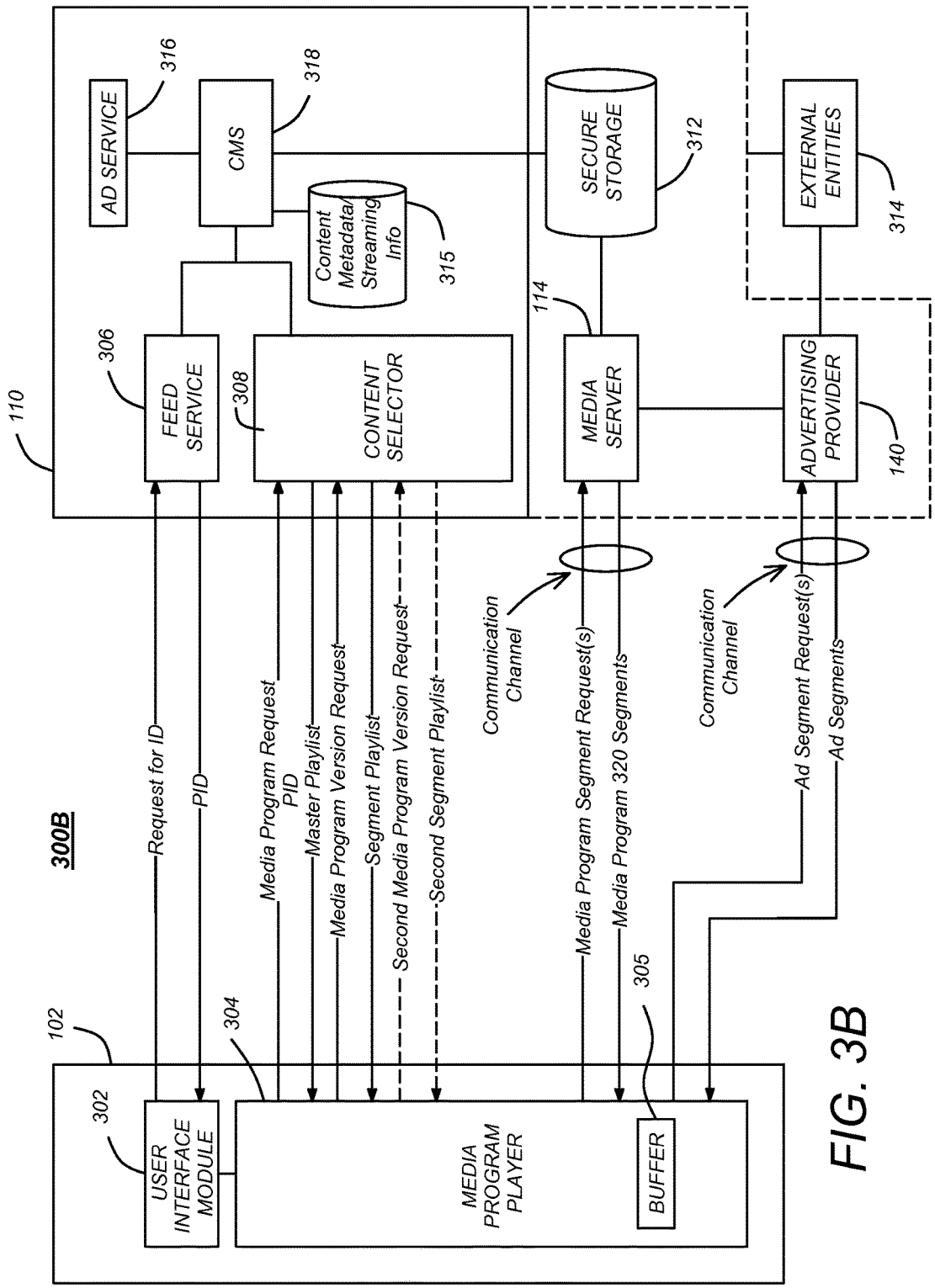

FIG. 3B is a diagram illustrating a content delivery system 300B that provides for the transmission of media programs and advertisements according to an HTTP live streaming protocol, which is described in "HTTP Live Streaming-draft-pantos-http-live-streaming-06," by R Pantos, Mar. 31, 2001 (available at http://tools.ietf.org/html/draft-pantos-http-live-streaming-06), which is hereby incorporated by reference herein.

Streaming Media Content and Advertisements Using HTTP Live Streaming Protocols

The HTTP live streaming (hereinafter, "live streaming") protocol is especially useful for mobile and wireless devices. Fundamentally, this protocol is similar to the protocol illustrated in FIG. 3A, except that when the user device 102 requests the media program, it is ultimately provided with a "playlist" of small segments or "chunks" of the media program 320 and advertisement. Each "playlist" is optimized for certain transmission characteristics (some require higher transmission bandwidth than others), and the user device 102 uses the playlist to request transmission of each chunk of the media program in order. If the current transmission bandwidth is insufficient, the user device 102 can request segments that are of lower resolution and require less bandwidth via the appropriate "playlist". Each chunk of the media program or advertisement is received, processed, and assembled into the media program presented to the user 132.

Figure 3C:
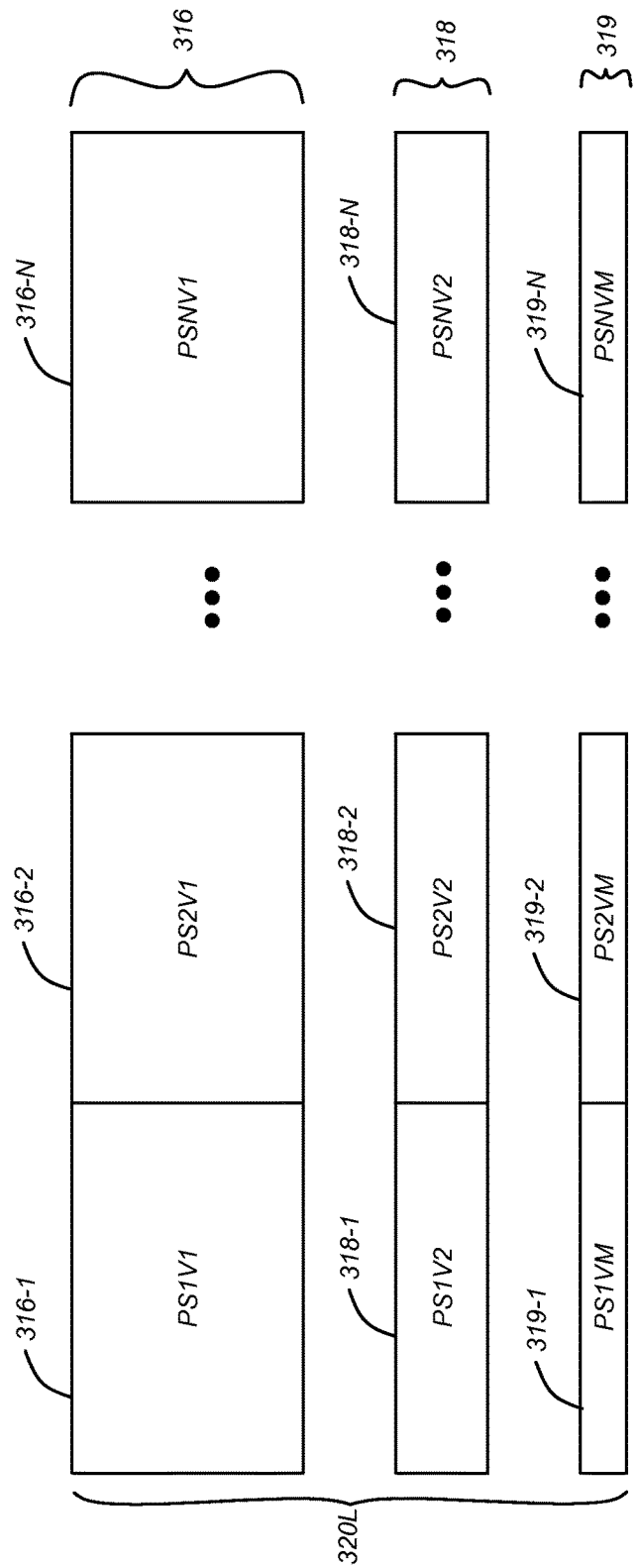

FIG. 3C is a diagram illustrating media program segments. The media program provider 110 or another entity generates multiple different versions of the media program 320L ("L" referring to a live streaming embodiment), each suitable for a different presentation throughput or transmission bandwidth. In the illustrated embodiment, three versions are created: a high presentation throughput version 316, a medium presentation throughput version 318, and a low presentation throughput version 319. Furthermore, each version 316-319 of the media program is separated into a plurality of segments. For example, in FIG. 3C, the first version 316 of the media program is separated into N segments 316-1 through 316-N, the second version 318 of the media program is also separated into N segments 318-1 through 318-N, and the third version 319 of the media program is separated into N segments 319-1 through 319-N.

In the illustrated embodiment, all of the segments of any particular version are of equal temporal length (e.g. temporal segment 316-1 is the same temporal length as temporal segment 316-2), but this need not be the case. Also, in the illustrated embodiment, each version of the media program includes the same number of segments (e.g. version 316, 318 and 319 all include N segments), but this need not be the case. Further, all of the versions of each corresponding temporal segment will ordinarily be the same temporal length (in other words, segment 316-1 will typically be the same temporal length as 318-1), but this also need not be the case. Instead, temporal segments of different versions may be of different temporal length so long as the segments are temporally aligned at the time when an advertisement is to be inserted. For example, if first version 316 has N temporally equal segments and second version 318 has 2N temporally equal segments, the length of segment 316-1 will be twice that of the second version segments.

Although only three versions of the media program are illustrated, the number of different media programs could be as little as two or as many as is needed. Typically, the number of versions is a tradeoff between the storage, generation, and management of the different versions and the conservation of transmission bandwidth and media program player processing requirements.

Figure 3D:
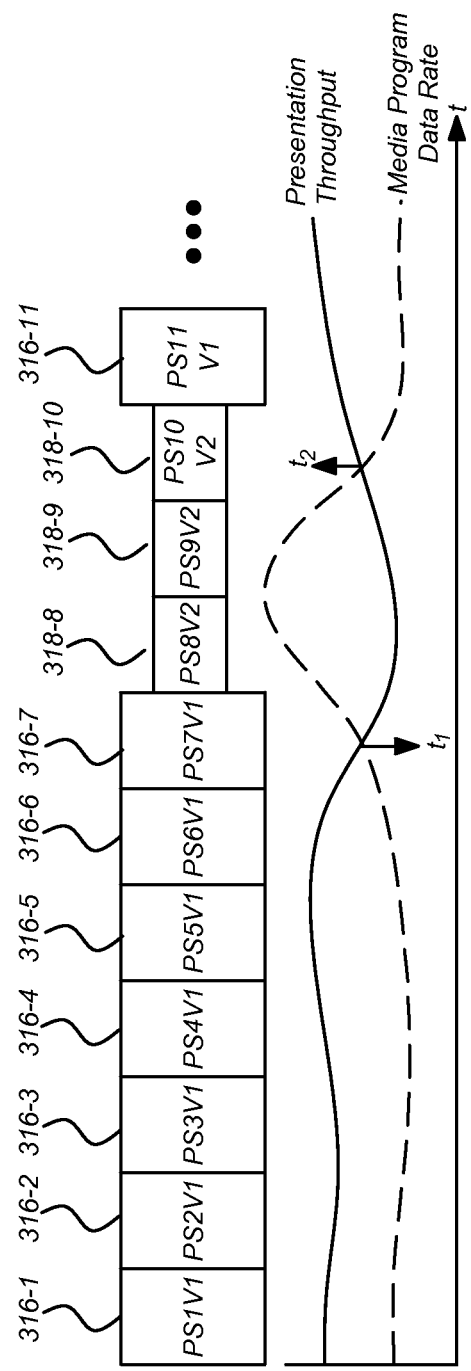

FIG. 3D is a diagram illustrating a simplified version of how the media program player 304 can receive media program segments while accounting for presentation throughput and/or media program data rate changes. As shown in FIG. 3D, the data or bit rate of the media program can vary with time, as shown in the dashed line. At the same time, the presentation throughput (which may include, for example, the throughput of the communications channel by with the media program is received and/or the processing throughput of the user device 102) may also vary with time, as shown by the solid line.

In the illustrated example, the media program player 304 receives segments of the first (high presentation throughput) version of the media program 316-1 through 316-7 when the presentation throughput is greater than a minimum threshold. However, when the presentation throughput drops below the media program data rate at time $t_1$, the media program player may not be able to receive and process the high resolution version of the media program in a timely manner, and therefore requests and receives media program segments of the medium resolution (318-8 through 318-10). When the presentation throughput increases above the media program data rate at time $t_2$, the media program player is able to receive and process the high resolution version of the media program in a timely manner, and therefore requests and receives media program segments of medium resolution (316-11, etc.).

Typically, the user device 102 includes a first-in-first-out (FIFO) buffer, and when the media program data rate is less than that of the presentation throughput, the user device 102 may buffer the data for later presentation. This buffer may ameliorate or delay the need for the user device 102 to switch to different segment versions. However, if the media program data rate exceeds the presentation throughput for a long enough period of time, the user device 102 will need to switch to a lower bit rate version of the media program as described above. Typically, the media program player 304 determines when a different version of the streamed media program is desired based on a variety of factors including the fullness of any buffer storing segments before presenting them to the user, processing load, and communications channel bandwidth.

It is also noteworthy that since the live streaming protocol calls for the request and transmission of relatively short segments of the media program at a time, the media program data rate may vary little from segment to segment. In such cases, the media program player will request different segment versions based primarily on the presentation or transmission throughput.

The foregoing protocol works well so long as the media program does not include advertising or so long as the media program includes the same advertising for all viewers. In such cases, the advertisements need only be placed in the media stream, and the media player will be able to switch from one segment version to another so long as they represent the same information (which may include only a portion of the media program, only a portion of an advertisement, or a segment with both). However when the use is provided with advertisements that are selected based upon user preferences or other factors (hereinafter referred to as personalized or directed advertisements), the foregoing model does not work well. That is because when the user requests a media program, the media program would need to be retrieved, advertisements spliced in at the appropriate times, and segmented before the user device could receive the media program. Further, this process would need to be performed for all combinations of advertisements and media program versions.

Figure 3E:
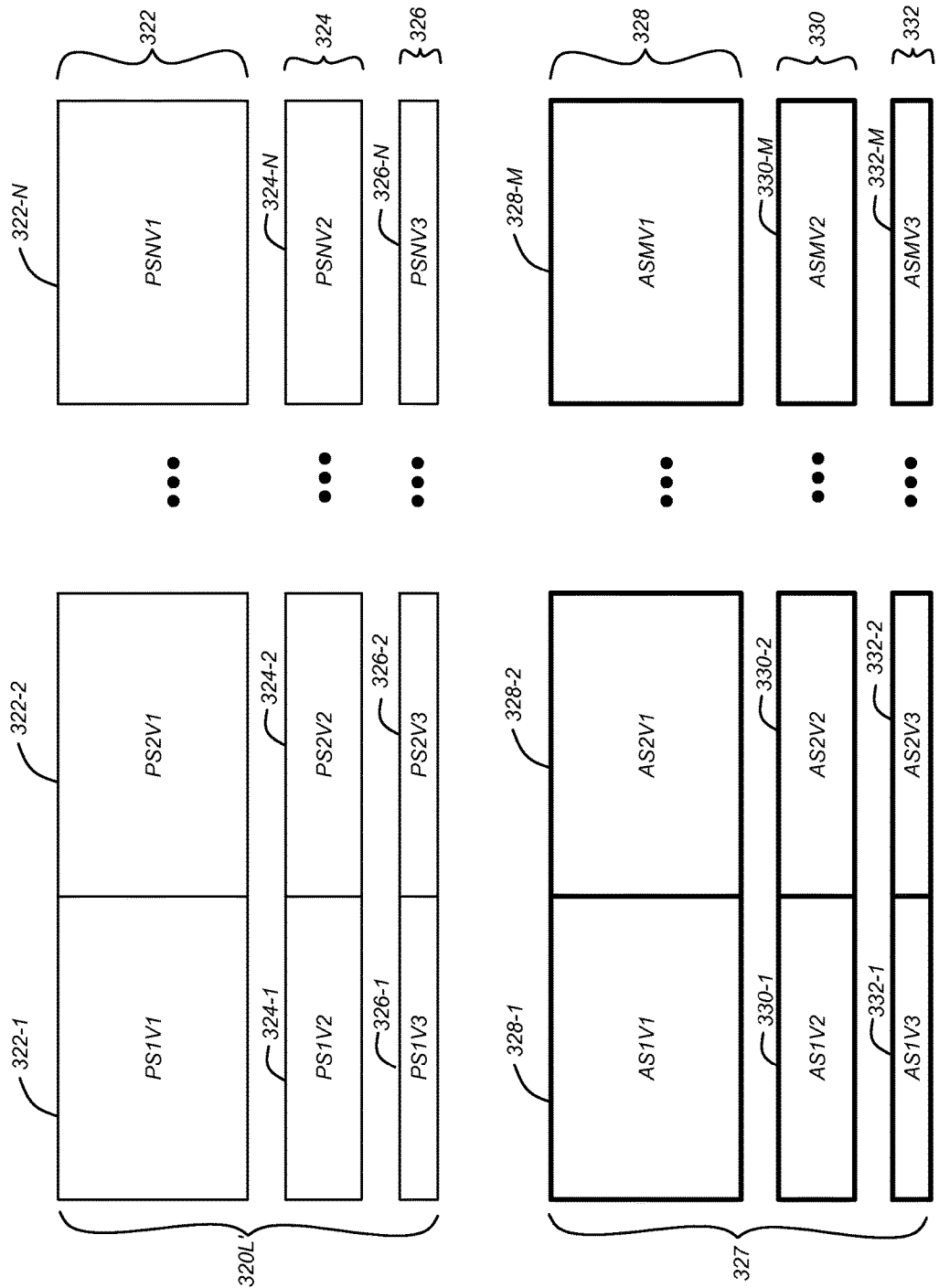

FIG. 3E is a diagram illustrating how the media program player 304 can receive media program segments while accounting for communication presentation throughput and media program bit rate changes while also permitting the insertion of different advertisements for different users. As before, different versions of the media program are generated. As before, the different versions of the media program 322-326 are separated into segments 322-1 through 326-N that typically are temporally the same length between versions. But in this case, the media program excludes advertisements. Instead, different versions of the advertisements are generated (such as the three versions 328-332 of a first advertisement 327), and those different versions are also separated into segments 328-1 through 332-M. Like the media program segments 322-1 through 326-N, the advertisement segments 328-1 through 332-M need not be of the same temporal length, and may or may not be of equal length between versions.

Figure 3F:
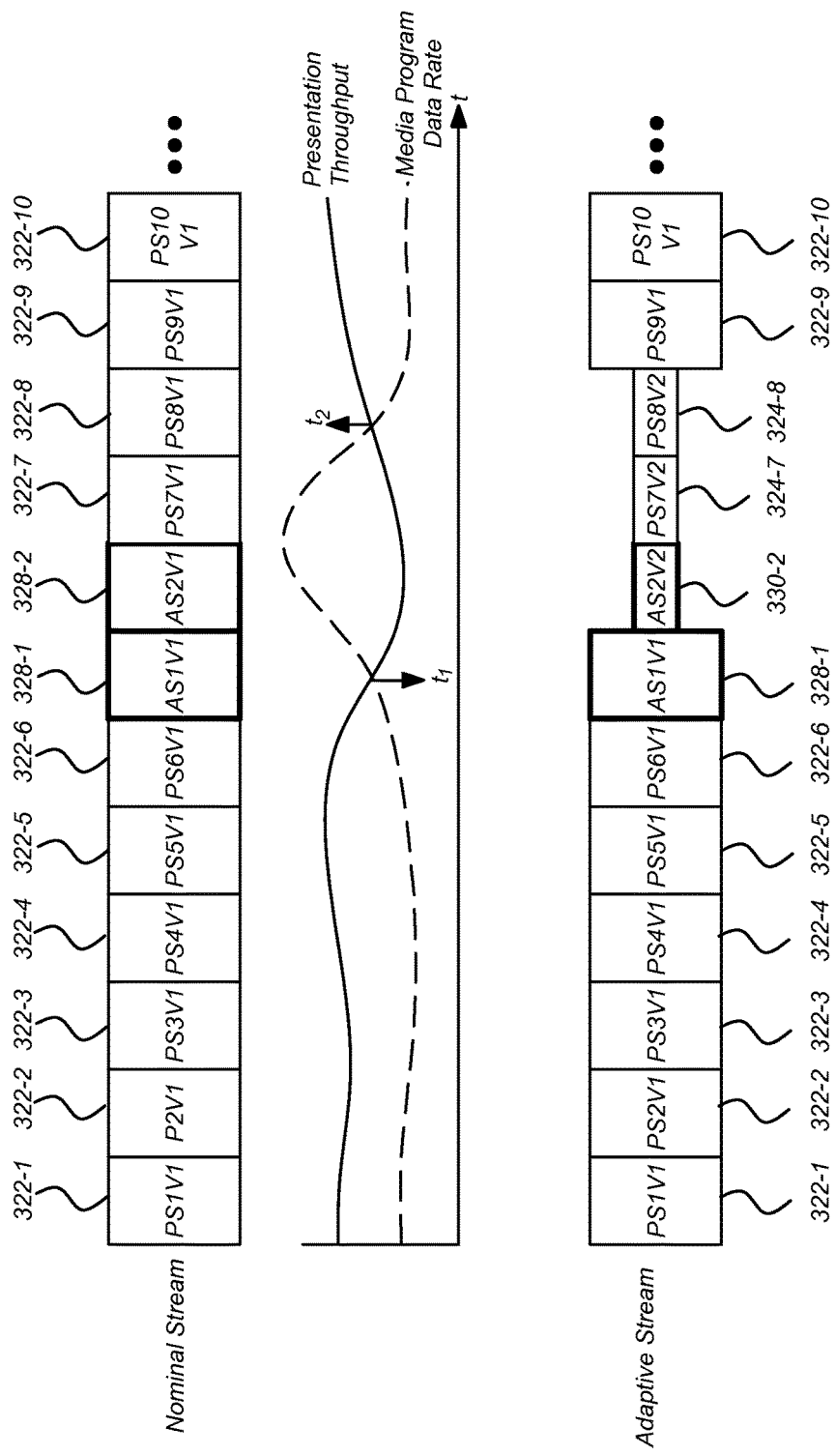

FIG. 3F is a diagram illustrating how the media program player 304 can receive media program segments and targeted advertisements while accounting for changes in available presentation throughput and the media program bit rate. If the presentation throughput were to remain above a minimum threshold for high quality playback, the media program player 304 simply requests the segments that together comprise the high resolution version of the media program, as shown in the top portion of FIG. 3F. This would include the first six segments of the media program (PS1V1-PS6V1) 322-1 through 322-6 followed by the two segments of an advertisement (AS1V1-AS2V1) 328-1 through 328-2, then the next segments of the media program (PS7V1-PS10V1) 322-7 through 322-10. However, if the presentation throughput minimum required to play the media program (at time $t_1$, for example), the present invention instead retrieves different versions of the advertisement so that playback can continue. For example, as shown in FIG. 3F, after time $t_1$, the media program player 304 requests segments AS1V1, PS7V2, and PS8V2, which are advertisement and media program segments of lower size and resolution that can be adequately transmitted over the communication channel and presented by the media program player 304. When the presentation throughput increases above the minimum necessary to play the media program, the next segments requested by the media program player 304 are the higher bandwidth versions of the media program PS9V1, PS10V1.

The illustrated embodiment does not take buffering of data segments or the possible prediction of presentation throughput into account. Hence, although it would have been desirable to retrieve advertisement segment AS1V2 instead of the larger AS1V1, the media program player 302 simply requests that the next delivered segment be suitable for the currently available presentation throughput and media program data rate. In one embodiment, the media program player 304 can predict presentation throughput changes, and request different versions of the media program and advertisements based on these predicted changes. In another embodiment, the media program player 304 buffers the received segments well in advance of when they are presented, so that if the presentation throughput changed and a currently buffered but not presented segment cannot be adequately presented, the media program player has time to request a substitute segment with reduced processing requirements and present that segment instead. Embodiments in which the media program player can predict the media program data rate (e.g. either using information regarding the media program data rate or by inferring the expected data rate from other factors) are also possible.

To implement this technique, a plurality of media program versions 322-326 are generated for the media program, with each one of the media program versions 322-326 generated for a different presentation throughput. For example, a number of media program versions 322-326 may be generated, each at different bit rates or average bit rates. Each of those media program versions 322-326 are separated into a plurality of media program version segments (e.g. 322-1 through 326N), some of which will be transmitted to the user devices 102. In the illustrated embodiment, media program version segments 322-1 through 322-N are generated for media program version 322, media program version segments 324-1 through 324-N are generated for media program version 324, and media program version segments 326-1 through 326-N are generated for media program version 326. These operations may be performed by a content segmentor or other device under control of the CMS 310. Similar operations are performed to generate a plurality of advertisement versions 328-332 and advertisement version segments 652-1 through 656-M.

Returning to FIG. 3B, we now discuss the transmission and reception of the media program 320 and advertisements in greater detail. As described above, a plurality of media program versions are generated by the media program provider (or another entity), with each version generated for a different presentation throughput than the other of the plurality of versions.

Using the user interface module 302, the user selects a media program for viewing, and the user device 102 transmits a request to the media program provider 110 for the media program. In the illustrated embodiment, the request comprises a user identifier (user ID) and an identifier of the requested media program, and is a request for metadata (in particular, the address of a master playlist for the media program) transmitted to a feed service 306. In one embodiment, the identifier of the requested media program transmitted with the metadata request is obtained from a program guide presented to the user via the user interface module 302. The program guide can include thumbnail representations of the media programs, and the user may select a media program by clicking on the thumbnail associated with the media program of interest.

A media program request for the media program is received. The feed service 306 ultimately responds to the ID request with the master playlist that is required to receive and view the media program.

A request for the address of the master playlist associated with the media program 320 is received from the user device 102. In one embodiment, the request includes data identifying the media program 320 of interest as well as data identifying the user 132, the user computer 102, and/or the media program player 304. This information can be used in embodiments in which advertisements selected for play in conjunction with the media program are selected based on user 132, user computer 102 or media program 304 data. The feed service 306 receives the request, and using information obtained from secure storage 312 and other databases 316, and the advertisement service 316 via the content management service 310, the feed service 306 determines the appropriate metadata for the selected media program, which may include the media program identifier (PID) and similar identifiers for any advertisements that are to be played along with the media program. This may be accomplished as described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. Alternatively, this process can be begun after the media program player 304 has selected which version of the media program 320 to begin with, as described below.

Figure 3G:
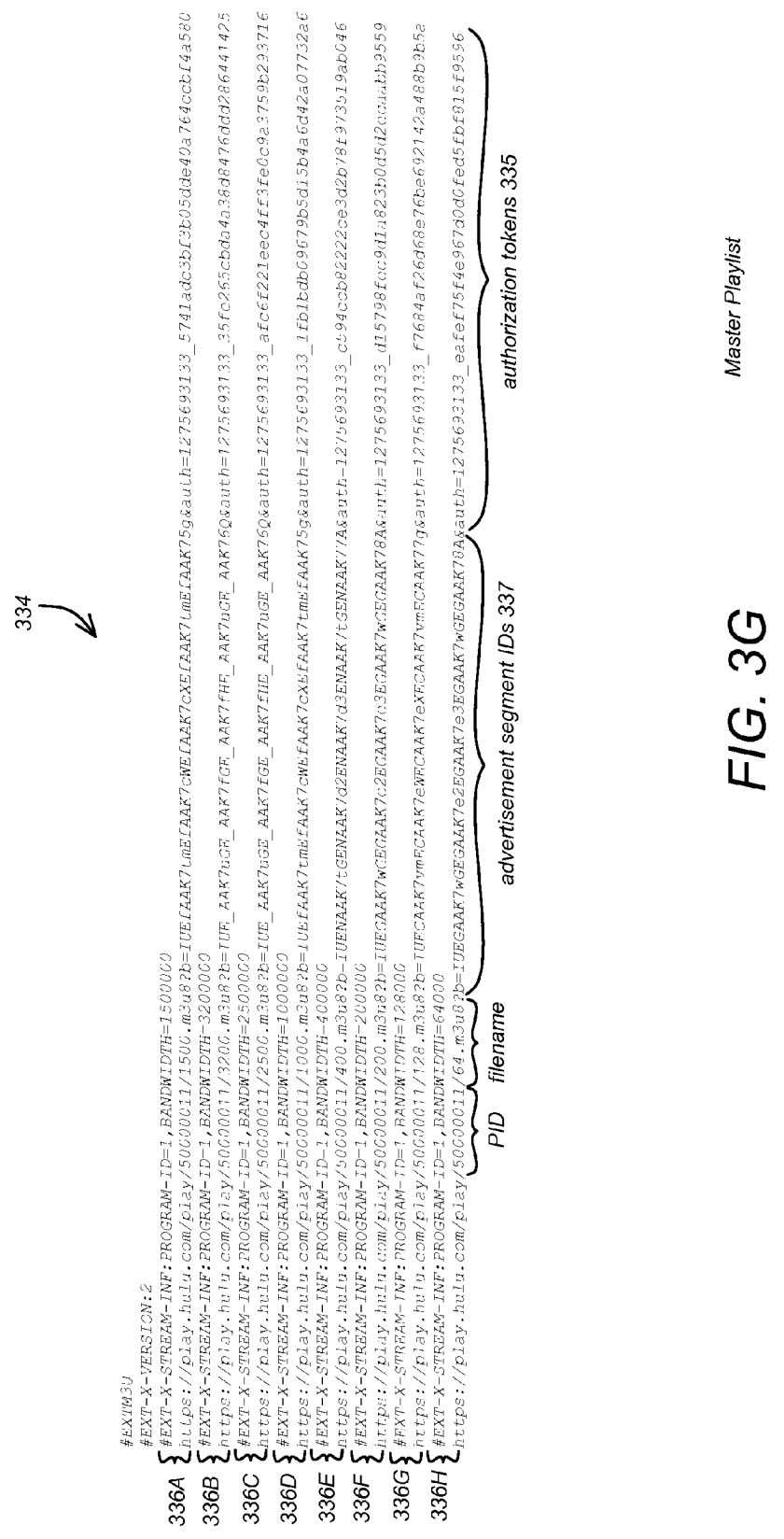

A master playlist is generated and provided to the user device 102. In one embodiment, this is performed by the content selector 308. An exemplary master playlist is shown in FIG. 3G, and is discussed further below. In one embodiment, the master playlist 334 is provided at an address that may include an identifier for each of the advertisements selected as described above.

For example, the master playlist address may be:
https://play.hulu.com/play/50000011/mplst/b=[adlist]a=[authentication token]
wherein "50000011" represents the media program ID (PID) and the "adlist" is a list of advertisement segment identifier(s) 904 for the advertisement(s) that were selected to be inserted into the program during playback. The master playlist 334 address is transmitted to the user device 102, as shown in FIG. 3B.

Next, the user device 102 receives the master playlist address 334, and transmits a master playlist request to the MPP 110. As described above, the address may include the PID of the media program 320 as well as a list of advertisement IDs that identify the advertisement(s) to be presented during playback of the media program 320.

The master playlist is received in the media program provider 110 at the master playlist address. A plurality of media program version addresses is generated, each having advertisement version segment identifiers 328-1 through 332-M for the advertisement version 328-332 associated with the requested one of the media program versions. The master playlist is created from the plurality of media program version addresses.

FIG. 3G is a diagram illustrating an exemplary master playlist 334. In this embodiment, the master playlist 334 has a file name that ends in ".m3u8" and/or has the content-type of "application/vnd.apple.mpegurl" and is a text file that comprises individual lines that are terminated by either a single LF character or a carriage return. Lines that start with the comment character '#' are either comments or tags, and tags begin with the letters EXT. All other lines that begin with '#' are comments and are ignored. The first line comprises an M3U tag, which identifies the file as an extended m3u file. Next, the master playlist has a tag describing the media program version whose URI or URL is presented on the following line. For example, 336A presents a tag that identifies the following:

PROGRAM-ID: If the master playlist refers to more than one media program, the PROGRAM-ID parameter identifies which of the plurality of media programs is involved. In the illustrated embodiment, the master playlist refers to several versions of the same media program, so the PROGRAM-ID is a 1. If multiple media programs were included in the master playlist, the second media program would have a PROGRAM-ID of 2, for example. This PROGRAM-ID is not to be confused with the PID, which refers to an identifier for the media program on a global basis, not just within the master playlist.

BANDWIDTH: identifies the average bit rate of the stream available at the URI listed on the following line. The media program player can determine the actual bandwidth by observing the download speed of the segments.

The URI follows the tag, and includes the PID (in the illustrated example, 50000011), the file name (in the illustrated example, the bit rate with the ".m3u8" extension), advertising segment identifiers 337 and a tokens 335 that may be used for authentication purposes. The advertisement segment identifiers 337 can be used identify segments 328-1 through 328-M, 330-1 through 330-M or 332-1 though 332-M. In one embodiment, the advertising segment identifiers 337 directly identify the advertisement segments. In another embodiment, the advertisement segment identifiers 337 are indexed to the associated advertisement segments, and the identifiers 337 can be used by the feed service 306 to look up the associated advertisement segments for transmission.

Note that the master playlist shown in FIG. 3G includes tags and the URI for eight different versions of the media program, with the streams identified by 336A, 336B, 336C, 336D, 336E, 336F, 336G, and 336H representing 1500 Kbps, 3200 Kbps, 2500 Kbps, 1000 Kbps, 400 200 Kbps, 128 Kbps and 64 Kbps, respectively. Although not typically the case, each of the advertisement IDs associated with each media program version address may differ from the advertisement IDs associated with other media program version addresses. The master playlist 334 is transmitted to the user device 102.

In the embodiment described above, the user ID was supplied with the request for the address of the master playlist 334 and used to select advertisements that are of greatest interest to the user 132. Identifiers for these advertisements are returned in the master playlist address transmitted to the user device 102, and later, also in the addresses for the media program versions in the master playlist itself. This feature allows the identity of the selected advertisements to persist between generation of the master playlist the requested media program version and also between the different program versions without maintaining advertisement states by the media program provider 110. Given the large number of user devices 102 serviced, this feature greatly simplifies housekeeping. For example, a representative master playlist address consistent with FIG. 3G is presented below:

https://play.hulu.com/play/50000011.m3u8?bitrate=1500&
cdn=v&bIUEfAAK7tmEfAAK7cWE
fAAK7cXEfAAK7tmEfAAK75g&m=1&d=4&auth=
1275693133_5741adc3bf3b05dde40a764cc bf4a580

In other embodiments, the list of advertisement(s) to be included with the media program may be generated after the master playlist address has been transmitted and before the master playlist is received, thus allowing the MPP 110 additional time to determine which advertisements will be streamed to the user device 102 and to generate the master playlist. For example, in embodiments wherein the user selects which advertisements will be played in conjunction with the media program 320 before the media program transmission and playback commences, the user device 102 may receive a master playlist address that excludes advertisement IDs, but the master playlist 334 itself may include advertisement IDs for the selected advertisements.

In other embodiments, the user ID is not transmitted and used to identify advertisements to replay with the media program. Alternatively, the user's identity is sufficiently ascertained using other information such as by the use of cookies, the IP address of the user (thus giving information that can be used to determine the geographic location of the user and thus providing information about the user that can be used to select advertisements).

Referring to FIG. 3B, the media program player 102 decides, given the expected presentation throughput and media program data rate (if available), which of the media program versions is most suitable for reception and presentation, and requests that media program version by transmitting a media program version request identifying one of the media program versions. In one embodiment, this is accomplished by requesting the particular media program version at the appropriate address shown in the master playlist. The initially chosen media program version may also be determined by viewer preference (e.g. the user may request a higher resolution version than would ordinarily be provided). In one embodiment, the media program version request comprises or is addressed to the URL or URI associated with the media program version that the media program player 102 selected. For example, if the media program player 102 selects the 1500 kbps version of the media program in the exemplary master playlist shown in FIG. 3G, the media program player transmits the URI of 802A, namely:

https://play.hulu.com/play/50000011/
1500.m3u8?b=IUEfAAK7 . . . 580 to the media program provider 110. The media program provider 110 receives the message and generates a segment playlist (or retrieves one that has been pre-generated) associated with the selected media program version. This is accomplished by generating an address associated with each of the plurality of media program segments of the media program version in the media program version request, and generating an address associated with each of the plurality of advertisement segments of the advertisement(s) that are selected to be presented during the media program. The segment playlist is generated with these addresses and appropriate tags. In one embodiment, the segment playlist is temporally ordered (the segments are requested and played in the order presented on the list), however, other embodiments are possible wherein the segment playlist is in an arbitrary order and the playback order is either implicit (known to both the transmitter and receiver) or specified in data transmitted to the user device 102.

FIG. 3H is a diagram showing one embodiment of a segment playlist 338. In the illustrated embodiment, the segment playlist comprises a list of addresses or uniform resource identifiers (URIs) associated with each of the media program segments 348A-348C of the requested media program version, and the advertisement segments 346A-346C of the advertisement version associated with the selected media program version In one embodiment, addresses or URIs are temporally ordered. This temporal ordering may be inherent to the list (each entry in temporal order) or an index may be provided so that the temporal relationship between the segments can be determined.

The segment playlist 338 may also include tags for the foregoing addresses and a pre-roll (before playback of the media program begins) advertisement tag 340 and discontinuity tags such as tags 342A, 342B. The discontinuity tags 342 indicate a discontinuity between the media file that follows it and the one that preceded it. The set of characteristics that may change include file format, number and type of tracks, encoding parameters, encoding sequence and/or timestamp sequence. In the example shown in FIG. 10, the discontinuities represent changes from a media program segment to an advertisement segment (discontinuity 342A, for example) or from an advertising segment to a media program segment (discontinuity 342B, for example).

Discontinuity tags can also be used to identify breaks between the media program 320 and advertisement opportunities 422 to implement the advertisement selection and monitoring techniques further described below.

The information in key line 350 of the segment playlist 338 identifies the authorization token that is used as a key to decrypt the segments identified subsequent segment playlist lines (e.g. segments identified by 348A, 348B, and 348C). The illustrated authorization token is an 83 character word, shortened with ellipses for illustrative purposes.

Since the transmitted segments are temporally short in duration, the user device 102 must transmit frequent requests for further segments to the MPP 110, even in the absence of trick play commands. This provides the MPP 110 (or the media server 114) with frequent information that allows it to confirm that the user device 102 is receiving and playing the media programs and advertisements Returning to FIG. 3B, the media program provider 110 transmits the segment playlist 338 to the user device 102. The user device 102 receives the segment playlist 338, and transmits segment requests to the media server 114, which retrieves the media program from storage 312 and transmits the requested media segments and advertisement segments to the user device. The user device 102 receives each media program segment and advertisement segment and plays them back to the user in the appropriate order.

In the foregoing embodiment, the segment playlist 338 was transmitted separate from and subsequent to the master playlist 334, but this need not be the case. Instead, the MPP 110 may send the master playlist 334 and one or all of the segment playlist 338 together in a single message. In this case, once the media program player 304 selects the media program version of interest, the user device 102 may then simply request the media program or advertising segment for the appropriate media program and advertisement versions using the already received segment playlist 334.

If the presentation throughput remains sufficient throughout playback of the media program and the associated advertisements, the media program player 304 simply continues to receive the media program segments and advertisement sections for the currently selected version. However, if the presentation throughput becomes insufficient for the currently selected media program version (for example, at time $t_1$ shown in FIG. 3F), the media program player 304 will instead select media program and advertisement segments from a segment playlist that provides the URIs for media program and advertisement segments that require less presentation throughput.

If the appropriate segment playlist 338 has already been provided to the media program player 304, the media program player 304 need only request the appropriate segments using the appropriate URIs listed in the segment playlist 338 for the appropriate media program and advertisement version.

If, however, the appropriate segment playlist 338 has not been provided for a second media program 320 version, a request is transmitted to the media program provider 110 requesting a segment playlist 334 for version of the media program and advertisements that is appropriate for the current or predicted presentation throughput. For example, in the exemplary master playlist shown in FIG. 3G, the media program player 304 may select a 1000 kbps version of the media program and advertisements for future segments. This can be accomplished by transmitting a second media program version request to the URI associated with the 1000 KBPS stream. In the example shown in FIG. 3G, this is the URI associated with 336D or:

https://play.hulu.com/play/50000011/1000.m3u8 . . . .

The media program provider 110 thereafter transmits a second segment playlist to the media program player. Like the first segment playlist, the second segment playlist is a temporally ordered list having an address associated with each one of the media program segments associated with the second selected media version and an address associated with each one of the plurality of advertising segments associated with the advertisement version associated with the second one of the media program versions. In other words, a segment list 338 with the lower bit rate media program segments and advertising segments is transmitted from the media program provider 110 to the media program player 304, where it is played.

Advertisement Selection and Control

FIGS. 4A-4F are diagrams illustrating exemplary method steps that can be used to provide one or more advertisements with a streamed media program having one or more advertising breaks.

FIG. 4A is a diagram illustrating exemplary method steps that can be used to provide an interface for the selection of advertising options by the user 132. In block 404, the user 132 enters a input on the user device 102 to request a advertising option control interface that can be used to specify advertisement control options. The user input can comprise a button or other control presented on the user device GUI 218B, for example. The user device 102 accepts the input and transmits data comprising a request to the media program provider 110. In one embodiment, the request comprises an identifier of the user 132 (if one exists) and data requesting the transmission of the advertising option control interface. In one embodiment, the user input is a control or applet that, upon activation, transmits a request to the MPP 110. The user 132 may provide input to the user device 102 indicating the user's desire to specify advertising preferences at any time, including before a media program 320 is played, during playback of the media program 320, during playback of an advertisement during an advertisement break of the media program, or after playback of the media program.

In one embodiment more fully described below, the user 132 is only permitted to specify advertising preferences if they are entitled to do so. Block 406 determines whether the user is entitled to specify advertisement control options. Such entitlement may be based on the user 132 providing some indicia of compensation to the media program provider 110 or third party, as further described below.

If the user 132 is not currently entitled to control the presentation of advertisements or specify advertising options, block 408 determines if the user 132 is qualified to be offered control of the advertisements presented to the user 132. Further details regarding these steps are illustrated and described with respect to FIG. 8, below. If the user 132 is not qualified, the user device 102 receives a non-qualifying message (e.g. "User-Control of Advertisements Not Permitted at this Time"). If the user 132 is qualified to be offered control of advertisements, block 410 transmits data from the media program provider to the user device 102. This data comprises instructions for commanding the user device 102 to present information offering to allow the user to specify advertisement control options in exchange for the user 132 providing an indicia of compensation. This data is received by the user device 102 and the offer is presented to the user 132 on the user device 102, as shown in block 412.

Returning to FIG. 4A, in block 414, the user 132 provides some kind of indicia of compensation for the entitlement to control advertisements presented with media program(s). As described in more detail below, the compensation provided may include user 132 registration with the media program provider 110 (for example, providing some identifying information such as the user's e-mail address), subscribing to the media program provision services offered by the media program provider 110 (for example, by paying a fee for expanded or different media program offerings, advertisement free playback of media programs or playback of media programs with reduced advertising), the completion of a survey regarding user 132 viewing or purchasing preferences and habits and the providing of that completed survey to the media program provider, the purchase of the media program that is streamed or progressively downloaded to the user device 102, or the purchase of qualifying products and/or services from third parties contractually associated with the media program provider. In one embodiment, the user 132 is entitled to greater control over the presentation of advertisements as they provide greater compensation. For example, simple registration may permit the user 132 to select from among a small set of advertisements for presentation, while a paid subscription may permit the user to select from among a large set of advertisements for presentation, limit the number of advertisements, and/or save them for later viewing.

The compensation can take the form of the user 132 providing personal profile or survey information about themselves and/or their viewing habits, ordering a product, completing a survey, or ordering a service. In the example of a user 132 wanting to view a media program without any advertisements, this can be accomplished by ordering a pizza, groceries, or any product or service from an authorized source, whether or not the source has any connection whatever to the chosen media program. In this situation the media program provider 110 may be compensated by the source from which the order was made, in the form of a percentage of the gross value of the sale, the profit of the sale, or by a fixed fee. Consequently, any user 132 desirous of viewing media programs without advertisements need only order their groceries (for example) using the media program provider 100. Another form of user compensation is the providing of services (such as advertising services) to the user or the user's designee at reduced prices or without charge. For example, if the user wants to support a charity such as CORAZON (www.corazon.org), they can designate as such, and the charity is provided the compensation instead of the user. For example, the designated beneficiary of the user compensation can be provided free advertising comprising a given number of views (known as charitable impressions), clickthroughs, or advertisements.

The purchase options presented to the user 132 may include only those which are related to the content of the selected media program (as determined by metadata associated with the selected media program), or may include products and services unrelated to the selected media program. The purchase options presented to the user 132 may include products and/or services from vendors who are in a pool of advertisers whose advertisements are shown using the CDS 300. Alternatively, the purchase options presented to the user may include products and/or services from vendors who are not advertisers (e.g. advertisements for the providers are not among those that can be presented to the user). A provider may join a group of product and service providers that wish to be listed as approved vendors that the user may order products and services from in order to obtain preferential advertisement options. For example DOMINO'S PIZZA may not wish to present advertisements using the foregoing system, but may wish to offer users the opportunity to view a media program without advertisements if the user 132 orders a pizza. The pizza order can be made on-line using the Internet 104, or can be made using an ordinary telephone, by providing the appropriate information to the vendor. For example, the vendor may be given a code comprising series of alphanumeric characters that entitle the bearer to compensated user options. When the user 132 orders the goods or service, they may be given the alphanumeric. The user 132 may enter the alphanumeric in the user interface in order to obtain the compensated user preference options. The price paid by the vendor for this feature may be a percentage of the sales or profits derived from the ordered product of service, or a flat fee.

The compensated user preference options may be available for a limited time, as determined by the media program provider 110 or the advertiser. For example, in the DOMINO'S PIZZA example above, the user 132 may be provided the compensated user preference options for a period of 24 hours after ordering the pizza.

In one embodiment, the providers of the products and services which may be ordered by the user 132 pay for the privilege of being included in the list of products or service providers that the user can choose from. In another embodiment, the providers of the products pay only when a user orders a product or service from the provider. In still another embodiment, the provider pays a fee for being included in the list that the user 132 can choose from and an additional fee is charged when the user orders a product or service from the provider.

In one embodiment, the user compensation is requested and provided after the user makes a request to view the media program. In other embodiments, the user may provide the compensation (for example, providing survey answers or ordering a product) before a request for the media program has been made. In such embodiments, the user can accumulate points for compensation provided by the user, and such points can be used to view media programs with fewer or no advertisements. Points may be valid for a period of time only, or may be valid until used. Points may also be managed by the user according to a user interface, indicating the points accumulated by the user.

An indicia of the provided compensation is transmitted from the user device 102 to the media program provider 110. In block 416, the indicia is received and verified to assure that the indicated compensation provided by the user was actually provided. For example, if the indicia of compensation provided is a credit card number, that number and other identifying information is verified to assure that any charge to that credit card number is legitimate and approved. Or if the indicia of compensation provided is registration information, block 416 may include transmitting a message to the associated e-mail address and conditioning acceptance based upon a message from the associated e-mail address verifying that the e-mail addressee approves of the registration. If the indicia of compensation is a survey, the survey may be analyzed to assure that the input provided was truly representative of the user's 132 response to the survey questions. For example, verification of a survey may assure that the user 132 did not simply select the first of all survey alternatives offered and may include the insertion of self validating survey questions.

If the indicia of compensation cannot be verified, a message is transmitted for presentation to the user 132 on the user device 102 indicating as such, identifying the problem and inviting the user 132 to provide alternate input. If the indicia of compensation is verified, block 416 passes processing to block 406. At this point, the user 132 is entitled to control advertisements, and block 406 passes processing to block 418, which generates advertising control/option selection interface data and transmits that data to the user device 102. In block 420, the user device 102 receives the advertising control/option selection interface data and presents it to the user 132 for viewing and selection. This data can include the advertising option interfaces described further below.

Although the foregoing describes a method by which advertising control options are presented to the user only in exchange for compensation, other embodiments may be realized in which no the user need not supply such compensation. This embodiment omits the dashed blocks shown in FIG. 4A.

FIG. 4A also illustrates an embodiment in which presentation of advertising control options to the user 132 is automatically initiated by the media program provider 110 at appropriate times, instead of at the user's initiative. For example, the media program provider 110 may initiate the transmission of advertising control options to the user at one or more advertising opportunities within the media program, as shown in block 402.

FIG. 4B is a diagram illustrating an exemplary representation of a media program 320. The media program 320 may include a one or more periods of time wherein an advertisement may be presented, including one or more prefacing (hereinafter alternatively referred to as "pre-roll") advertisements 420, one or more advertisement breaks 422(1)-422(N), each having one or more opportunities to present an advertisement 424, and one or more end advertisements 424.

Typically, only one pre-roll advertisement 420 is streamed and played before the streaming and playback of the media program 320 begins. However, more than one pre-roll advertisement may also be streamed and played back before streaming and playing back of the media program 320 beings. Pre-roll advertisements 420 are typically 5-10 second duration advertisements from a sponsor of the media program 320, and may display an icon or trademark representing the sponsor along with a short "this program brought to you by" audio narrative.

Advertisement breaks 422(1)-422(N) (hereinafter alternatively referred to as advertising break(s) 422) are temporally disposed between media program content portions 426(1)-426(M-1) (hereinafter alternatively referred to as program content portions(s) 426). As shown in FIG. 4B, each advertisement break 422 may have one or more advertisement opportunities in which an one or more advertisements 424 (or no advertisements) may be inserted.

FIG. 4B also shows where the temporal location where the steps shown in FIG. 4A may be initiated. An open triangle indicates temporal locations where the user 132 may provide a command to the user device 102 to control the presentation of advertisements, or alter/specify advertising options. As is indicated in FIG. 4B, this may occur at any time, from before the beginning of the media program 320 to after presentation of the media program 320. Thus, the user may initiate the transmission of the advertising option control data by selection of an appropriate control during the presentation of an advertisement, allowing the user to terminate playback of an advertisement and initiate the playback of another selected advertisement in it's place as further described below.

Also shown with a solid triangle (▲) are temporal locations within the media program at which the media program provider 110 may initiate the transmission of the data for the advertisement control option interface to the user device 102 for user 132 selection. These temporal locations include at the beginning of the pre-roll advertisement 428A, at the end of the pre-roll advertisement 428B, at the beginning of the advertising break 428C, at the beginning of an advertisement within the advertisement break but not at the beginning of the advertisement break 428D, at the beginning of the end advertisement 428G or at the end of the end advertisement 428H.

Figure 4C:
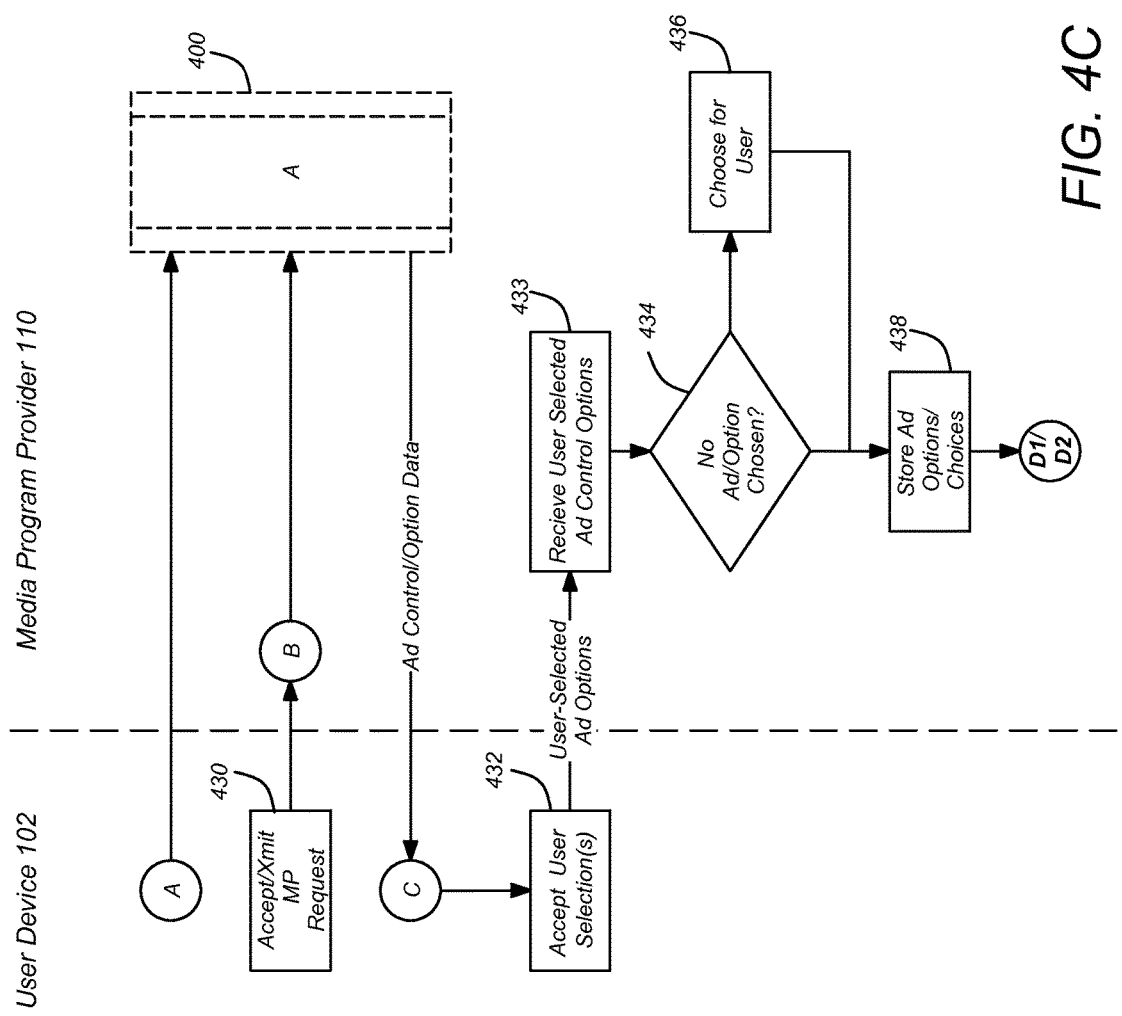

FIG. 4C is a diagram illustrating method steps by which the user 132 may be presented with advertisements. If the user 132 initiates the request for the advertisement control/option interface, processing arrives from source A and the processing steps described in FIG. 4A may be performed to transmit data for the advertising control option interface to the user device 102. In addition, the user 132 may enter a request for a media program 320 in the user device 102, and at the appropriate time as described above, the media program provider 110 may initiate the transmission of data for the advertisement control/option interface, as shown in block 430. As previously described, such transmission of data may occur at the beginning or end of any advertising opportunity 422, including the beginning or end of a pre-roll advertisement 420, beginning or end of an end advertisement 425 or the beginning or end of any advertisement 424 presented in conjunction with the media program 320.

The user device 102 receives the advertisement control option interface data and presents the advertisement control options to the user 132. The user 132 selects advertising control options, and the user device 102 transmits data comprising those user-selected advertising control options to the media program provider 110, where they are received as shown in block 433. The media program provider 110 then stores the user-selected advertising control options for use, as shown in block 438.

In one embodiment, the user input directly defines user preferences regarding the presentation of advertisements in the media program. In this context, user input "directly defining" is to be distinguished from indirect user input that can be used to identify appropriate advertisements. For example, it is known to monitor a user's clickstream to determine which advertisements are supplied to a user 132 within webpages. However, while the clickstream may indirectly define which advertisements are presented, it does not define which advertisements are presented during a presentation of the media program and does not directly define the advertisements that are presented. At best, in this case, the user's desires regarding advertisements are inferred from the clickstream, they are not directly provided. One example of direct definition of advertisement preferences is the case where the user 132 is provided with a list of advertisements, and allowed to choose which advertisements of those on the list they would like to view. Another example of direct definition of advertisement preferences is indicating how the advertisements are to be temporally presented.

In one embodiment, if the media program provider 110 does not receive data describing the user-selected advertising control options within a specified period of time (for example, 30 seconds), those advertising control options are chosen for the user, as shown in block 436. In one embodiment, those advertising control options are selected based on past choices or input made by the user 132. For example, as described further below, in one embodiment, the advertising control options permit the user to select only one of a plurality of specific advertisements for streaming and playing with the media program 320. If the user 132 makes such a selection, that selection is stored in block 438 and the selection of that specific advertisement is later used to make specific advertisement choices for the user. For example, if the user selected a specific advertisement that is known to be humorous, the media program provider 110 may choose a similarly humorous advertisement to be played if the user 132 makes no choice. This embodiment is particularly useful in cases wherein the media program provider 110 initiated the presentation of the advertisement control option interface. In cases wherein the user 132 initiated the presentation of the advertisement control option interface and no user input is received within a particular time span, the interface may simply be removed and playback of the media program 320 or advertisements 424 simply resumed from where they stopped when the user initiated the interface.

Transmission and Monitoring of Advertisements

Figure 4D:
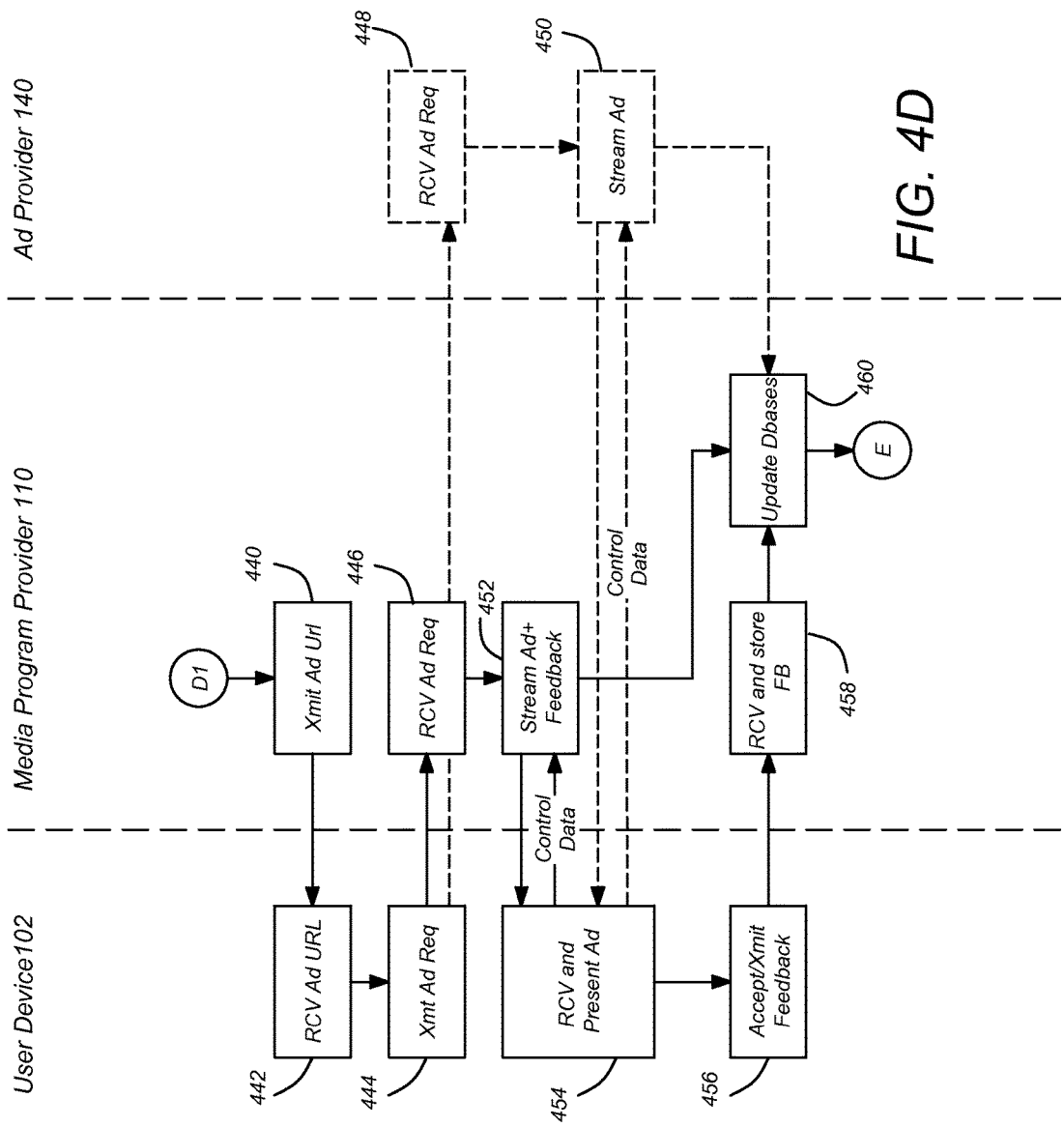

FIG. 4D is a diagram of exemplary method steps that can be used to transmit advertisements (including specific selected advertisements) to the user 132. In block 440, a resource locator such as an address or URL is transmitted from the media program provider 110 to the user device 102. The user device 102 receives the resource locator and transmits a request for the associated advertisement to the media program provider 110, as shown in blocks 444 and 545. The media program provider 110 receives the request, and streams the associated advertisement to the user device 102 as shown in block 452. The user device 102 receives the streamed advertisement and presents the streamed advertisement to the user 132 as shown in block 454.

In one embodiment, in addition to the advertisement, additional data is transmitted to the user device. This additional data, when received and processed by the user device 102, presents an interface by which the user 132 can provide feedback regarding the advertisement. The interface for entering the feedback may be implemented such that the user 132 may enter the feedback while the advertisement is being streamed and replayed, and may be a simple yes or no question (e.g. "Is this advertisement relevant to you?") or may be such that the user cannot provide feedback until the advertisement has completed playing, and the user 132 may provide a more detailed response as to whether they like the advertisement or not. The user device accepts feedback entered by the user into the user device 102 and transmits that information to the media program provider 110, where it is received and stored, as shown in blocks 456 and 458. That data is used to update the database 315 used by the ad service 316 to determine candidate advertisements to present to the user 132 for future selection by the user 132 or to simply select advertisement for showing to the user.

In one embodiment, the advertisement provider 140 or media program provider 110 monitors the streaming of the advertisement to the user device 102 to ascertain whether and/or to what extent the user 132 has actually viewed the advertisement. This is particularly important in advertising paradigms wherein advertisers pay for advertisements according to the number of times the advertisement is actually viewed by a user.

This may be accomplished in two ways: (1) via use of control data used by the transport/transmission protocol of the streamed media program, or (2) by the use of a beacon service layered over the transport/transmission protocol. Both of these techniques provide information regarding the playback of the advertisement to the media program provider 110 via the same communication channel that is used to stream the advertisement to the media program player 304. Both techniques also have the advantage of transmitting the information in the same temporal session in which the media program and the advertisement are transmitted to the user device 102 and the same communications channel or network interface in which the advertisement is streamed to the user device. In other words, the same interface is used to steam the media program and/or advertisement as is used to send the data describing the viewing of the media program and/or advertisement (beacon or control data). Both also provide the information to the source of the advertisement (e.g. the advertisement provider 140 or the media program provider 110) on an immediate basis, since the control messages and beacons are received by the source as the media program player 304 requests changes in the playback of the advertisement or events occur in the media program player.

Monitoring Via Standard Transport/Transmission Protocols

If the user is permitted to use trick-play functions with respect to the advertisement (e.g. pause, fast forward, rewind, slow play, slow reverse, play from a different temporal location in the advertisement), the media program player 304 implemented in the user device 102 will transmit control data to the media program provider 110 instructing the media program provider 110 (and the media server 114) to transmit an advertisement stream associated with the command. For example, if the user selects a control on a progress bar and attempts to move the playback of a 30 second advertisement forward 10 seconds, the media program player 304 will transmit control data to the media program provider 110 or ad provider 140 to cease transmitting the previous stream and to transmit a different stream. This control information is used by the media program provider 110 to assess whether the user 132 has actually viewed the advertisement, or whether the advertisement was skipped. This information can also be used to identify which portions of the advertisement were of greatest interest (e.g. in cases wherein the user 132 commands rewinding of the advertisement or uses the progress bar to commence streaming from a temporal location earlier in the advertisement than the current location). This control information may comprise RSTP control messages, RTCP receiver reports or analogous data.

Monitoring Via Augmented Transport/Transmission Protocols

Alternatively or in addition to the monitoring via the standard transport/transmission protocols described above, the user's viewing of advertisements may also be monitored via a beacon service layered over the standard transport/transmission protocols.

The beacon service comprises applications using protocols layered upon the transport/transmission protocol that permit the transmission of beacons from the media program player 304 to the source of the streamed advertisement or program (e.g. the media server 114 or advertising server 140). This includes applications and objects executing in the media program player 304 and the associated server 114/140. The beacon service also comprises a set of transfer protocol endpoints that can be accessed by the media program player 304 executing in the user device 102 to transfer information regarding playback of media programs and advertisements. In one embodiment, the transfer protocol endpoints are HTTP endpoints described by a URL. This is accomplished by the media program player 304 detecting an event and making an appropriate beacon call to the endpoint or URL associated with the detected event.

Beacon calls may include (1) a configuration beacon call, (2) an embed URL beacon call, (3) an "open application" beacon call, (4) for each media program or advertisement, an initial session call and beacon calls made during the session's duration, and (5) a "close application" beacon call.

The beacon calls all share the same parameter types and names, and share a similar structure for the endpoint URL of the calls:

http://HOST/v3/BEACONNAME/EVENTTYPE?COM-
  MONPARAMS&
  SPECIFICPARAMS& cb=RANDOM
wherein:

"BEACONNAME" is a required string defining the beacon name; "EVENTTYPE" is a required string containing the name of the event as defined by the configuration response;

"COMMONPARAMS" is a set of {field=value&field=value&field=value ... } URL parameters corresponding to the set of common parameters as further defined below, which are transmitted on every call, if available;

"SPECIFICPARAMS" is a set of {field=value&field=value&field=value ... } URL parameters specific to the event being transmitted; and "RANDOM" is a random, pseudo-random, or time-based value used to ensure that no entities (for example, the user's Internet service provider) return a cached response from a previous request. The use of a random identifier ensures that the request is unique, and thus also ensures a unique response.

COMMONPARAMs includes URL parameters that common to and included with every beacon call, including a (1) globally unique identifier for the current media program player session (a persistent new value is generated if one does not already exist each time the media program player 304 is started up and used for every beacon call for every beacon call during the session (2) a globally unique identifier for the user computer 102, (3) a player mode parameter indicating whether the media program and advertisements are being played back on the media program provider's website, whether the media program player 304 is embedded in a non-media program provider's website, and (4) a position parameter indicating the amount of playback progress of the media program/advertisement at the time the media program player "event" took place.

After media program player startup, a configuration beacon call is made to the beacon service's configuration host (typically implemented in the MPP 110) to retrieve a list of events and related beacon calls that are supported by the media server 114 or advertising provider 140 (hereinafter, "server"). The media program player 304 thereafter uses this list to define media program player events that will trigger the transmission of a beacon call, the endpoint associated with the beacon call (e.g. the URL) and what information is included in the beacon call. The use of the configuration call allows the MPP 110 to remotely define and control which media program player events will result in a beacon call.

Optionally following the configuration beacon call is an embed URL beacon call, which communicates the embed URL for the currently loaded media program player 304 to the server. If the URL is not known or the media program player 304 is not embedded, this beacon call need not be transmitted.

After the configuration beacon call, the first beacon call of each session is a STARTUP beacon call, which includes the common parameters described above. APPOPEN and APPCLOSED beacon calls are made whenever a mobile or desktop application starts up.

Beacon calls may also be made for any or all of the following advertising-related events, as determined by the events and endpoints returned from the configuration beacon call described above.

| Beacon Call | Event | Data |
| --- | --- | --- |
| REQUEST | Media program player makes request to advertising server for an advertisement in a given ad pod | Ad pod number |
| HTTPSTREAM ERROR | General advertisement playback error | Ad pod number Reason for error |
| SPECIAL | Specific advertisement playback error | Ad pod number Reason for Error |
| PODSKIPPED | Ad pod encountered, but no ad shown | Ad pod number Reason pod was skipped |
| START | Ad begins playback | Ad pod number Ad server's ad ID Ad server's ad placement ID Ad length |
| POSITION | Playback Progress (called when had has been shown 25, 50, 75%) | Ad pod number Ad server's ad ID Ad server's ad placement ID Elapsed time ad has been played back Elapsed time since last position event |
| END | Ad completed playback | Ad pod number Ad server's ad ID Ad server's ad placement ID Elapsed time ad has been shown Elapsed time since last position event Preceding content volume Ad playback volume |

-continued

| Beacon Call | Event | Data |
|---|---|---|
| ASSET IMPRESSION | Tracks that an ad banner was rendered by the client computer. | Ad server's Ad ID Ad servers placement ID |
| PAUSE | User selected pause during ad playback | Ad pod number Ad server's Ad ID Ad server's placement ID Elapsed playback time when pause selected Ad source (if not MPP 110) |
| PLAY | User selected play while ad playback was paused | Ad pod number Ad server's Ad ID Ad server's placement ID Elapsed playback time of ad already shown Ad source (if not MPP 110) |
| MUTE | User selected mute while ad is being played back | Ad pod number Ad server's Ad ID Ad server's placement ID Elapsed playback time when mute selected Ad source (if not MPP 110) |
| UNMUTE | User selected unmute while ad is being played back | Ad pod number Ad server's Ad ID Ad server's placement ID Elapsed playback time ad already shown Ad source (if not MPP 110) |
| CHANGE VOLUME | User selected new volume while playing back ad | Ad pod number Ad server's Ad ID Ad server's placement ID Elapsed playback time ad already shown Old volume New volume Ad source (if not MPP 110) |
| VOLUME OPEN | User opens volume icon in player | None |
| VOLUME CLOSE | User selects closes volume icon in player | None |
| CLICK | User clicks on playing or paused video ad in player, overlay ad or companion ad before click action is taken | Ad pod number Ad server's Ad ID Ad server's placement ID Ad type clicked on (video, multiple ad choice, poster of a movie selector, companion banner, interstitial slate) Ad source (if not MPP 110) |
| SELECT | User makes an interactive ad choice (ad selection) (e.g. selecting ad as described in bock 432 of FIG. 4C) | Ad pod number Ad server's Ad ID Ad server's placement ID Ad type clicked on (video, multiple ad choice, poster of a movie selector, companion banner, interstitial slate) Ad source (if not MPP 110) |
| ADSWAP/ SELECT | User makes an interactive ad choice (ad selection) to interrupt one ad and select another (e.g. interrupting playback of an ad to select another as described in FIG. 5B and FIGs. 16A-16D) | Ad Server 140 creative ID for the ad being swapped out Ad Server 140 creative ID for the ad being swapped in Position of the thumbnail that is being swapped in |
| VOTE | User indicates ad is relevant or not (like or dislike) (e.g. block 456 of FIG. 4D) | Ad pod number Ad server's Ad ID Ad server's placement ID Ad type on (video, slate) Ad source (if not MPP 110) |
| MOUSEOVER | User mouseovers an active area of an ad | Ad pod number Ad server's Ad ID Ad server's placement ID Position ID for the position triggering the mouseover event Ad source (if not MPP 110) |

In the foregoing:

Ad pod number is a sequential number for the ad opportunity 422. For example, ad opportunity 422(1) may be ad pod number one, wherein ad opportunity 422(2) may be ad pod two.

The Ad server's ad ID is the identifier for the advertisement being played used by the advertisement server 140 or MPP 110.

The Ad server's ad placement ID is a campaign-specific identifier for the advertisement's placement (format) within the ad pod. For example, the ad placement ID may indicate that the advertisement is a companion banner advertisement or a video commercial. An advertisement campaign can have a "video commercial" placement that has multiple creative assets or advertisements associated with it. This allows the advertiser to purchase a single ad placement yet specify, for example, three different advertisements videos to play in that slot. Since the ad placement ID is campaign-specific, the ad placement ID for this campaign differs from the ad placement ID for all other campaigns.

The Ad length is a string representation of the number of milliseconds that an advertisement is expected to be shown.

The ad provider 140 may stream some or all of the advertisements to the user device 102 instead of or in addition to the media program provider 110. This is illustrated by the dashed lines in FIG. 4D. In one embodiment the ad request from the user device 102 in block 444 is transmitted directly to the ad provider 140, who responds by streaming the advertisement directly to the user device 102. The ad provider 140 receives the control messages/beacon calls directly from the user device 102 and transmits these control messages to the media program provider 110 so that they may be used to update the databases as shown in block 460. Such messages can be transmitted in real time (as they are received) or near real time, or may be batched for later transmission.

FIG. 4E is a diagram illustrating the transmission of the media program 320 to the user device 102. In block 470, the media program provider 110 transmits a resource locator for the media program 320 to the user device 102. The user device 102 receives the resource locator and transmits a media program request to according to the resource locator, as shown in blocks 472 and 474. In one embodiment, the resource locator is an address such as a URL, and the media program request is transmitted from the user device 102 to the media program provider 110 or media server 114 at the address. The media program provider 110 receives the request and streams the media program to the user device 102 as shown in blocks 476 and 482. The user device 102 receives the streamed media program 320 and presents it to the user 132.

As described in FIG. 4B, the media program may comprise a plurality of portions 426 that together constitute the media program without advertisements. The steps shown above in FIG. 4E can therefore refer to the request and transmission of each of the portion 426 of the media program such that each portion is separately requested and separately streamed.

Further, as illustrated in FIG. 4D, the media program (or portions) may be hosted on a third party server 120. In this case, the resource locator transmitted to the user device 102 from the media program provider 110 is an address to the third party server 120. The user device 102 transmits the media program request to the third party server 120 at the address, and the third party server responds by streaming the media program 320 directly to the user device 102 as shown in blocks 478-480.

Figure 4F:
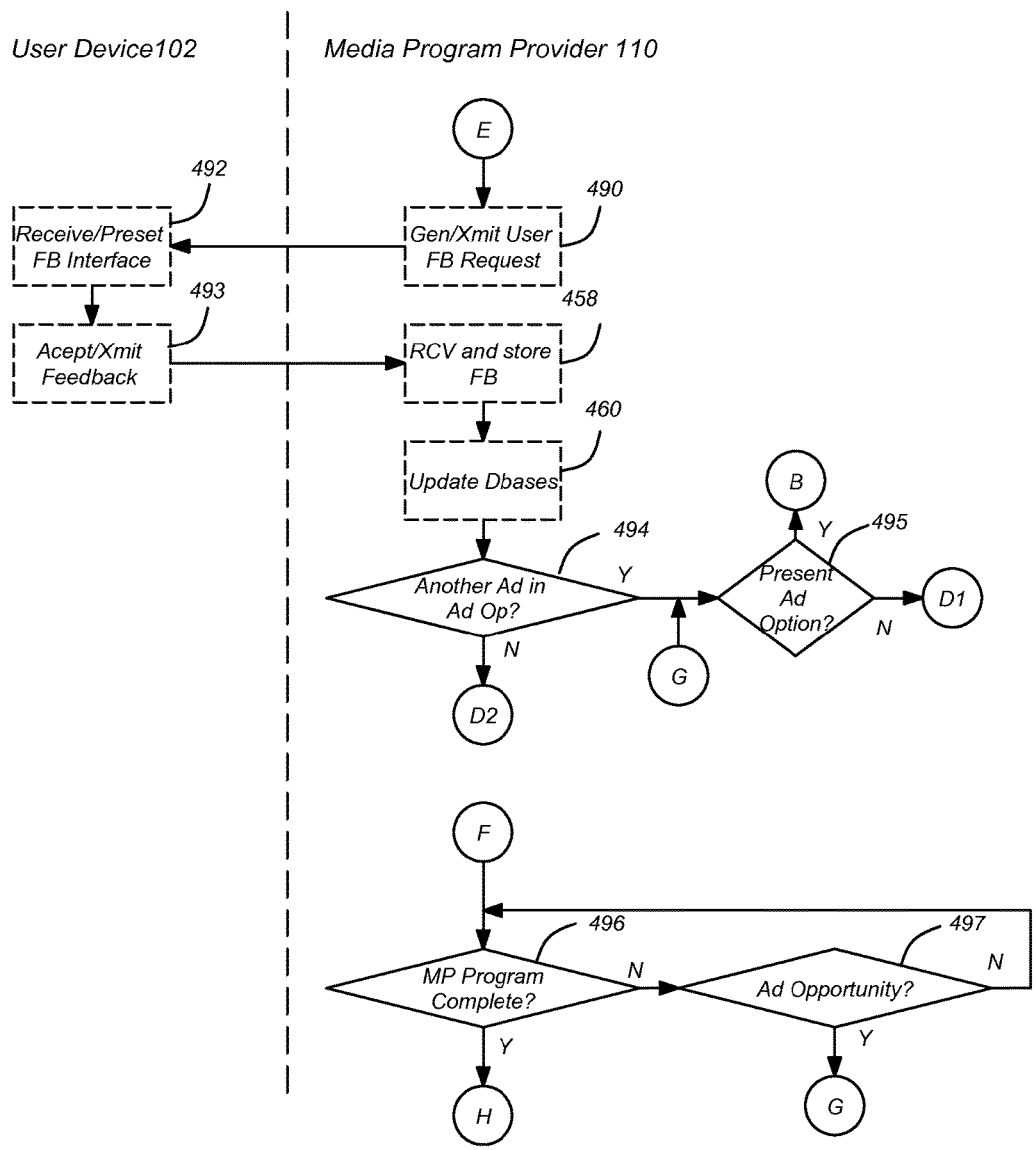

FIG. 4F is a diagram showing further method steps that can be used to practice embodiments of the invention. As indicated above, the user 132 may be queried for feedback regarding the advertisement while the advertisement is being played by the media program player 304. In addition to or in the alternative, user 132 feedback regarding the advertisement may be solicited after the advertisement has completed playback. This is shown in dashed blocks 490-493. After the advertisement has completed playback, a user feedback interface data may be generated, and transmitted to the user device 102 as shown in block 490. The user device 102 receives the user feedback interface data and presents the interface to the user 132. The user 132 enters feedback regarding the advertisement and this information is transmitted to the media program provider 110 as shown in block 493. The media program provider 110 accepts the feedback data, stores it, and uses it to update databases, as shown in blocks 458 and 460. This data is used by the ad service 316 to generate future advertising options to the user 132, including the identification of which specific candidate options may be presented to the user for selection at the next advertising opportunity.

If there is another advertisement to be played in the current advertising opportunity, decision block 494 routes processing to decision block 495. Decision block 495 routes processing to "B" as shown in FIG. 4A if ad options are to be presented to the user before the next advertisement begins streaming (for example, to give the user 132 another opportunity to choose advertisements). If advertising options are not to be presented, processing proceeds to "D1" on FIG. 4D and another advertisement is streamed. If there is no other advertisement presented in the advertisement opportunity 422, processing routes to "D2" as shown in FIG. 4E and the streaming of the media program begins or if it was interrupted to present the advertisement, is continued. After streaming of a portion or all of the media program, processing enters from "F" as shown in FIG. 4E to decision block 496. If the streaming of the media program 320 is complete, processing is routed to "H" where the process awaits further user media program selections. If the media program 320 has not completed playback, processing is passed to block 497, which determines if another advertisement opportunity 422 has been encountered. If so, processing is routed to "G" which routes processing to block 495. If not, processing is looped back to decision block 496 to continue streaming of the media program 320.

Figure 5B:
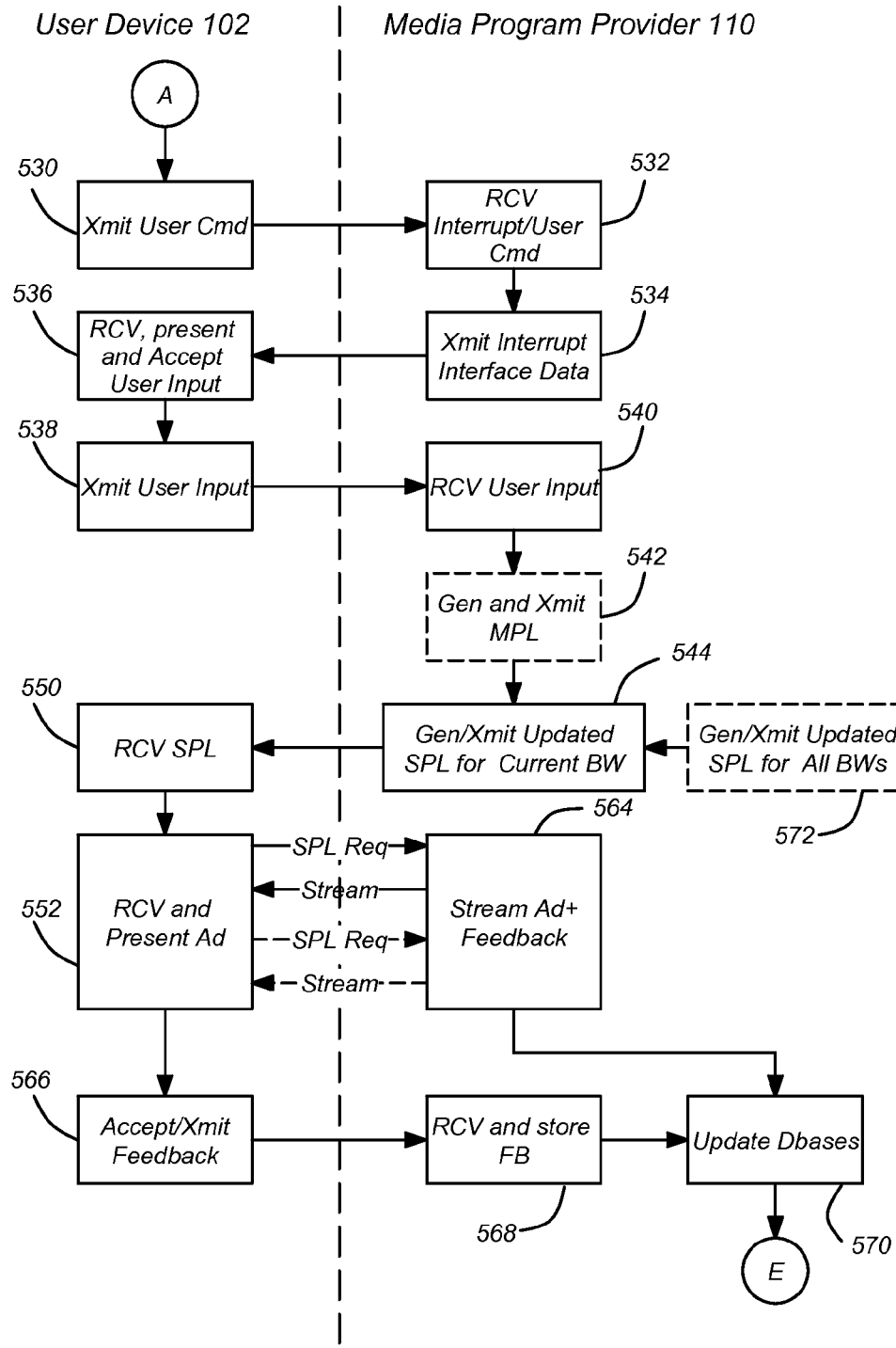

FIGS. 5A and 5B are diagrams illustrating how advertisements may be streamed using a live streaming protocol. FIG. 5A illustrates an embodiment in which the user 132 selects advertising options before playback of the media program 320 begins. In this case, the MPP 110 can generate a master play list 334 and a segment playlist 338 includes the URIs to each advertisement version. In block 502, the MPP 110 transmits the master play list 334 to the user device 102.

The user device 102 requests an version of the media program and advertising that is consistent with the transmission bandwidth and presentation processing capabilities of the user device 102 and communication channel, as shown in block 506. The MPP 100 receives this request, generates a segment play list 338 consistent with this request, and transmits the segment play list 338 to the user device 102. The MPP 100 may also transmit an SPL for one or more of the other versions of the media program and advertisement. In block 516, the user device 102 receives the SPL and transmits requests to the MPP 110 (or ad provider 140) to stream the appropriate segments of the media program 320 or advertisements to the user device 102 as described earlier herein. The user device 102 may accept and transmit feedback regarding the advertisement that is stored and used to update databases, as shown in blocks 518-522. As was true in the ordinary streaming embodiment, streaming information or beacons may be used to determine whether the user 132 has viewed the advertisement and/or media program.

If the advertisement choices made by user 132 remain unchanged as the media program 320 and advertisements are presented, the user device 102 need only choose different versions of the media program and the advertisement according to transmission and presentation limitations. However, if the user 132 desires to interrupt the presentation of an advertisement to select another, processing proceeds as shown in FIG. 5B.

FIG. 5B illustrates exemplary method steps that can be used to interrupt the presentation of a media program or advertisement, then provide advertising control input. In block 530, the user device 102 accepts and transmits a user command to provide advertising control input either during media program playing or advertisement playing such as the ADSWAP/SELECT beacon described above. The MPP 110 receives the user command and transmits data that can be used to implement the user interfaces described herein. This is illustrated in blocks 532 and 534. The user device 102 receives the user interface information, and presents it to the user 132 who provides user input regarding advertisement preferences and control. Data describing this user input is transmitted to the MPP 110 where it is received, as shown in blocks 540 and 538.

According to the supplied user input and/or other information in databases 325, the advertising service 315 selects another set of advertisements to present to the user 132 in conjunction with the media program. The MPP 110 then generates an updated segment playlist 338 that includes the URI to the advertising segments of the another set of advertisements, and transmits that updated segment playlist to the user device 102, as shown in block 544. In one embodiment, only the segment playlist 338 for the current (interrupted) version of the advertisement and/or media program is generated and transmitted, and the updated segment playlists 338 for other versions advertisement and/ or media program are generated and transmitted at a later time, either when the user device 102 requests a different version due to communication channel bandwidth or presentation processing constraints, when the MPP 110 processing load permits, or when required to respond to user input. In other embodiments, the segment playlist 338 for all versions are generated and transmitted at the same time, as shown in block 572.

In one embodiment, the newly generated segment playlists can use the URIs as the segment playlists generated before the accepted user input. This relieves the MPP 110 from the task of generating and transmitting another master playlist to the user device (although this may also be performed, as shown in block 542. For example, if segment playlist 338 shown in FIG. 3H is associated with element 336A of the master playlist shown in FIG. 3H, a new segment playlist 338 may be generated, but still associated with the address shown in 336A.

The generation of new segment playlists 338 is also facilitated by use of the discontinuity tags such as tag 342. Referring again to FIG. 3H, the discontinuity tags 342 can be used to delineate which portions of the segment playlist 338 must be regenerated to reflect the user's commands and selections and which need not. For example, if the advertisement segments referred to by elements 346A-346B refer to an advertisement that is interrupted and replaced with another advertisement, the computation of the updated segment playlist 338 requires only a recomputation of items 346A-346C. Items 348A-348C refer to the media program, and need not be changed. Accordingly, the updated segment playlist 338 may be generated expeditiously, and without requiring changes to the master playlist 334 or the other segment playlists 338. New segment playlists may also be generated without use of discontinuity tags.

Although not shown in FIG. 5B for the sake of drawing simplicity, advertisement streaming may be performed by the advertisement provider 140 and data related to that streaming provided to the MPP 110 as described above.

Indicia of Compensation

As described above, the user 132 may be offered to provide some indicia of compensation, and in return, become entitled to control the presentation of advertisements. In the embodiment shown in FIG. 4A, the user 132, upon a user-initiated request to control advertisements or upon media program player 110 initiation, a check is made to determine if the user 132 is entitled to control the presentation of advertisements, and if not, the user is provided with an offer to remit an indicia of compensation in exchange for that entitlement. If the indicia is provided and is verified, the user 132 is provided with an interface by which the advertisements presented with the media program(s) may be controlled.

The provision of an indicia of compensation may entitle the user 132 to control the presentation of a single advertisement, the presentation of a plurality of advertisements to be presented in conjunction with a particular media program (for example, the media program currently requested or playing) or all media programs.

Control of Single Advertisement by Providing Single Survey Response

Figure 6A:
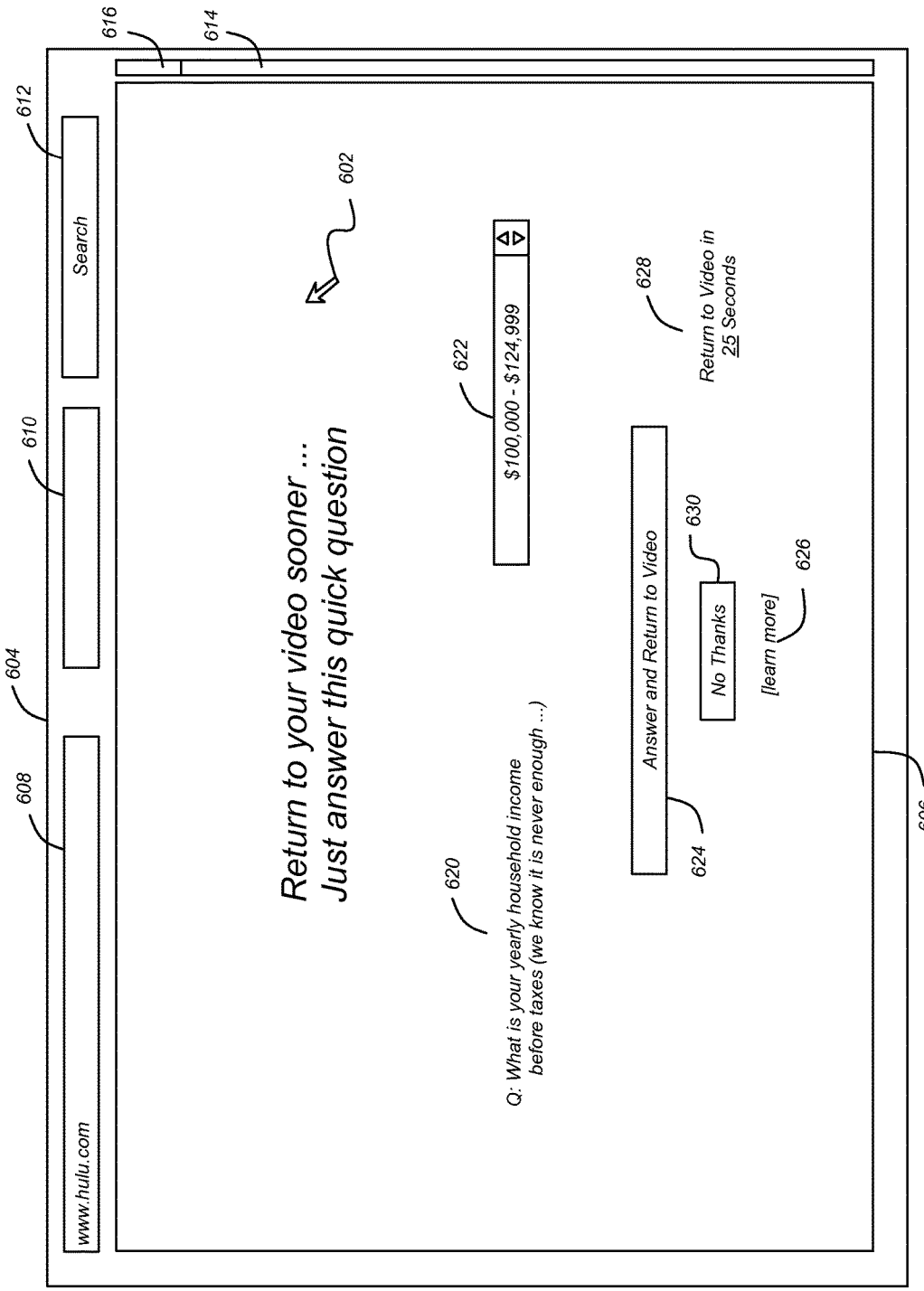
FIG. 6A is a diagram illustrating one embodiment of a user interface by which a user 132 may provide an indicia of compensation so that they may be entitled to control an advertisement presented with media programs.

FIG. 6A is a diagram illustrating one embodiment of a user interface by which a user 132 may provide an indicia of compensation so that they may be entitled to control an advertisement presented with media programs. In this example, the user is presented with an interface to request that they provide survey information. In this embodiment, by answering a single survey question, the playback of the advertisement is skipped as shown in block 419 of FIG. 4A, and if no other advertisements are scheduled during this advertisement opportunity, playback of the media program begins or resumes immediately.

As illustrated, the user interface 600 comprises a selector 602 controlled by the pointing device 216 to select elements presented in the GUI 218B, which include a browser 604 presenting window 606 on the display 222. The browser 604 may include an address box 608, allowing the user to enter a URL of a desired website, a search input box 610, a search control 612, a scroll bar 614 and scroll tab 616. The user 132 may perform a search of the Internet for websites of interest by entering keywords in the search box 610 and selecting the search control 612. The user 132 may also navigate webpages extending beyond the display by manipulation of the scroll tab 616 along the scroll bar 614.

The window 606 presents a survey question 620 and an input control 622 for entering an answer to the survey question 620. In the illustrated embodiment, the input control 622 provides a means for selecting one of a plurality of possible answers. The user 132 selects the answer by selecting the input control 622 and depressing the answer control 624. If the user 132 would like more information regarding the survey, the question, or how the question is used, they can select the "learn more" control 626.

In one embodiment, a timer 628 is presented to indicate that the user has a period of time to respond to the offer to answer the survey question. The timer 628 presents the time remaining before the automatic action is taken. In one embodiment, if no input has been received when the timer 628 reaches zero, playback of an advertisement or video simply returns and the user 132 is not entitled to control the advertisements presented with the media program.

In the foregoing embodiment, completion of the survey (or providing a single survey answer) is sufficient to provide the indicia of compensation necessary for the user to be entitled to control advertisements presented with the media program(s) played for the user. In other embodiments, the user's entitlement to control advertisements is not conditioned on the provision of an indicia of compensation. Hence, the survey presented above (or more detailed surveys, as discussed below) may be offered to the user either without providing any compensation to the user (other than better advertisement and/or media program recommendations) or by providing compensation other than advertising control (for example, a free subscription for a limited period of time).

If the user 132 selects the "No Thanks" control 630 shown in FIG. 6A, or if the timer 628 runs out, the indicia of compensation is not provided, and the scheduled advertisement is played for the user 132 before beginning or resuming the playback of the media program 320.

Figure 6B:
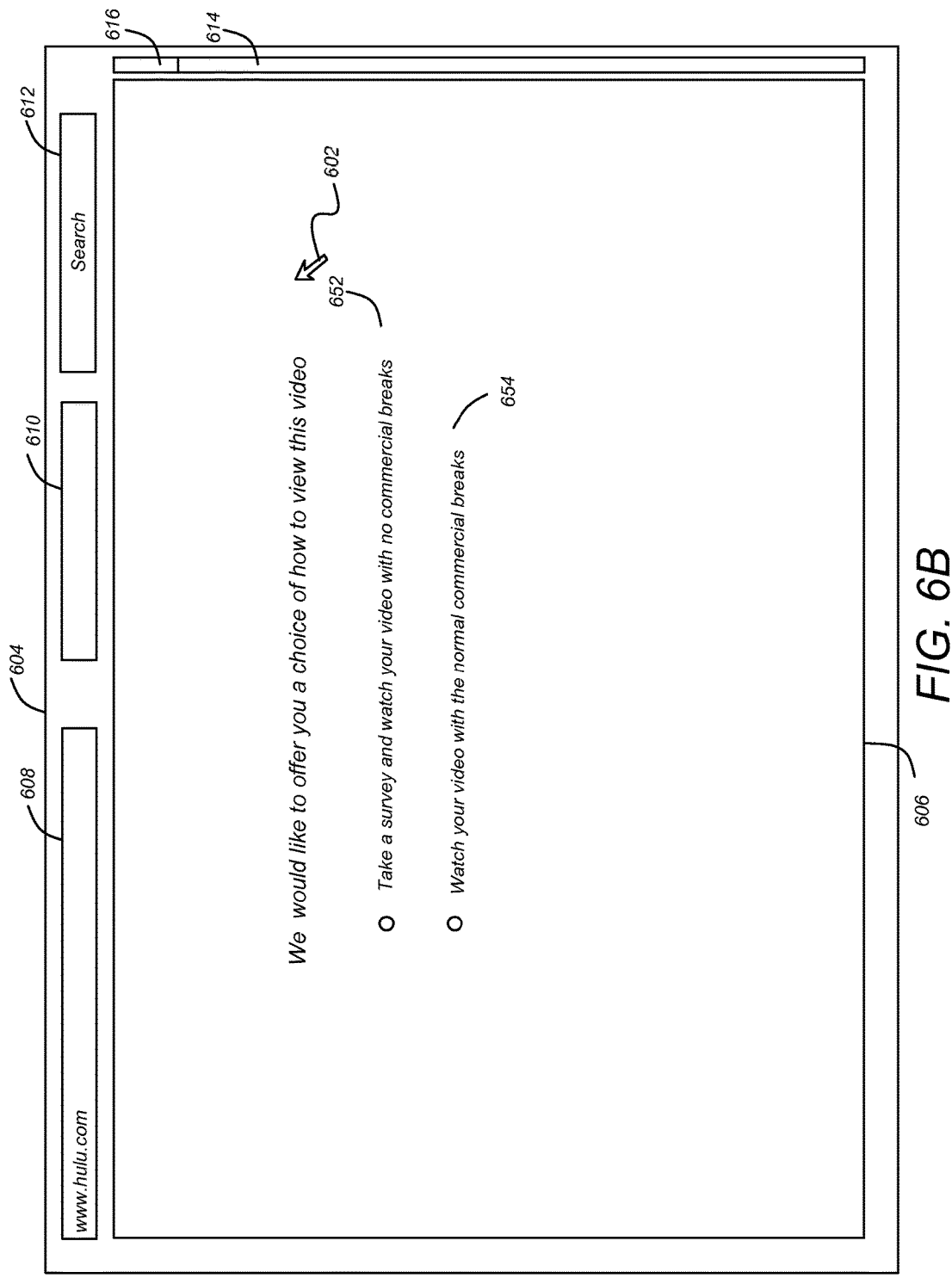
FIG. 6B is a diagram illustrating another embodiment in which the user 132 provision of the indicia of compensation entitles the user 132 to view the media program with either no advertisements or fewer advertisements.

One of the advantages of the foregoing embodiment is that it strongly encourages the user 132 to provide survey information. Users typically avoid providing survey answers for a variety of reasons, but one of the more important reasons is that they do not want to take the time to provide survey answers. However, when presented with the choice of answering a simple survey question and being compensated for that answer by allowing the user to pass directly to playback of the media program, the user 132 is in fact saving time by answering the survey. While that may also be true in other paradigms, this particular paradigm has the advantage of providing the user 132 with an easy "save time right now" choice that many users will take advantage of Control of Multiple Advertisements Via Short Form Survey Response FIG. 6B is a diagram illustrating another embodiment in which the user 132 provision of the indicia of compensation entitles the user 132 to view the media program with either no advertisements or fewer advertisements. The webpage 606 includes a first input control 652 which allows the user 132 to take the survey and watch a reduced advertising version of the media program and a second input control 654 which allows the user 132 to view the video with normal commercial breaks.

Providing the Survey to the User and Accepting Responses

Figure 7A:
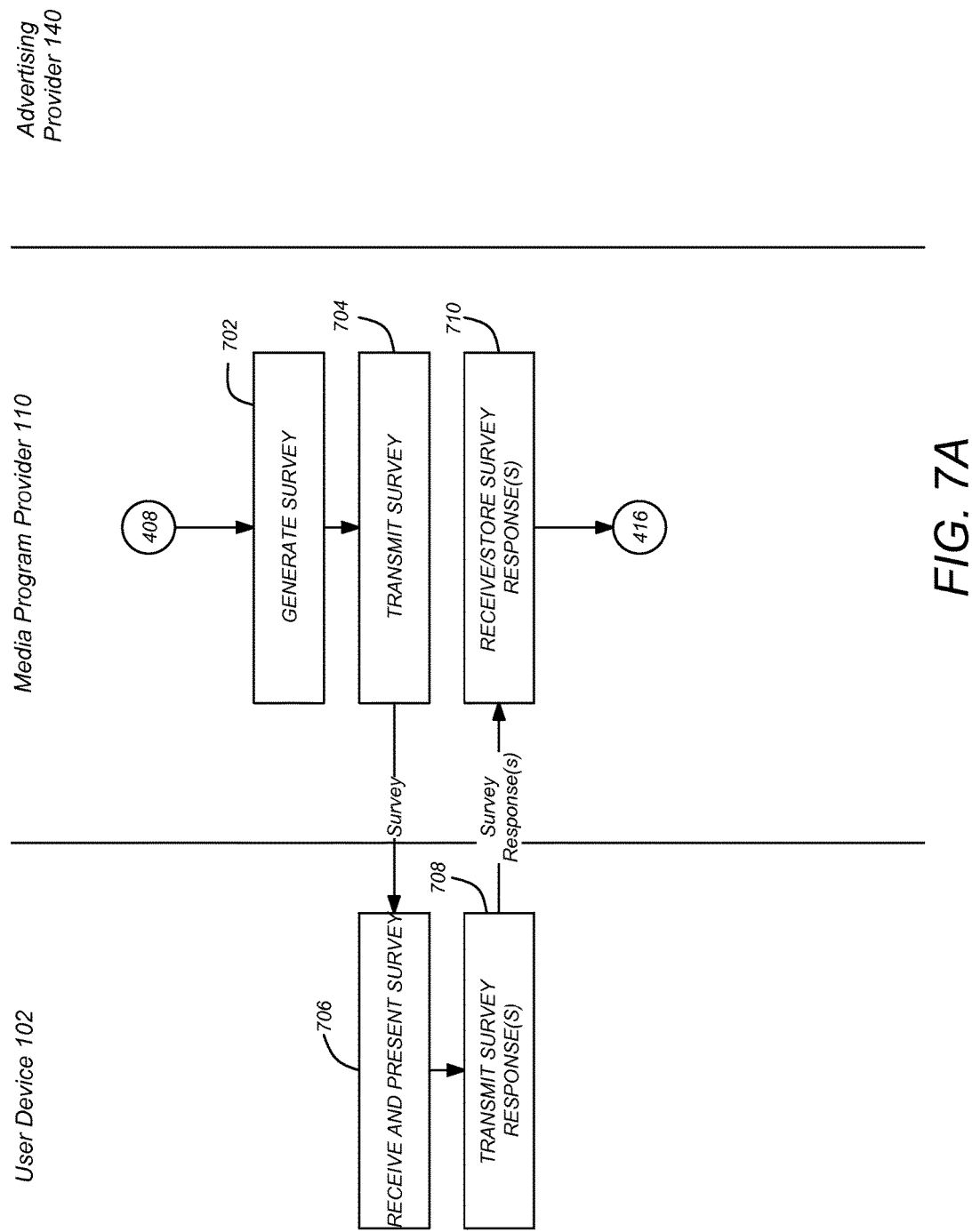
FIGS. 7A-7B are diagrams illustrating method steps my which the survey responses may be entered and optionally managed.
Figure 7B:
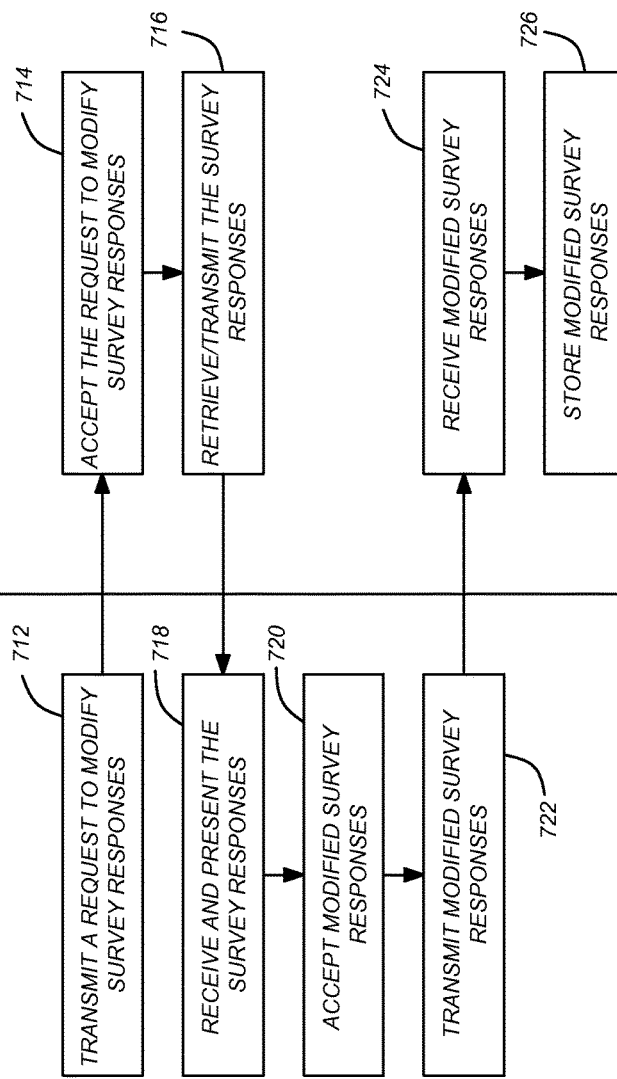

FIGS. 7A-7C are diagrams illustrating method steps my which the survey responses may be entered and optionally managed. Turning first to FIG. 7A, if the user qualifies to be presented with a survey, a survey is generated, as shown in block 702. A survey is generated and a message comprising the survey is transmitted to the user device 102 as shown in blocks 702 and 704. Further description of how the survey may be generated is presented below with reference to FIGS. 12 and 13.

The survey is received at the user device 102 and presented to the user 132, as shown in block 706. The user 132 then answers the survey questions by entering appropriate response into the user device 102. In one embodiment, the survey questions are multiple choice and/or true-false questions and include "none of the above" and/or "other" answers. "Other" answers may also provide the user 132 with the option of entering text. Such entries can be transmitted to the MPP 110 and used to improve the survey. For example, survey questions that receive "other" answers from an excessive number of users 132 may be improperly worded or badly selected for reasons that can be determined from the text entries provided by the users.

A message comprising the survey responses is then transmitted to the MPP 110 as shown in block 708. The responses are received and stored, as shown in block 710. The responses may also be analyzed at this time to verify that the responses are bona fide answers to the questions, for example, by comparing the responses with other responses from earlier surveys or other personal information about the user 132. If the answers are determined to be not bona fide, the user may be informed as such and/or given the opportunity to change their answers or seek help.

The survey answers may be used to generate profile information that is used to select advertisements to be provided with further media programs transmitted to the user in the future, or even to determine which options are offered to the user. For example, if previous survey responses indicate that the user 132 has an interest in sports, the user may be (1) presented with sports-related advertising, (2) presented a program guide or other interfaces that emphasize sports-related programming or programming that other sports enthusiasts enjoy, (3) offered special sports programming or programming that other sports enthusiasts enjoy, or (4) asked further survey questions to obtain more information regarding their interest in sports.

The offer to take the survey in exchange for viewing a special version of a media program can be made in advance of a media program request for the user 132 and may be applied to any media program that the user requests, or a media program selected from a group that is approved for viewing with advertisements control. For example, the survey could be offered to the user w weeks after the user 132 completed the most recent survey, whether the user has requested viewing of a particular media program or not. After successfully completing the survey, the user's ability to control advertisements presented with the media program may be maintained for a period of time. This allows the user to take the survey when convenient and view control the presentation of advertisements at a later time. The period of time for which the user 132 may "save" such privileges can be a function of how long the user 132 has been an active user or other factors, if desired.

Managing Survey Responses

One of the disadvantages of generating user profiles to determine which advertising is presented to the user is that users may unwittingly provide answers to questions without understanding the context in which the answer will be used. As a consequence, it is possible that a user profile generated from the survey response will cause advertisements and other information to be directed to the user 132 when in fact, the user 132 has no interest in it. For example, a user 132 may answer a question indicating that they are interested in bikes, and find that they are deluged with advertisements about bicycles instead of motorcycles, as the user 132 intended. While it is true that future survey responses may eventually dilute the effect of the question on the user's profile, that can take time, and can render any directed advertising to the user 132 less effective in the mean time. It is also true that user's circumstances change. For example, a user may become divorced, lose or gain a job (thus affecting their income), and gain or lose family members by birth or death. While such factors can be accounted for in registering for the service, the answers to survey questions that were earlier provided may also be affected by the user's change in circumstances.

FIG. 7B is a diagram illustrating an embodiment in which the user 132 is permitted to manage their survey responses. In block 712, the user 132 enters a request to manage survey responses, and that request is transmitted to the media program provider 110. The media program provider 110 retrieves and transmits the survey responses to the user device 102, as shown in block 714. The survey responses are received and presented to the user, as shown in blocks 716 and 718. The survey responses may then be modified, deleted, or clarified. In one embodiment, the user 132 is provided an interface by which an answer to a survey response is explained. This can be accomplished by entering text in an input box adjacent the response or the question.

The modified survey responses are accepted and transmitted to the MPP 110, as shown in blocks 720-722. The MPP receives the modified survey responses and stores them for future use, as shown in blocks 724 and 726. If the survey response is deleted, and indication that the survey question was answered and later deleted can be stored.

The media program provider 110 may optionally limit the time period in which the user can modify or delete survey responses. For example, the user may be prohibited from modifying survey responses until a period of time (e.g., a week) has elapsed since they were originally entered. This prevents users from gaming the system by entering survey responses, then immediately changing them. Or, the user may be prevented from changing survey responses after a period of time has elapsed.

By offering users 132 the opportunity to watch commercial-free or reduced commercial versions of media programs in exchange for the user's completion of surveys, it is possible to obtain information that assists in determining which advertisements the user 132 may be interested in viewing in the future. This prevents bothering the user 132 with advertisements they are not interested in and also assures that the user 132 will be presented with advertisements that they are likely to have some interest in.

However, if the option to view a media program with reduced advertisements is offered to users indiscriminately, it is possible for users 132 to attempt to avoid watching any advertisements, while providing little or no survey information. For example, in embodiments of the invention that allow users 132 to manage their user information and/or survey information (further described below), the user may enter survey answers, and simply delete or substantially alter them after taking the survey or after viewing the commercial-free version of the media program. Or, users 132 may simply register under different user IDs, enter bogus survey information, and rarely if ever log in using that same user ID again.

Accordingly, it is beneficial to assure that the option to watch a reduced advertising version of the media program is offered only to users 132 who are not attempting to "game" the system by providing little or no survey information in exchange. In one embodiment, this is accomplished by preventing the user from making changes that could be used to "game" the system. However, this may cause legitimate users to shy away from registering or answering a survey. In another embodiment, this can be accomplished by determining whether the identified user is qualified to be offered the reduced advertising option and only offering the option if the user is deemed to be qualified, as shown in block 408 of FIG. 4A.

Qualifying the User to Receive a Survey

Figure 8:
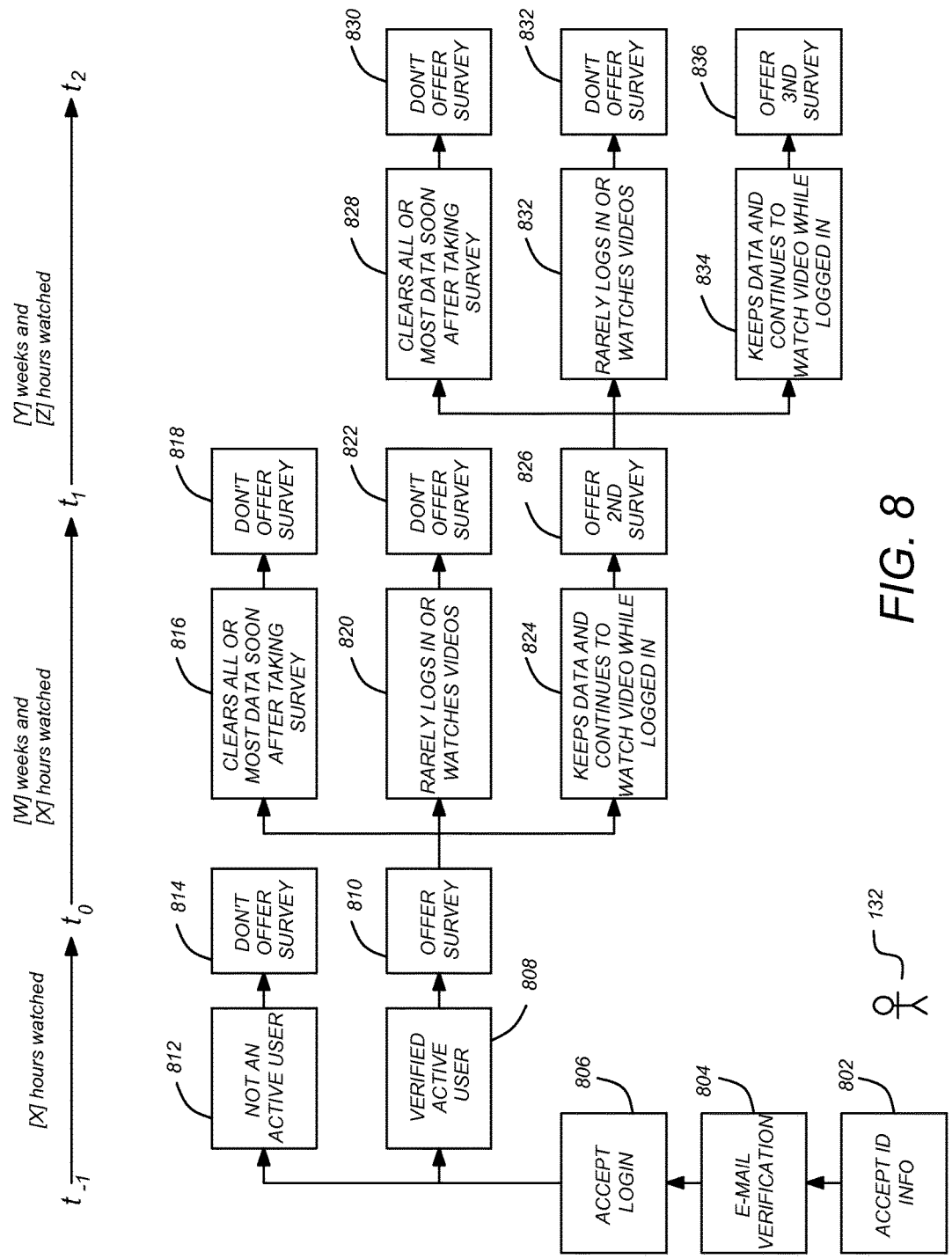
FIG. 8 is a diagram illustrating exemplary operations that can be used to determine whether an entity is qualified to be offered the option of taking a survey to view a special version of the media program.

FIG. 8 is a diagram illustrating exemplary operations that can be used to determine whether an entity is qualified to be offered the option of taking a survey to view a special or reduced advertising version of the media program, as illustrated in block 408 of FIG. 4A. In one embodiment, the user 132 is identified and the MPP 110 determines whether the user 132 is to be offered the option of taking a survey in exchange for the entitlement to control advertising presented with media program(s). In another embodiment, the user device 102 is identified.

The process begins with accepting identification information, as shown in block 802. User identification information includes information that uniquely identifies the user 132, such as the new user's name, telephone number, residence address, and/or e-mail address. If an e-mail address is provided, a message may be sent to the e-mail address providing instructions regarding how the registration process can be completed, as shown in block 804. Typically, this involves sending verification information to the MPP 110 for example, by selecting a link at a URL provided in the message.

Typically, this email verification process is sufficient to prevent potential users from gaming the system by creating bogus identities every time they want to watch a media program commercial free, because an e-mail address must be created and a message sent to that e-mail address must be responded to, before the survey option is presented.

User device 102 information can include a static IP address or processor 204 identification number, and can simply be used to identify the user device 102.

Thereafter, the entity may log in by providing suitable identification information, as shown in block 806.

To prevent users from creating and using bogus identities, the MPP 110 may examine historical data for the identified entity (e.g. the user 132 or user device 102). Such historical data may include (1) a survey history of the identified entity, the survey history comprising a time elapsed since immediately preceding survey responses from the identified entity were accepted, and/or (2) a viewing history of the identified entity.

The viewing history may include viewing duration information for the identified entity since immediately preceding survey responses from the identified entity were accepted, the number of media programs viewed by the identified entity since immediately preceding survey responses from the identified entity were accepted; and/or survey management history of the identified entity, comprising deleted previously accepted survey responses. A minimum interval $t_{-1}$-$t_0$ can also be enforced before a survey is offered. For example, the minimum interval between creating a user account and being offered a survey may be one day. The MPP 110 may also enforce a minimum viewing interval before a survey is offered. For example, in one embodiment, for new members, no survey will be offered until the viewer has watched at least $x_1$ hours of video, thus qualifying the user as a active (albeit, new) user. This is illustrated in blocks 808-814.

In one embodiment, the user is not offered a new survey until a period of time has elapsed since the last survey was offered and responded to. This is shown in blocks 820-822. For example, if the user 132 was offered a survey on January 1, the user 132 will not be eligible to be offered another survey until w weeks ($t_1$-$t_0$) after January 1. In the alternative or addition to this, a minimum viewing time may be enforced, such that the user 132 is not eligible to be offered another survey until the user 132 has viewed at least $x_2$ hours of media programs. For example, if the user 132 has logged in to watch a video only once in the last 10 weeks, that user is deemed not to be an active user, and will not be offered the option of taking a survey. Or, if the user 132 has not viewed more than 30 minutes of media programs in those 10 weeks, the user 132 is also deemed not to be an active user, and will not be offered the option of taking a survey.

As described above, the user 132 or user device 102 survey history can also be examined to determine if a survey is offered. For example, in embodiments wherein the user 132 is permitted to directly manage their survey data (further described below), the user is also not offered a survey if the user entered data in an earlier survey, only to clear all or a substantial amount of the survey data shortly (e.g. within hours or days) of watching the media program provided without advertising. This feature prevents the user from gaming the system by providing unusable survey responses. This is illustrated in blocks 816 and 818.

In a further embodiment, responses from different surveys are compared to assess whether the survey responses are consistent with one another. For example, the response to a survey question may strongly indicate that the user is a strong environmentalist, while the response to another question in the same or different survey may indicate that the user is a strong anti-environmentalist. Such discrepancies can be resolved with further questions, but if left unresolved, can also be used as an indication that the user is not providing random or less than candid answers to the survey questions. In such cases, the user may not be provided with the opportunity to take future surveys, the user may be provided with fewer survey-taking opportunities, or the user may be provided with alternate surveys intended to resolve the discrepancies.

If the user 132 has not excessively modified previous survey data shortly after taking earlier surveys, and is an active user, the user is offered the opportunity to take a second survey, as shown in blocks 824 and 826.

These operations are repeated again as shown in blocks 828-836. In one embodiment, the time period over which the assessment of the user's qualifications to receive a survey changes over time. Hence, instead of assessing whether the user is qualified to receive a survey offer w weeks after taking the last survey, the assessment may take place y weeks after the previous survey. Using staggered or random assessment intervals further confounds the user 132 from gaming the system, because the user 132 cannot predict when another survey might be offered, efforts to game the system in advance of another survey-taking opportunity are difficult to make.

The previously entered survey responses can be presented to the user 132 in a variety of ways. In one embodiment, the user 132 is provided with the option of viewing and managing previous survey responses organized by survey.

Survey Management Interfaces

Figure 9:
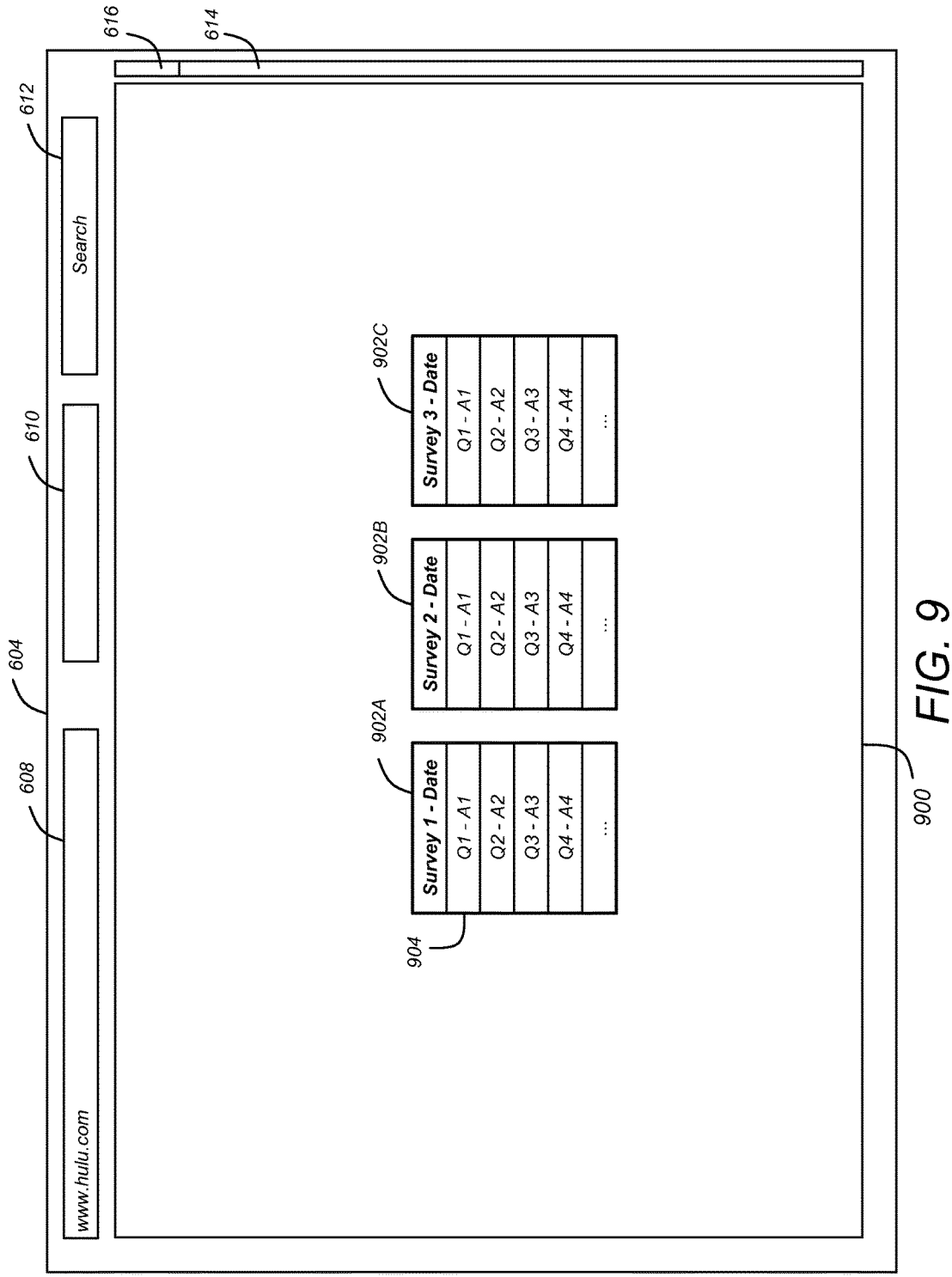
FIG. 9 is a diagram illustrating elements of one embodiment of a user interface that may be presented in a window to provide previously entered survey responses to the user.

FIG. 9 is a diagram illustrating elements of one embodiment of a user interface 900 that may be presented in a window to provide previously entered survey responses to the user 132. In this embodiment, each previously completed survey 902A-902C (hereinafter alternatively collectively referred to as survey(s) 902) is presented with the survey questions and the survey answers. The user 132 can go to the survey (e.g. 902A) where a question was asked, select the question/answer pair 904 and modify or delete the survey answer as desired.

Figure 10:
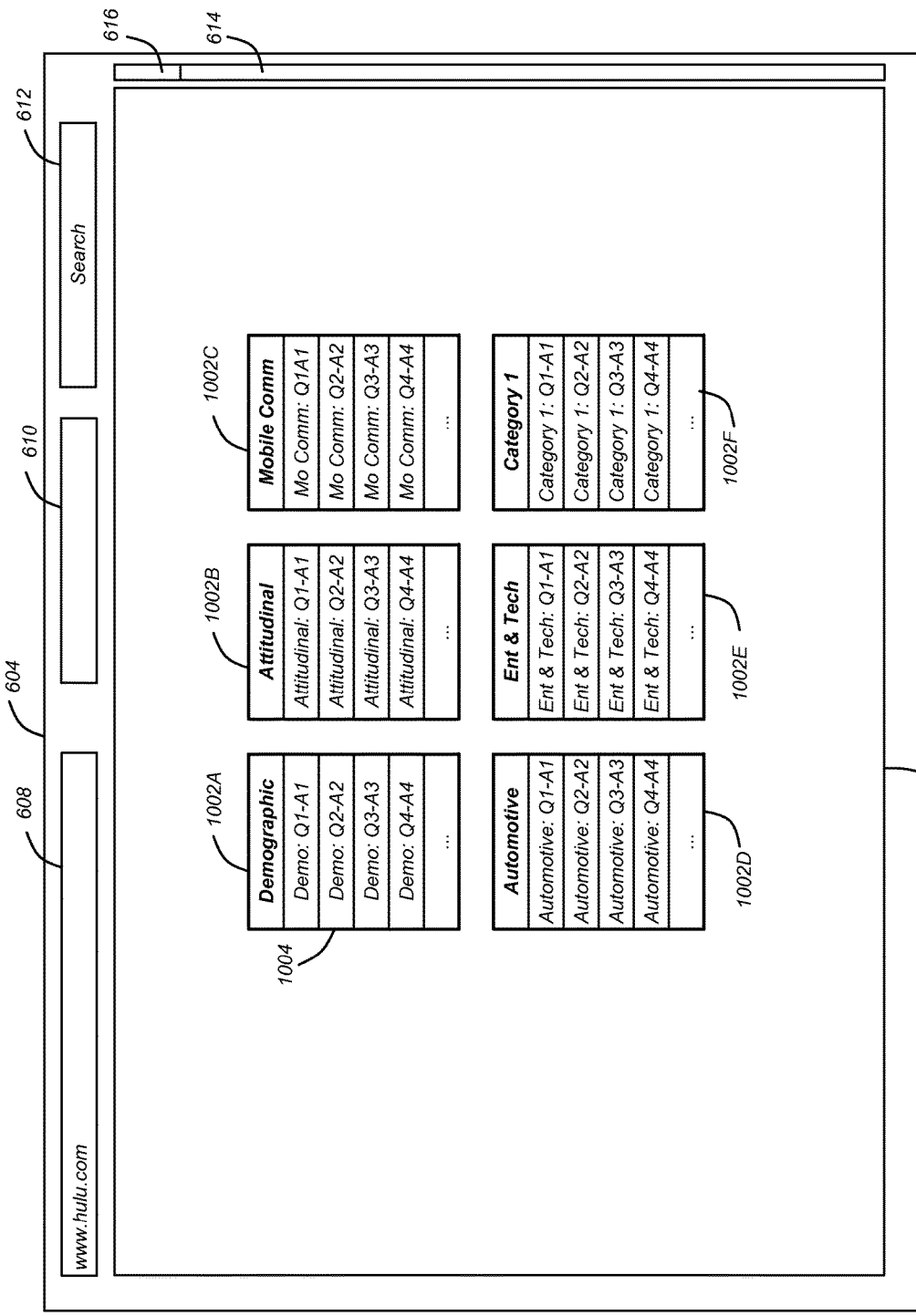
FIG. 10 is a diagram illustrating elements of an embodiment of another user interface that may be presented in a window to provide previously entered survey responses to the user.

FIG. 10 is a diagram illustrating elements of another embodiment of a user interface 1000 for presenting previously entered survey responses to the user 132. In this embodiment, the questions and answers provided in previously completed surveys are presented according by category (1002A-1002F). If a user 132 remembered answering a question related to the automotive category 1002D, the user 132 may select a particular question/answer pair 1004, and modify or remove the answer.

Figure 11A:
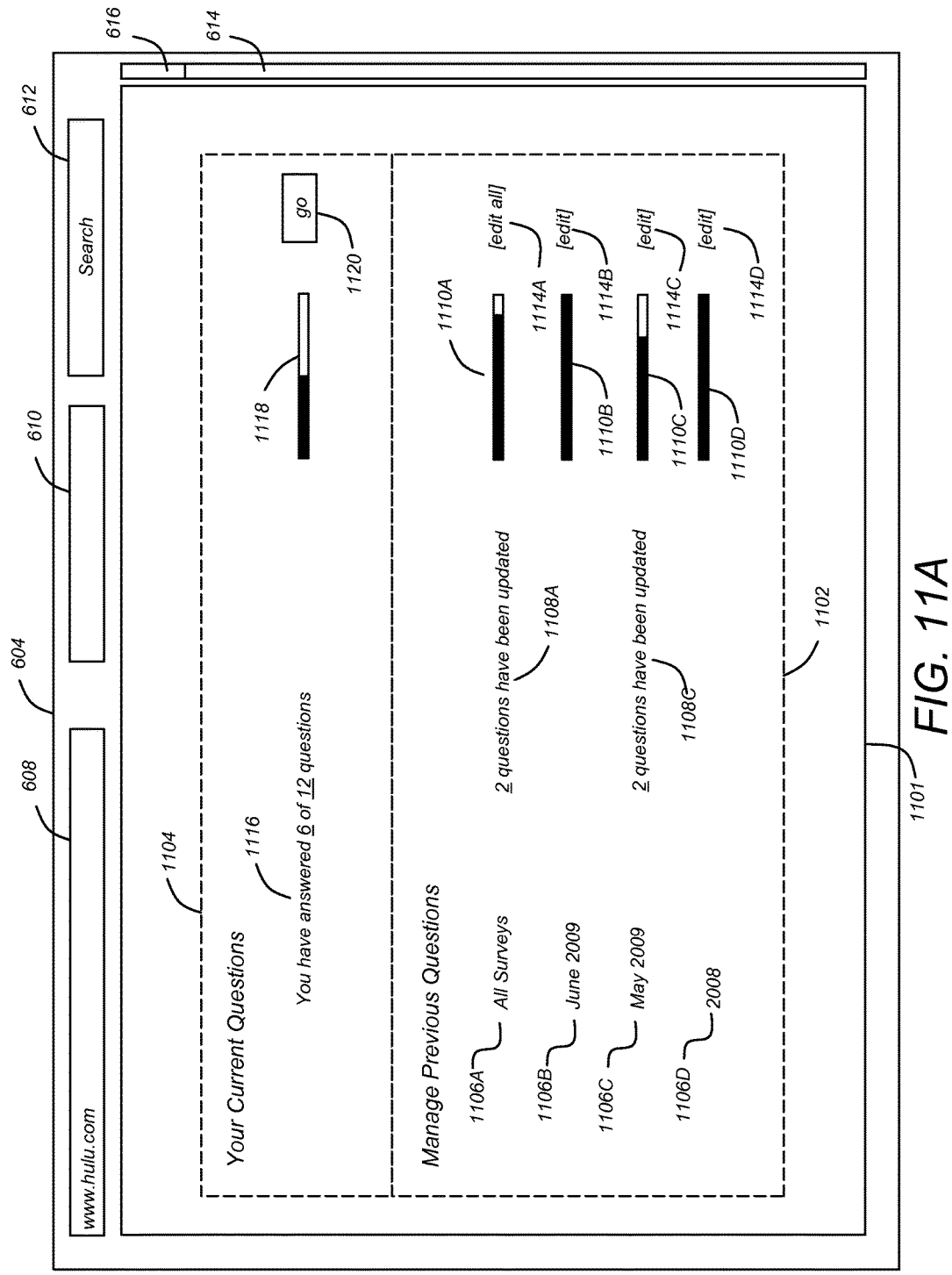
FIGS. 11A and 11B are diagrams illustrating further embodiments of a user interface for managing survey questions.

FIG. 11A is a diagram illustrating another embodiment of a user interface for managing survey questions. In this embodiment, the user interface 1101 comprises a webpage having a first survey management portion 1102 and a second survey management portion 1004. The first survey management portion 1102 can be used to manage answers entered in surveys that have been previously completed. In the illustrated embodiment, the management portion 1102 presents information regarding previously completed surveys including information identifying the survey (in the illustrated embodiment, surveys are identified by the date on which they were completed) 1106A-1106D, information regarding how many of the survey questions of each survey have been modified or deleted (including text 1108A and 1108C). Graphical indicators 1110A-1110D may also be presented showing the proportion of survey questions that have been modified or deleted. The user may modify or delete questions that were provided in earlier surveys by selecting the edit control 1114A-1114D associated with each survey.

Typically, the user 132 is not provided with any special viewing privileges (e.g. viewing the media program without advertisements or viewing all media programs for a particular period such as 24 hours) until the user 132 has completed the entire survey. In one embodiment, the user 132 is permitted to save the answers to partially completed survey so that the survey can be completed later. This is useful in situations where the user 132 would like time to ponder the question asked of when the user 132 does not have enough time to complete the entire survey.

The illustrated user interface 1102 also comprises a second survey management portion 1104 that permits the user to return to partially completed surveys so that they can be fully completed. In the illustrated embodiment, a text portion 1106 indicates how many questions of the current survey have been answered, and the graphic 1118 provides a visual indication of the proportion of unanswered questions to the total number of questions in the survey. The user 132 can return to the partially completed survey to provide additional answers or to modify answers already given by selecting the "go" control 1120.

In the illustrated embodiment, a rule has been enforced that requires that no further survey is to be offered to a user 132 unless all of the previous surveys have been completed. Hence, there is only one uncompleted survey, and only one is presented in the second portion 1104. However, other embodiments permitting users to save the results from more than one uncompleted survey and to return to those partially completed surveys to answer further questions or modify answers already given are also possible. The interface for such embodiments could be analogous to the interface presented by the first portion 1102.

The user 132 may also view, modify and/or delete answers provided to previous survey questions. This is accomplished by generating information correlating user profile parameters or other information to survey responses, transmitting this correlation information along with retrieved survey responses and questions to the user device 102, for presentation to the user. The user can then view survey questions and responses and make changes to the responses as desired.

Figure 11B:
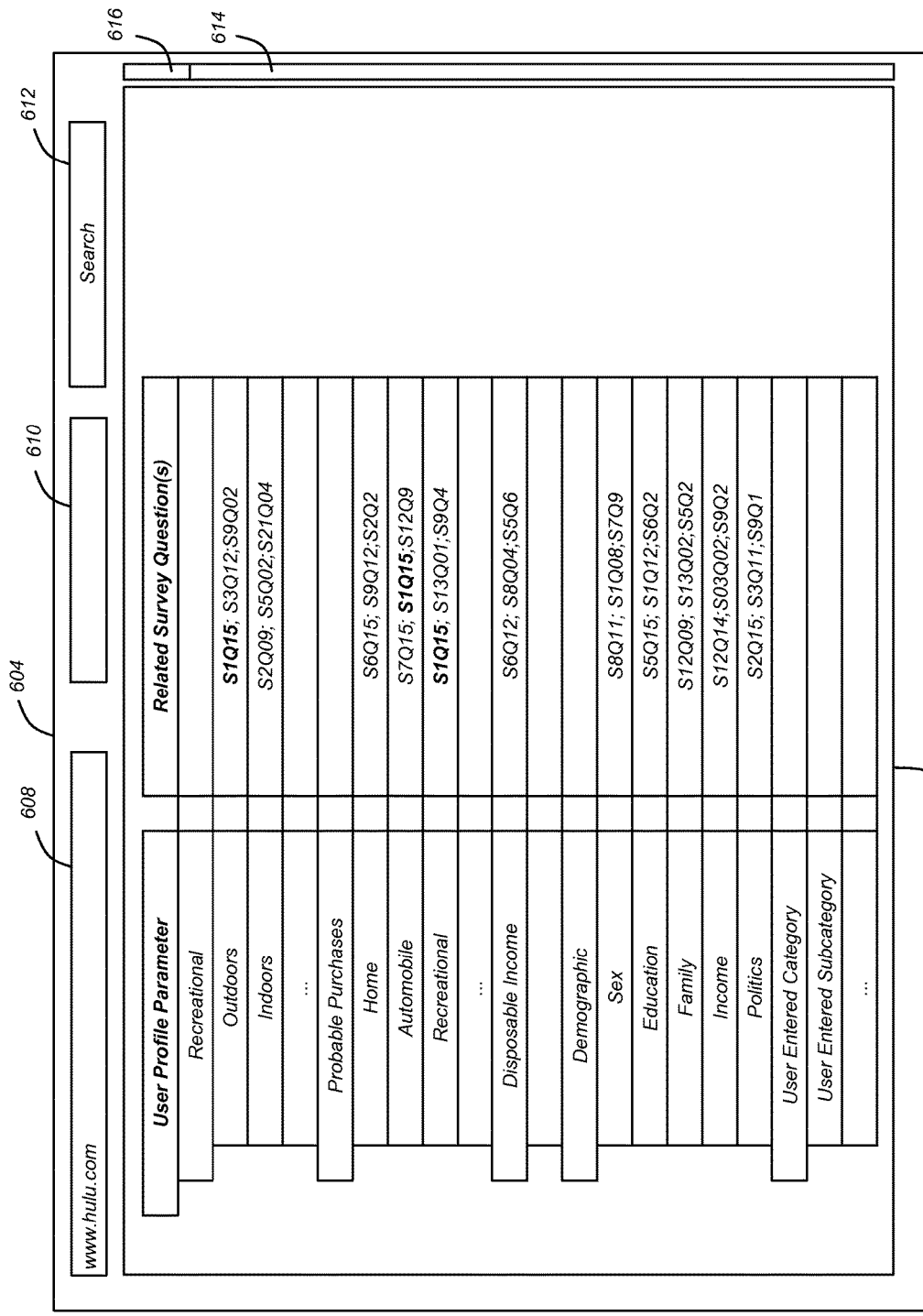

FIG. 11B is a diagram illustrating another embodiment of a user interface 1150 that allows the user to view, modify, and/or delete answers provided to previous survey questions. In this embodiment, user profile information generated from the survey responses is correlated to the questions asked in the surveys and the responses provided by the user. For example, the user profile information can be generally categorized into how the user spends recreational time (indoors or outdoors), probable purchases, disposable income, and demographics. Survey questions related to those user profile parameters are listed adjacent to the parameter. For example questions related to whether the user prefers outdoor recreation include question fifteen of survey one (S1Q15), question twelve of survey three (S3Q12), and question two of survey nine (S9Q02). Note that a particular question may be relevant to more than one profile parameter. For example, question fifteen from survey one is relevant to the outdoor, automobile, and recreational parameters.

As described above, the offer to a user 132 to take a survey in exchange for viewing media program(s) without advertisements or with fewer advertisements can be made in advance of the user selection of a media program, immediately after the user selects a media program for viewing, or during the view of a media program. In one embodiment, benefit provided to the user 132 for taking the survey is a function of the survey characteristics. For example, the user may be provided with greater reward for answering questions in a survey that ask more difficult or complex questions, or for responding to a survey having a more questions. One example of the different survey types, how they are offered to the user 132, the number of questions asked in the survey, the use reward for completing the survey, and how partially completed surveys may be saved for later completion is illustrated in Table I, below:

TABLE I

|  | Long Survey | Selection Survey | Single Question Survey |
| --- | --- | --- | --- |
| How Offered | A tab or control in masthead or user's homepage | Dynamically inserted prior to video (opt out option) | Dynamically inserted into advertising breaks (opt out option) |
| Number of Questions; Expected Completion Time | 10-15 questions; time period of less than about 5 minutes | Varies by the length of the media program: Half episodes, 2-3 questions; time period less than 1.5 minutes Full episodes, 3-6 questions; time period (for completion of survey) less than 2.5 minutes | One question; time period for completion of survey less than 30 seconds. |
| User Reward | 24 Hours of advertisement-free viewing time commencing upon completion or 1000 charitable impressions (if available) | Watch media program advertisement-free. (Option to not take survey and watch media program with advertisements). | Answer and return to media program upon completion; option to view video instead (preference can be set to bypass offer) |
| Partial Completion | Survey can be saved so that survey can be completed at a later time. | Survey must be completed before media program begins; user can cancel survey to view media program with advertisements | Survey must be completed when presented |

As shown above, the user reward for completing a survey is typically the privilege of viewing the media program with fewer advertisements or none at all. However, other user rewards are also possible. For example, in lieu of 24 hours of advertisement-free viewing, the user may select a user reward of a number of "impressions" that will be given to the organization of their choice. For example, the user 132 may be offered the option of providing 1000 "impressions" to a charitable organization such as the MARCH OF DIMES. An "impression" in this context, refers to an event in which a user views an advertisement. Hence, if 1000 impressions are donated to a charity, that charity's advertisement will be presented to some user(s) 1000 times.

Figure 12:
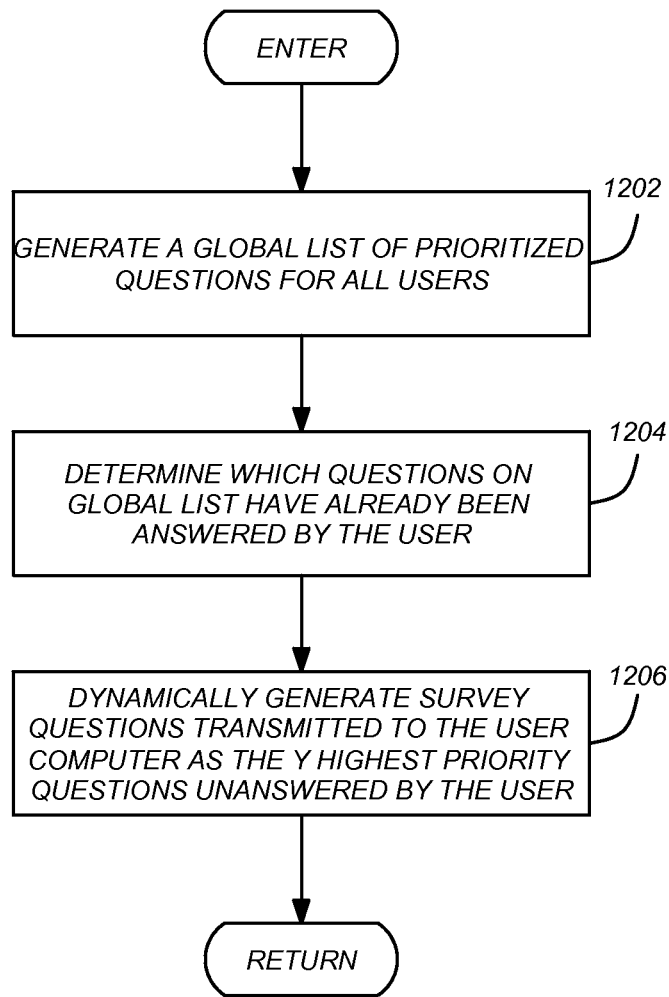
FIG. 12 is a diagram presenting exemplary method steps that can be used to generate the survey questions that are transmitted to the user.

FIG. 12 is a diagram presenting exemplary method steps that can be used to generate the survey questions that are transmitted to the user 132. First, a global list of prioritized questions is generated from the locus of all active questions. Questions may be deleted from the locus of all questions, for example, if the question has been deemed misleading or unhelpful, and new questions can be added to the locus of active questions time. The global list is applicable to all users. Before a particular user 132 is to be transmitted a survey, a list of questions already answered by the user 132 is compared to a the global list of prioritized questions to identify questions that have already been answered by the user 132, as shown in block 1204. In block 1206, survey questions are generated dynamically (e.g. in near real time in response to a demand from the user 132) and transmitted to the user 132, as shown in block 1206. The transmitted survey questions can include the highest priority questions from the global list of prioritized questions, after excluding those questions the user has already answered. Other questions may be included as well.

As noted above, the user 132 can delete responses previously provided to survey questions. Questions associated with such deleted responses may be removed from the list of questions that the user 132 has already answered, thus allowing the question to be asked in another survey. Or, if desired, questions associated with deleted responses can be retained on the list of questions that the user 132 has already answered, thus preventing the user from being asked the same question a second time.

Figure 13:
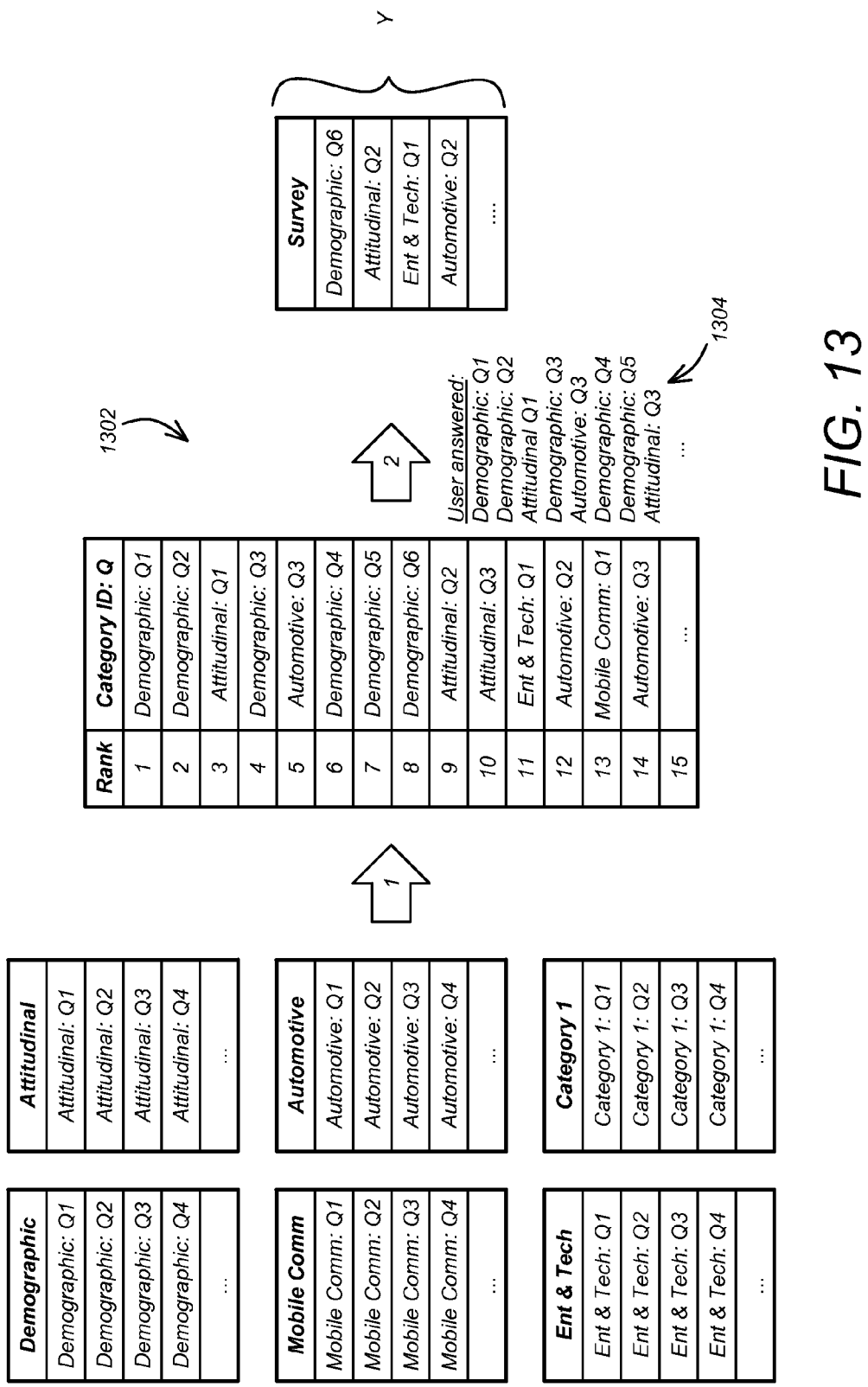
FIG. 13 is a diagram illustrating the generation of survey questions.

FIG. 13 is a diagram illustrating the generation of survey questions. As illustrated by the first arrow, all active questions from all the categories are combined into a global list that is then prioritized. The resulting global list of prioritized questions 1302 is then compared to a list 1304 of questions the user 132 has already provided answers to. The survey is then generated to include the top questions on the prioritized list that have not already been answered by the user 132.

The foregoing illustrates embodiments in which the user is provided compensation in the form of advertising-free viewing in exchange for completing a survey. However, compensation may be provided in other forms. For example, the user may be offered reduced advertising (shorter, fewer, or different ads) or may be offered an opportunity to view another media program that is offered only to survey respondents or those that pay for it. Further, the viewer may be offered other choices such as a choice between watching one or more trailers or advertisements before viewing a media program, or becoming a registered user (e.g. by answering a series of questions provided in the registration process). Users may also be provided with different options depending on user loyalty (e.g. how much or often the user views media programs from the provider) or depending on user preferences provided in the registration process.

Advertising Controls/Option Interface

The advertisement control options presented in block 414 of FIG. 4A can include any combination of the following.

Presenting which advertisements the user 132 can view in the current commercial break: The advertisements can be presented via a named list, icons, or thumbnails that can be presented on the display 222 and selected by the user 132 using pointing device 216 or keyboard 215. In one embodiment, the options presented are selected based upon either information about the user 132 that is provided either via an independent interface, survey responses, from previous advertisement selections, from a third party 314 database, the media programs selected by the user 132 to be played (which can be identified by metadata associated with the media program), or from a history of media programs that the user has played in the past.

For example, the user 132 may be presented with a list showing a SNICKERS bar, a LA-Z-BOY recliner, and BLOCKBUSTER if the previous user 132 advertisement selections or survey responses indicated that the user 132 was interested in these products or if the user 132, based on the current program viewed or the user's history of program viewing, survey information, or other information, was thought to lead a lifestyle in which such products or services were desirable (e.g. a sedentary lifestyle). If previous advertisement selections, the current program being viewed, the user's viewing history and/or survey information indicated that the user 132 would likely be interested in different advertisements, other advertisement options may be shown. For example, if the currently viewed media program is of the TOUR OF CALIFORNIA, the viewer may be presented with a list showing a CLIF bar, a KOOBI bicycle seat, and a SPINERVALS video.

In another embodiment, the advertisement options presented to the user 132 include different combinations of groups of required and elective advertisements. Required advertisements are those that must be viewed by the user 132, while elective advertisements are those over which the user 132 has a choice. For example, if the user profile indicated that the user 132 was an avid bicyclist, the advertising options presented could include a list of advertisements from an elective group (e.g. advertisements having to do with cycling products or services) and a list of advertisements from a required group (for example, having to do with detergents or other staples that virtually everyone needs). In another embodiment, the advertisements presented to the user 132 can include required advertisements (the presentation of which the user 132 has no control) and elective advertisements (the presentation of which the user 132 has control). In this embodiment, the fee charged to the source of the goods or services described in the advertisement may be charged a different fee for required advertisements than elective advertisements).

The user 132 may select one or more of the optional advertisements provided, and these are the advertisements that will be shown during the advertisement break. As described above, the identity of the selected items (as determined by a PID or analogous value) can later be used to refine future advertisement selections that are presented to the user 132. In one embodiment, the identity of the selected items is transmitted external to the user device 102 (for example, to the media program provider 110, to the advertising provider 140 or a third entity) for purposes of further refining the advertising choices that are offered to the user 132. In another embodiment, the identity of the selected choices is held internal to the user device 102 and not disclosed elsewhere. This embodiment increases the privacy of the user's 132 information. In yet another embodiment, a subset of the viewer information is transmitted external to the user device 102, and other information is held secure within the user device 102. The information or subset of information can be processed by the user device 102 so as to be insufficient to identify the user 132 by removing any information identifying the user 132, and instead, linking the user selections to user demographics such as age, sex, income, and residence or user viewing history.

Presenting which advertisements the user 132 can view in future commercial breaks: The options presented to the user 132 may include advertisements for more than just the current commercial break. For example, the user 132 may be asked to select all of the advertisements that will be presented during the media program, for all commercial breaks or for the viewing session. Further, as described below, advertisement selections can be made in advance of the play of the media program, or during the media program.

Presenting categories of advertisements to the user: In this embodiment, the user 132 is presented with different categories of advertisements. In one embodiment, the categories offered to the user 132 become more specific as the user 132 makes advertisement choices of provides other information. For example, initially, the categories offered may be broadly described as "Home," "Auto," and "Outdoors", but if the user's choices indicate that the user 132 is more interested in the outdoors, the categories presented may be changed to sub-categories within the "Outdoor" category, such as "Winter Sports," "Summer Sports," and the like.

Presenting Options Controlling How the Advertisements are Presented in the Media Program: In another embodiment, the user 132 is presented with options describing how the advertisements are presented in the media program. These options may describe the timing of the presentation of the advertisements. In this case, subsets of advertisements can be provided in advertising blocks, and the user 132 can be given the option of expressing a user preference to describe the number and/or temporal distribution of advertisements to be presented in each block and the temporal distribution of the advertisement blocks within the streamed media program. For example, the user 132 may be required to view all of a set of advertisements, but given the option of seeing them widely dispersed throughout the media program (for example, inserting two 30 second advertisements every 5 minutes rather than six 30 second advertisements every 15 minutes). Using this option, the user 132 may elect to view all of the advertisements in the beginning, the end, or in the middle of the media program, or the user 132 may elect to view the advertisements spread out over the length of the media program. Recognizing that the user 132 is less likely to remain seated and watch commercials that are presented during extended commercial breaks, the options presented to the user 132 may limit the user's control so that each commercial break must include at least n commercials and no more than m commercials, with typical values of n and m being 2 and 8, respectively.

The sponsor of the advertisement (the entity ultimately paying the media program provider 110 or associated entity for providing the media program and/or advertisement to the user 132) can be charged for the presentation of one or more of the advertisements an amount that is based on how the advertisement is to be presented in the streamed media program. In this embodiment, the sponsor can specify a timing structure that limits the user's options in determining when the advertisements are presented, or the sponsor may simply be charged differing amounts based upon when the user 132 decides to present the advertisement. For example, the sponsor may be asked to pay more for an advertisement that is the first in a block of advertisements in an advertising break, or at times when the user 132 is more likely to view the advertisement.

The presented options may optionally include how the advertisements are presented in the viewer space. For example, the user 132 may be presented with the option of viewing the commercial on a pop-up window, a smaller wide window, or optionally, with muted or reduced audio.

FIGS. 14A-14B and FIGS. 15, 18 and 19 are diagrams illustrating exemplary advertising control/option interfaces presented to the user as shown in block 420 of FIG. 4A.

Figure 14A:
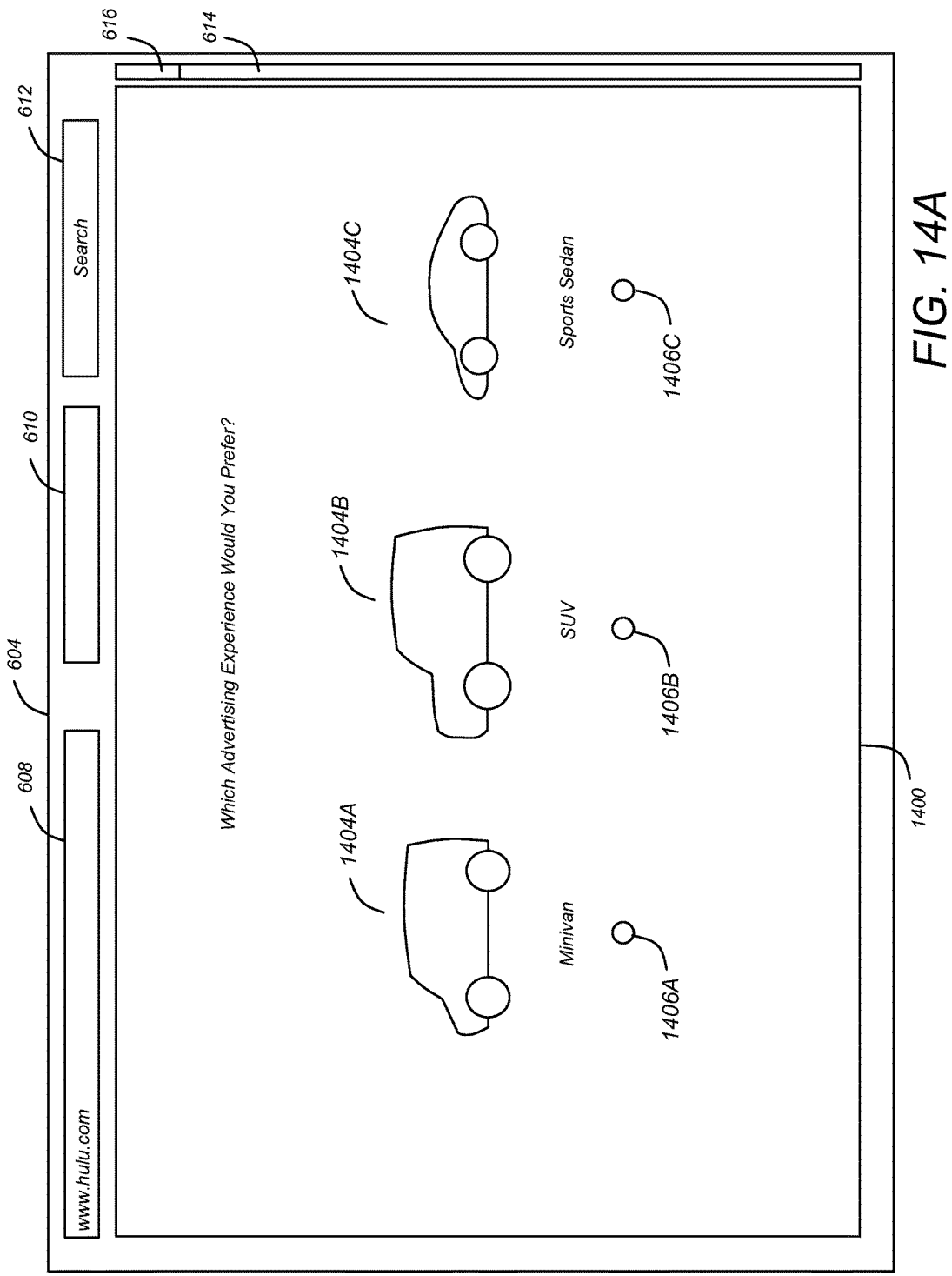
FIG. 14A is a diagram depicting one embodiment of a user interface presenting a plurality possible advertisement choices to the user for selection.

FIG. 14A is a diagram depicting one embodiment of a user interface 1400 presenting three possible advertisement choices to the user for selection: an advertisement for a minivan, one for sport utility vehicle (SUV) and one for a sports sedan. Each advertisement choice includes an icon or illustration 1404A-1404C, and a selection control 1406A-1406C that can be used to select the desired advertisement. The advertisement selections can represent products or services from one vendor (e.g. a GENERAL MOTORS minivan, SUV and sports sedan) or products and services from multiple vendors (e.g. a minivan, SUV or sports sedan from any vendor). A second user interface may be presented with further options to refine the user's advertisement choice, if desired. For example, if the user selected a minivan advertisement, another window may be presented asking the user to choose between several different minivan manufacturers.

Figure 14B:
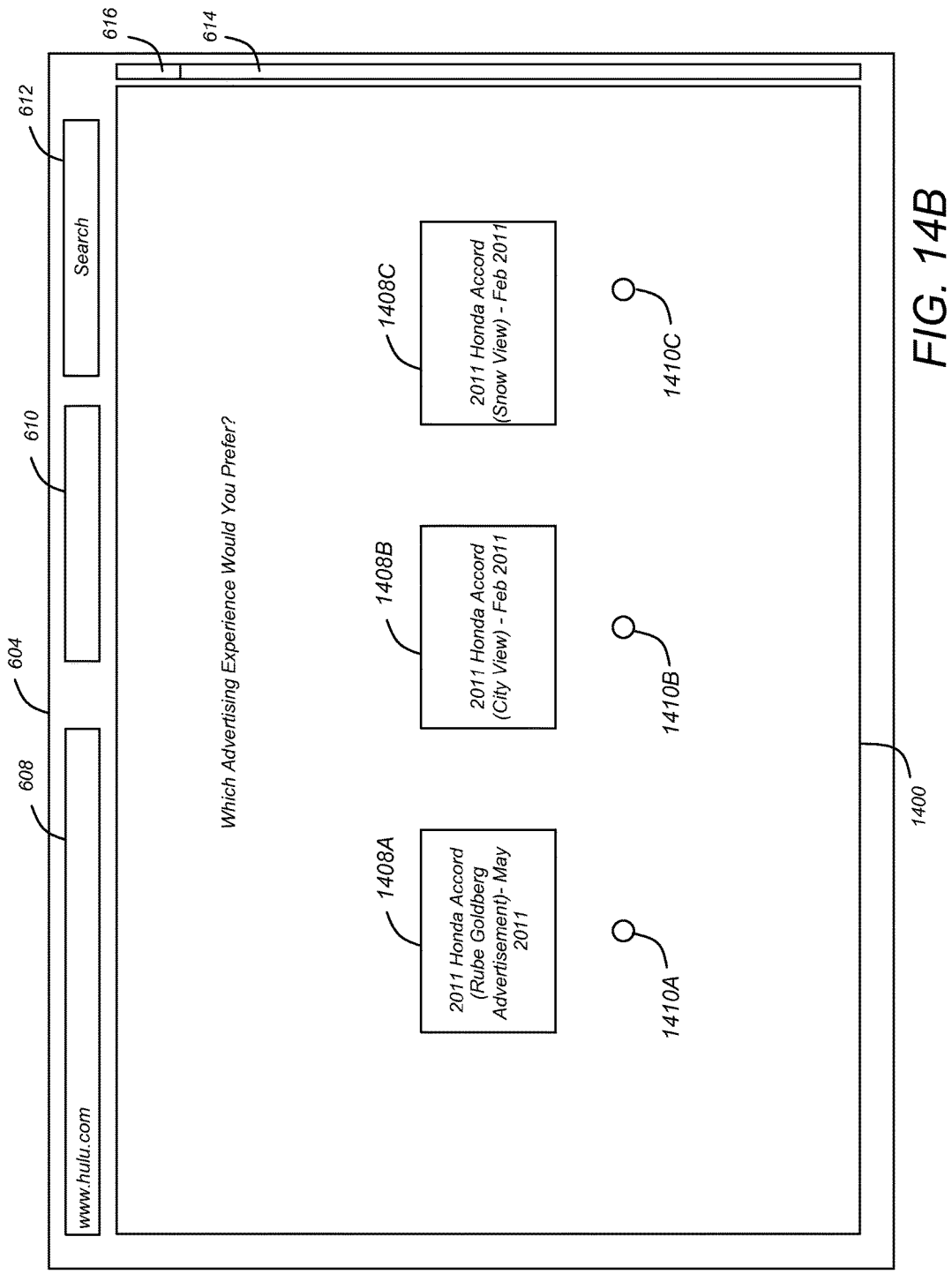
FIG. 14B is a diagram of the user interface presenting specific advertisement selections to the user.

FIG. 14B is a diagram of the user interface 1400 presenting specific advertisement selections to the user. In this embodiment, the user 132 given a choice of one of a set of three specific advertisements. For example, the advertisement associated with image 1408A may be the specific and well-known "cog" advertisement for a Honda Accord that used a Rube-Goldberg combination of automobile parts (described at http://www.snopes.com/photos/advertisements/hondacog.asp). Other advertisements, perhaps for the same product, can be illustrated with a thumbnail 1408B-1408C so the user 132 can identify them, and may even be played back to the user within the thumbnail so that the user can more accurately identify the candidate advertisement as one of interest.

The other specific advertisements in the set of candidate advertisements presented may include an specific advertisement for a 2011 TOYOTA CAMRY or other competing automobile. This feature allows the user 132 to not only have some say in which product they would like to see an advertisement for, it allows the user 132 to choose specifically which advertisement they would like to see of perhaps multiple advertisements for the same product. The advantage in this embodiment is that expensive advertisements (such as the HONDA advertisement described above, which reputedly cost $6M to produce) that have significant entertainment value may be chosen for viewing by users again and again, thus justifying the additional cost expended in producing the advertisement. Another advantage in allowing the user to select specific advertisements (rather than simply products or manufacturers of products) is that information can be inferred from such choices that cannot be inferred from more general, product oriented choices. For example, if a user 132 regularly chooses specific advertisements that have humorous content, the MPP 110 may infer that these kind of advertisements are generally preferred by this particular user 132 and are more likely to be watched, and provide similar advertisements in the future. This kind of inference cannot be made if the user simply makes advertisement choices based on particular products, product categories, manufacturers or retailers.

In another embodiment, the options presented to the user 132 for choice comprise specific advertisements for a single product available from a single manufacturer (e.g. all refer to advertisements for a 2011 Honda Accord sedan. This embodiment has the advantage of giving the user 132 a choice, but a limited one in that they may choose which specific advertisement they would like to view, but no choice is given with respect to the subject of the advertisement (in this case, the specific product).

It is worthwhile to note that the interfaces 1400 shown in FIGS. 14A and 14B may be transmitted to the user device 102 and presented to the user 132 automatically, and without user input. In other words, the user 132 is not presented with a complicated menu from which they must drill down to the advertisement(s) the user 132 wishes to view. Instead, when the advertisement break begins, the user 132 is immediately provided with a single screen interface 1400 from which the user 132 chooses one and only one advertisement from a set of candidate advertisements presented. The advantage in this embodiment is that user 132 is not asked to provide a plurality of inputs and given a confusing myriad of choices. Instead, the user 132 is given a simple interface that limits the user's choices to one and only one of a small number of choices.

Figure 15:
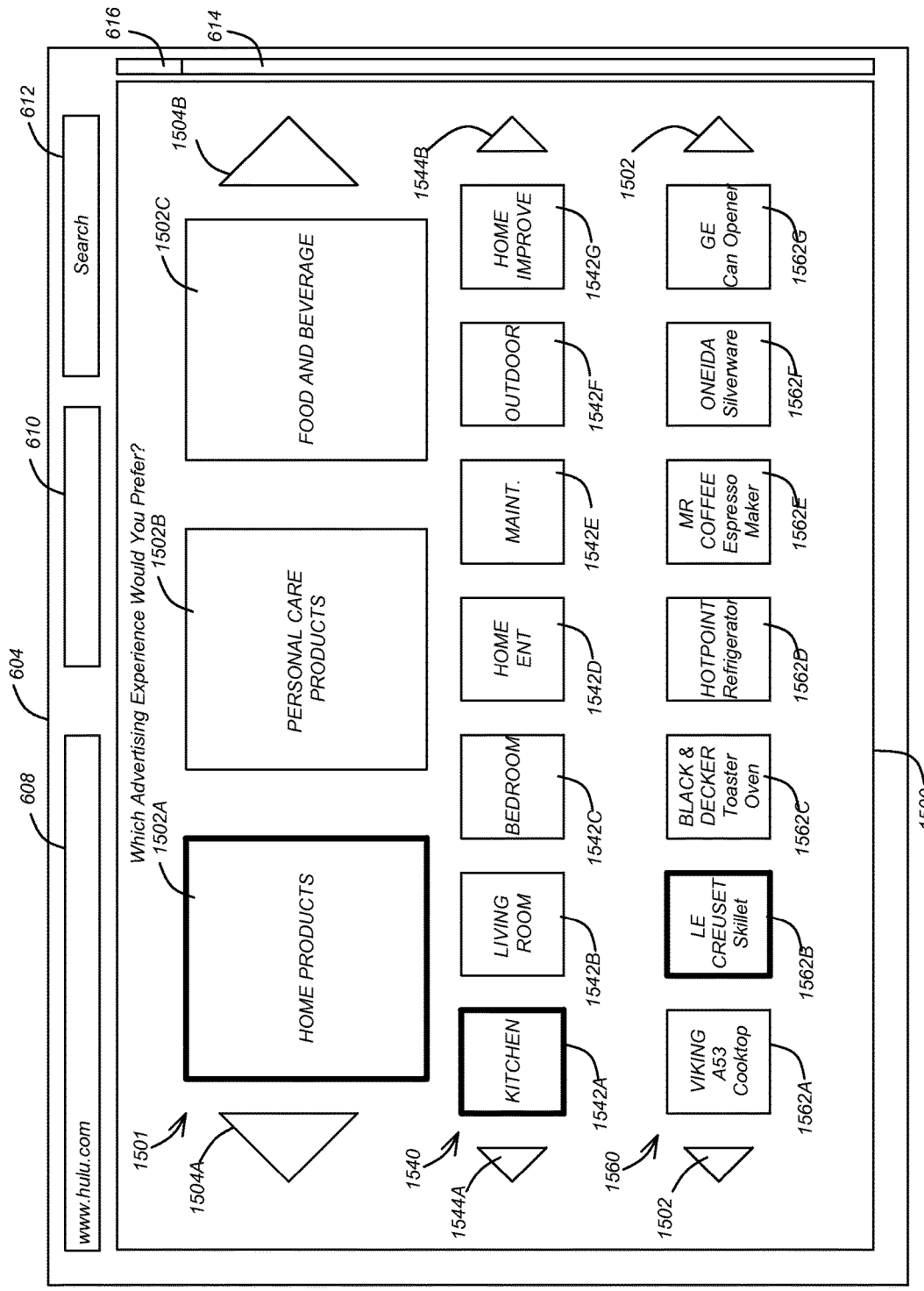
FIG. 15 is a diagram illustrating another embodiment of an interface for controlling advertisement options.
Figure 16B:
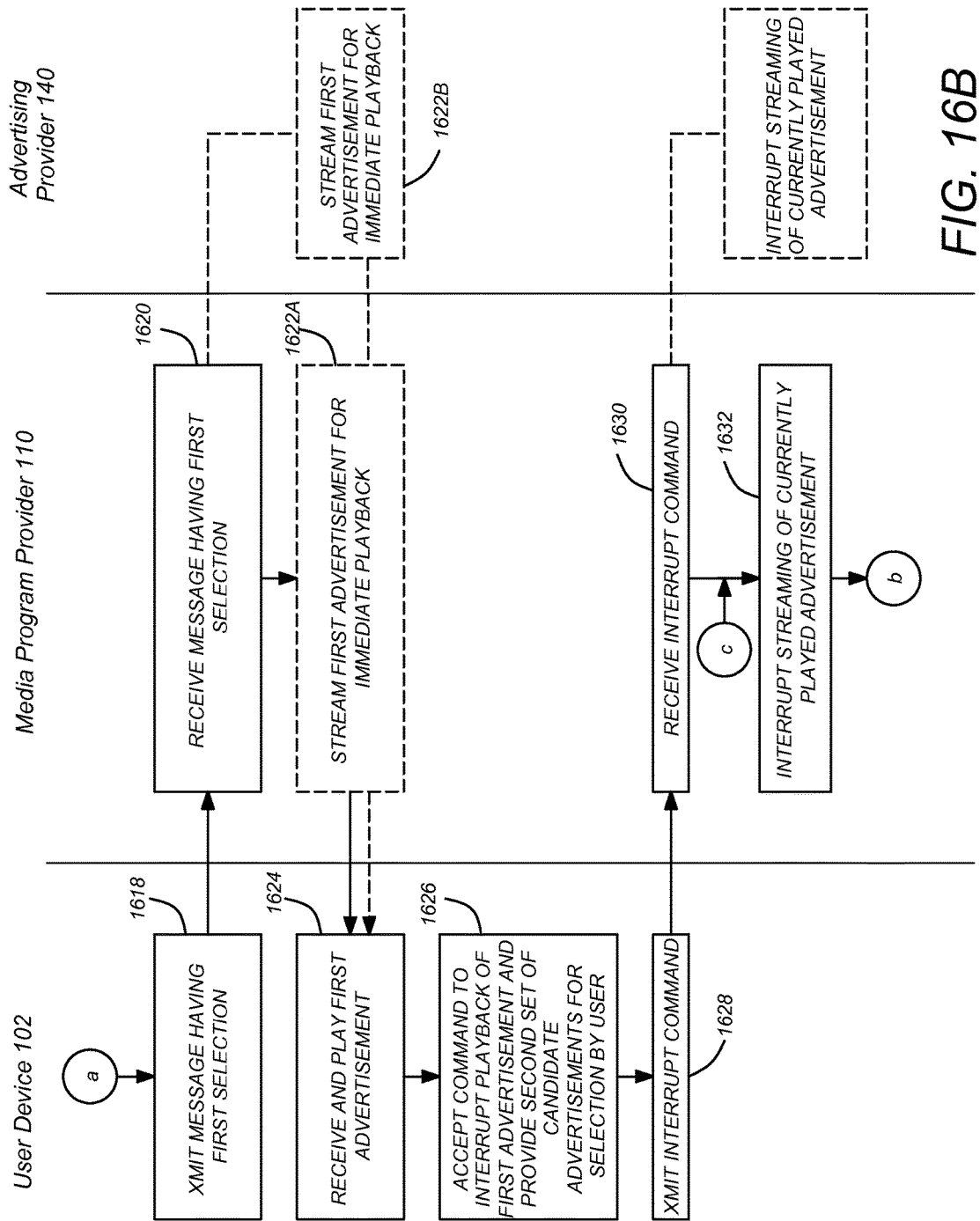
Figure 16C:
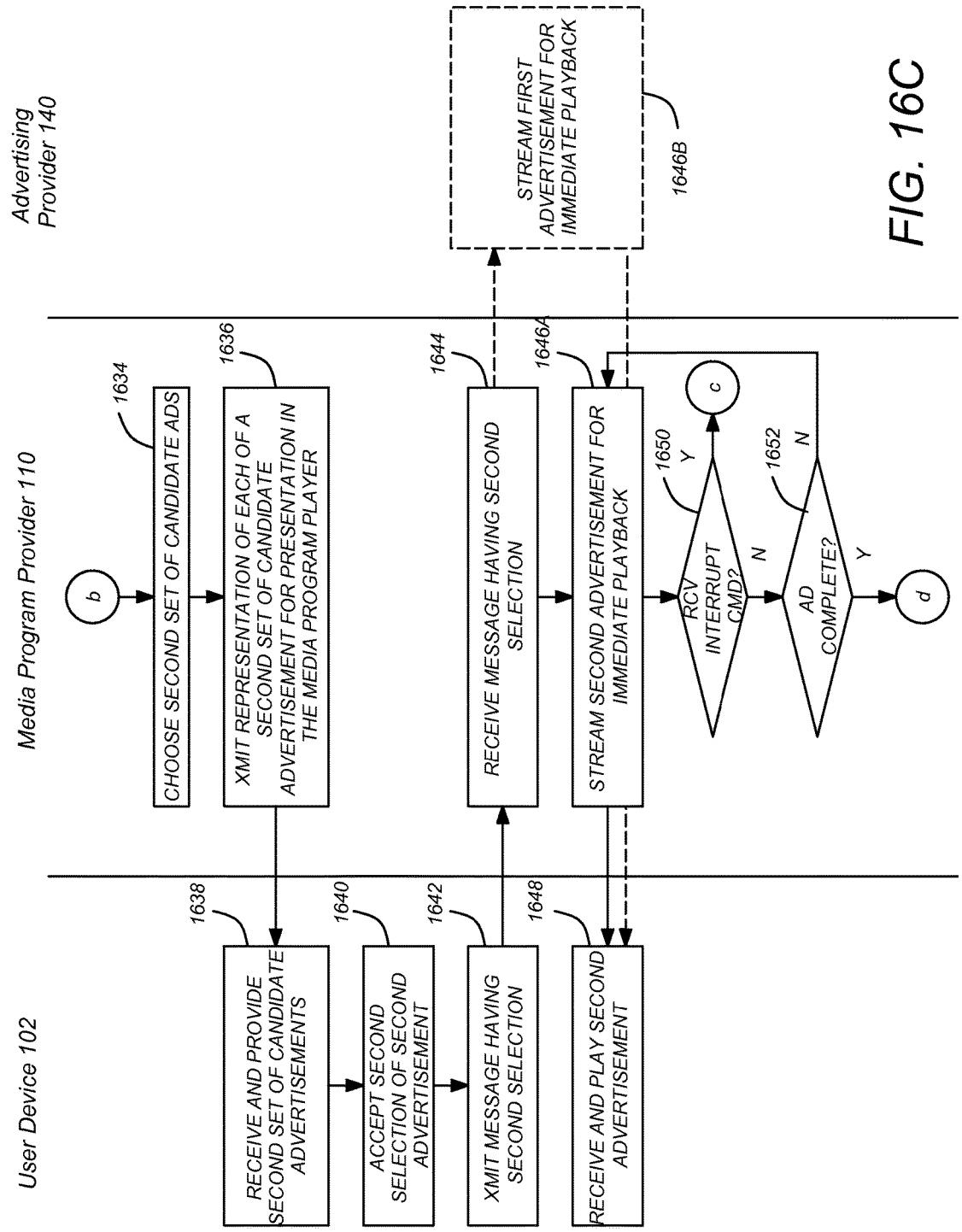
Figure 16D:
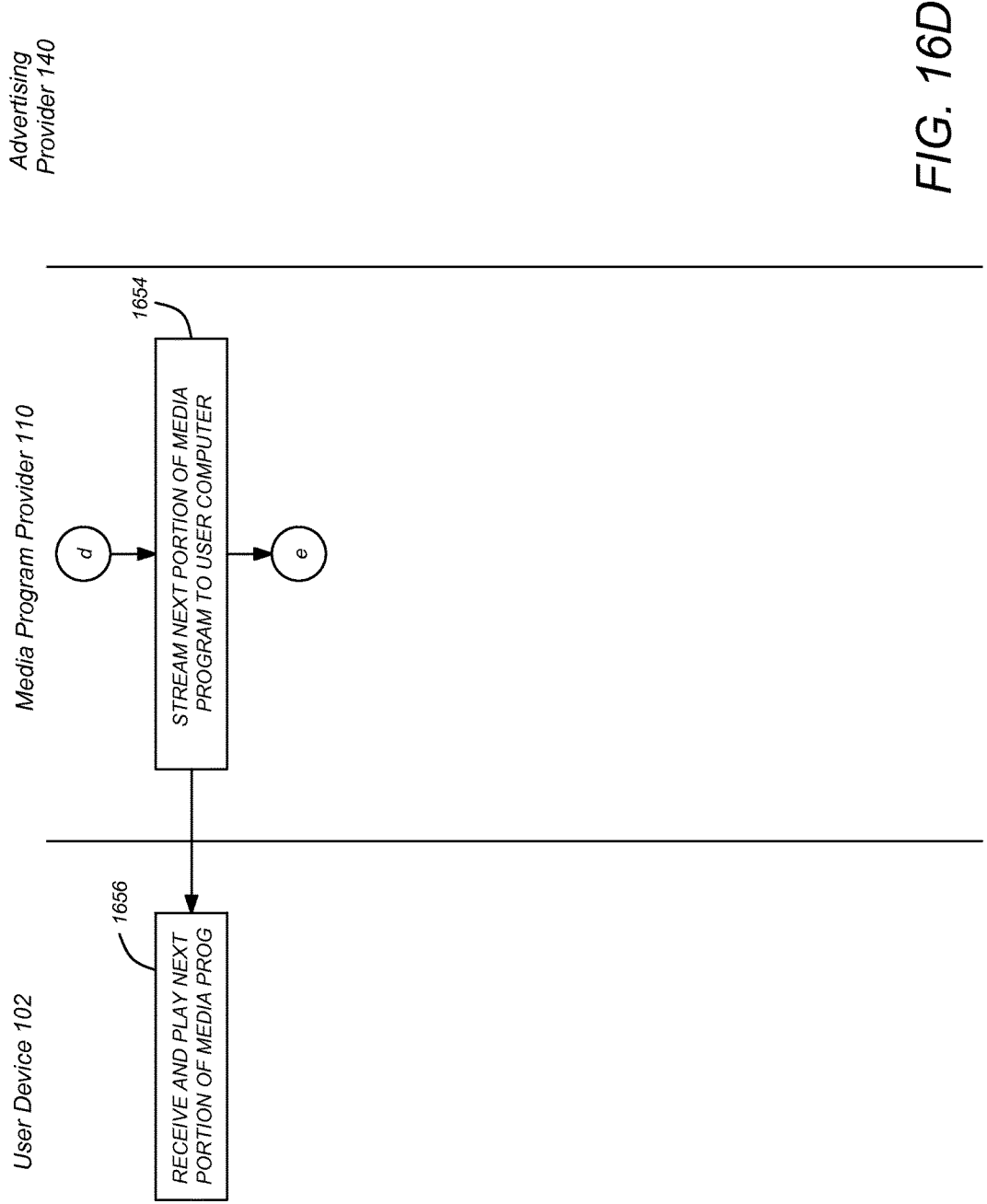

FIG. 15 is a diagram illustrating another embodiment of an interface for controlling advertisement options. In this embodiment, the set of candidate advertisements are categorized into a group of categories that are displayed in a first portion 1500 of the user interface and a group of subcategories related to each category that are displayed in the second portion 1540 of the user interface. A group of sub-sub categories can also be provided in a third portion 1560 of the user interface, or the third portion 1560 of the user interface can be used to display the a list of or thumbnails of advertisements that the user may select for display.

The first portion 1501 includes a selectable visual representation such as a thumbnail, image or selectable text for each category of the first set of advertisements (shown as items 1502A-1502C). Additional available categories (e.g. automobiles) may be displayed for selection by selecting one of the navigation arrows 1504A, 1504B.

The second portion 1540 includes a selectable visual representation such as a thumbnail, image, or selectable text for each category of the subcategories of the first set of advertisements (shown as items 1542A-1542G). Additional available categories may be displayed for selection by selecting one of navigation arrows 1544A and 1544B.

The third portion 1560 can display selectable visual representations of sub-sub categories of the first set of candidate advertisements, or simply representations of the advertisements themselves. The user can select any of the advertisements for play by mousing over the advertisement the user would like to select and depressing the mouse button. The selected advertisement (e.g. the advertisement associated with visual representation 1562B) is selected for playback.

Interrupting the Playback of an Advertisement

As described above in FIGS. 4A, 4B and 5B, it is possible for the user 132 to initiate control of advertisements presented at any time before, during, or after the playback of the media program 320. This includes the capability to interrupt the playback of an advertisement either to simply select another advertisement or to provide other advertisement control commands.

FIGS. 16A-16D are diagrams illustrating exemplary process steps that can be used to practice an embodiment of the invention in which playback of an advertisement can be interrupted to provide the user with further advertisement control, including the choice of an advertisement to substitute for the interrupted advertisement. In block 430 (also shown in FIG. 4C), a command to play the media program 320 is transmitted from the user device 102 to the media program provider 110. As described above, the advertising control interface and advertising options may then be transmitted to the user, or transmission of the media program to the user device 102 can commence after receiving this message. In the embodiment illustrated in FIG. 16A, the media program 320 is streamed to the user device 102 without presenting the advertising control interface.

As described above, the media program 320 may include a plurality of advertisement breaks 422 temporally disposed at points in the media program 320, thus separating the media program 320 into a plurality of portions 426. Each advertisement break 422 includes one or more opportunities to present an advertisement 424.

In block 1604, a first portion of the media program 320 is streamed to the user device 102. The user device 102 receives and plays the first portion 426(1) of the media program 320 using the media program player 304 executing on the user device 102.

As shown in block 1608, streaming and playback of the first portion 426(1) of the media program 320 continues until an advertisement break 422(1) and advertisement 422 opportunity is encountered. The temporal location of the advertising break 422(1) can be determined by the MPP 110 and transmitted to the user device 102 as metadata, or by user 132 preferences as further described herein. In block 1610, a first set of candidate advertisements may be chosen by the media program provider 110.

In one embodiment, the user 132 may be associated with user attributes having user attribute values. For example, the sex of the user 132 may be a user attribute, and the attribute value could be male or female. The first set of candidate advertisements described in block 1610 can be selected from a superset of candidate advertisements that may be associated with one or more advertisement rules that describe user values for which the advertisement is appropriate to be shown to the user. The first (and further) sets of candidate advertisements can be determined by evaluation and comparison of user (and other) attributes with advertising rules. A detailed description of how this may be accomplished is described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. One advantage of the system described in the '679 application is that bitmaps describing advertising rules can be computed in advance of the need for advertisement selection, and when advertisements need to be selected, they can be determined by simple logical bitmap manipulations that can be accomplished with great speed. This feature allows the candidate advertisements to be selected (or if the user 132 is not entitled to control advertisements, the selection of advertisements to present) can be performed at a time temporally very close to the beginning of the advertising break or even at the beginning of the advertisement break itself. This allows the most recent information stored in the database 315 to be used to select advertisements to display to the user 132. This feature is also especially important in streaming embodiments, because in such embodiments, the number of users may be very large, with each user being provided with an independent stream. With very large numbers of users 132 being streamed media programs 320, the MPP 110 may be required to determine which advertisements or candidate advertisements to provide to each individual user 132 in a very short time. The ability to compute the advertisements or candidate advertisements for a large number of users in a short amount of time, as made possible by the invention described in the '679 application, allows the most recent user activity to be incorporated into the database 315 describing user preferences and controls.

Once the first set of candidate ads are determined, a representation of each of the first set of candidate advertisements may be transmitted to the user device 102 for presentation to the user for selection, as shown in block 1612. The user device 102 receives and presents the first set of candidate advertisements and accepts a first selection of a first advertisement of the first set of candidate advertisements, as shown in bocks 1614 and 1616. In one embodiment, the representations of the first set of candidate advertisements include one or more thumbnails associated with each advertisement, and are presented by the media program player 304 executing on the user device 102. In another embodiment, a simple list of the advertisements in the first set of candidate advertisements is presented. In a still further embodiment, the user is not given the choice of which advertisements to watch (or the user has already made the choice before playback of the media program commenced) and the media program provider 110 simply chooses an advertisement to be played during the advertising break and begins playback of that advertisement, transferring processing to block 1622A (or 1622B).

After accepting the first selection of a first advertisement 424 from the first set of candidate advertisements, a message is transmitted from the user device 102 to the media program provider 110, where it is received, as shown in blocks 1618 and 1620. The first advertisement 424 is then streamed either from the media program provider 110 or the advertising provider 140 as shown in block 1622A. If the advertisement 424 is hosted by the advertising provider 140, a message is transmitted from the MPP 110 to the advertising provider 140 to instruct the advertising provider 140 to stream the advertisement to the user device 102. Alternatively, the MPP 110 receives the first selection, and transmits a resource locator such as a URL to the user device 102, and the user device transmits a request to stream the selected advertisement to the advertising provider 140.

The user device 102 receives and plays the first advertisement 424, as shown in block 1624. The advertisement 424 is typically played by the media program player 304 executing in the user device 102 and typically in the same window as was used to play the media program, however other embodiments are possible wherein a different media program player or other device is used to play back the advertisement 424. Further, although the foregoing depicts the streaming of the advertisement 424, other embodiments are possible wherein the advertisement 424 is progressively downloaded from the media program provider 110 or the advertising provider for immediate playback or for storage in the user device 102 for later playback. For example, the first set of candidate advertisements could all be downloaded in the user device 102 in advance of the advertising break 422(1), and replayed locally when appropriate.

In block 1626, the user device 102 accepts a command to interrupt playback of the first advertisement 424. This may occur because the user 132 has changed their mind regarding the advertisement 424, has made a mistake regarding selection of the advertisement 424, or because the user 132 simply does not like the advertisement 424. The command interrupting the playback of the advertisement may comprise a beacon call to the appropriate endpoint in the advertising server 140 or the MPP 110.

Although illustrated to have followed the selection of one or more advertisements, embodiments are possible wherein the interrupted advertisement 424 was not selected by the user 132, but rather, the MPP 110.

The user command to interrupt the playback of the advertisement 424 can be implemented in many ways. In embodiments using a browser 470 or using dedicated software, the user may command the interruption of the advertisement 424 by selection of the advertisement itself, or by selecting controls in an interface concurrently presented with the advertisement 424, such as the "ad swap" control shown in FIG. 17A. This can be accomplished by using the pointing device 483 or analogous implement to manipulate the selector 483 to hover over or select the replayed advertisement 424, for example, using pointing device 483 or by touching the display 222. In embodiments using a television, the interruption of the advertisement 424 could be implemented via user depression of a button of a remote control used with the television.

An interface may be provided during playback of the advertisement 424 providing a control for interrupting playback. This interface may also show a second set of candidate advertisements to the user 132 that can be selected. In other embodiments, the interface showing the second set of advertisements may be provided to the user only after the interrupt command is entered or when some other user input has been received, for example, hovering over an area of the user interface or selecting a stop control.

In any case, the operation of block 1626 allows the user to interrupt the playback of the advertisement 424 being currently played so that another advertisement 424 may be selected or provided. After the interrupt command is accepted, it is used to stop playback. In streaming applications, this can be accomplished by transmitting an interrupt command to the media program provider 110, which interrupts the streaming of the first advertisement 424, as shown in blocks 1628-1632. If the advertisement was streamed by the advertising provider 140, the interrupt message may be transmitted to the media program provider 110 and forwarded to the advertising provider 140, or in embodiments wherein the user device transmitted the advertising request to the URL of the advertising provider 140 as specified by the MPP 110, the interrupt command may be transmitted directly from the user device 102 to the advertising provider 140. If the advertisement was replayed locally, the user device 102 interrupts playback.

As described above, the monitoring of the playback of advertisements is important to keep track of which advertisements the user 132 has viewed and which the user 132 has not viewed. In embodiments wherein the MPP 110 acts as an intermediary for advertising streaming and control (e.g. the MPP 110 and only the MPP 110 accepts advertising control inputs such as interrupt commands and forwards them to the advertising provider 140), the MPP 110 can simply store the required information. However, in embodiments wherein the MPP 110 transmits the resource locator for the advertisement to the user device 102 and the user device requests the advertisement from the advertising provider 140, the MPP 110 is not directly involved in the streaming of the advertisement. Even so, the MPP is informed of any such command or beacon describing an analogous media program player 304 event, either by forwarding the commands/beacon calls to the MPP, or by forwarding other information derived from the commands/beacon calls so that the MPP 110 will have information from which the user's viewing of the advertisement can be inferred.

For example, although the control data normally transmitted between the server streaming the media program and the user device 102 is not available to the MPP 110, the MPPs 110 may infer that the streaming of the advertisement 424 continues so long as the MPP 110 has not received a command inconsistent with the continued streaming of that advertisement 424 (for example, an interrupt command). Alternatively, information regarding user device 102 viewing of the advertisement can be transmitted from the advertising provider 140 to the MPP 110 either as received, or on a batch basis.

After interruption of playback, data describing the advertisement control interface is generated. In one embodiment, this advertising control interface comprises identifiers and/ or a representation of second set of candidate ads that may be chosen by the media program provider 110 using techniques analogous to those described above, as shown in block 1634. In one embodiment, the second set of candidate advertisements excludes the first advertisement (which was interrupted in response to the command of block 1626), but may or may not include one or more of the other advertisements that were in the first set of advertisements. For example, the second set of advertisements may be simply the first set of advertisements with the interrupted advertisement excluded. Generally, the fact that the user did not apparently like the first advertisement provides useful information regarding the likes and dislikes of the user 132, so the member advertisements of the second set of candidate advertisements may be completely different than the first set of candidate advertisements. After selecting the second set of candidate advertisements, the advertisement control interface data is transmitted to the user device 102.

Although the foregoing illustrates an embodiment in which representations for only a first set of advertisements are transmitted in block 1612 and the second set of advertisements transmitted after receipt of the interrupt command as shown in block 1636, other embodiments are also envisioned. For example, representations for the second set of candidate advertisements (or all other candidate advertisements for the media program or the viewing session) may be transmitted along with the first set shown in block 1612. The user device 102 then receives and stores the identifiers/ representations of the first and second set of advertisements, and upon receiving the interrupt command, retrieves the second set of candidate advertisements from memory and provides them to the user 132 for selection, thus obviating the need for the second transmission of candidate advertisements show in block 1636.

An exemplary advertisement control interface is illustrated in FIGS. 14A-14B, FIG. 15, FIGS. 17A-17C, FIG. 18 and/or FIG. 19. In these embodiments, a representation of each of the second set of candidate advertisements is transmitted to the user device 102 for presentation, as shown in block 1636. The user device 102 receives representations of the second set of advertisements and provides them to the user 132, as shown in block 1638.

In block 1640, a second selection of a second advertisement 424 is accepted. A message having that selection is then transmitted to the media program provider 110 (and forwarded to the advertising provider 140 if necessary) where the message is received and used to stream the second advertisement to the user device 102, as shown in blocks 1642-1646. In embodiments in which the advertisements are locally stored, the first advertisement is interrupted and the selected second advertisement is played back locally. The user device 102 receives and plays the second advertisement, as shown in block 1648.

If a further interrupt command is received as shown in block 1650, processing is routed to block 1632, and the streaming of the currently played advertisement is interrupted and the process of reselecting another advertisement begins anew. If not, block 1652 determines if the playing of the advertisement has completed. If playing of the advertisement has not completed, processing loops back to block 1646A and 1646B to continue streaming and playback. If playback of the advertisement has completed, processing is routed to block 1654, which streams the next advertisement 424 or next portion 426(2) of the media program to the user device 102 where it is received and played as shown in block 1656. Processing then proceeds to block 1608, which waits for another advertisement opportunity. Advertisement opportunities may include enough time to replay a single advertisement or multiple advertisements. Accordingly, while the above-described playback of a single advertisement within the advertisement opportunity, a plurality of advertisements may be selected and replayed for each advertisement opportunity. Further, the user 132 may use the interfaces shown to select multiple advertisements, each of which will play in the current advertising opportunity, or the interface may be used to select all advertisements that will be shown during the playback of the media program.

If the user 132 were to interrupt a thirty second advertisement ten seconds after the advertisement began in order to select a second advertisement, then interrupt the second advertisement ten seconds after the second advertisement began, the user would end up watching a total of fifty seconds of advertising (10 s+10 s+30 s). In one embodiment, the user 132 is simply subjected to this additional advertising and is therefore disincentivized from interrupting advertisements unless they find them truly objectionable.

However, a "smart interruption" feature may be implemented to limit the total interruption of the media program to the original (i.e. non-interrupted) or other value. This can be accomplished by keeping track of how much advertisement time has been actually presented to the user, comparing that value to the amount of advertisement time in the advertisement break, and using the difference to select the advertisement(s) to be played in place of the interrupted advertisement(s). For example, if the advertisement break had a temporal length of 60 seconds, and the first advertisement of the advertising break had a interrupted temporal play length of 10 seconds (it was interrupted after 10 seconds of play), that would leave 50 seconds of advertisement time for selection of the remaining advertisement(s). That is sufficient for one or more advertisements of different lengths, for example, a 30 second advertisement and a 20 second advertisement, two 25 second advertisements, or a 50 second advertisement.

The smart interruption feature computes the played advertisement time as the time elapsed since the beginning of the advertising break and the receipt of the interruption command, computes a remaining advertising break time according to a difference between the temporal length of the advertising break and the played advertisement time. The candidate set of advertisements that are presented to the user are then based on the computed remaining advertising time. In embodiments where more than one advertisement is to be shown during the advertising break, the user interface may be provided with an interface that shows the temporal length of the advertising break, the remaining advertisement break time, and/or the elapsed time since the beginning of the advertisement break and the receipt of the interruption command.

Different versions of advertisements may be used by the advertising provider 140. For example, an advertisement for dog food may comprise a first version that is 30 seconds in length, a second version that is 15 seconds in length, and a third version, which is 5 seconds in length. Any of these three versions may be selected to fill the remaining advertising break with advertisements of the appropriate temporal length. While the foregoing indicates that the interruption of the playback of the media program occurs essentially instantaneously, other embodiments, which allow such interruption only every N seconds may be implemented. In other words, the user may be permitted to request interruption of the advertisement, but the advertisement may continue for a minimum time before the next advertisement is presented. For example, if the user requests interruption of a 30-second advertisement after 10 seconds of play, the interruption of the playback may be delayed until the advertisement has been replayed at least 15 seconds. This allows a second 15 second advertisement to be shown without empty time.

Given the teaching herein, embodiments in which other limits are imposed upon the user's ability to interrupt advertisements and/or select other advertisements for viewing are also possible. In one embodiment, users 132 may be permitted to interrupt only certain number of advertisements per media program or advertising opportunity. For example, the user 132 may be permitted to interrupt only one advertisement 424 to select another per advertisement 422(1) opportunity (during an advertisement break in the media program) and/or may be permitted a total of three interruptions and reselections per media program 320 or per hour.

The means for keeping track of how much of the advertisement 424 has been shown to the user before interruption and for computing the time remaining for other advertisements in the advertisement break can be implemented in the user device 102 including the media program player 304, the media program provider 110 or the advertising provider 140. This data is not only useful for scheduling interruptions and advertisements as described above, but also useful so that the media program provider 304 may determine on a user 132 or user group basis, which advertisements are being viewed in their entirety and which advertisements are being interrupted, and statistically how far along in time the advertisements were shown before being interrupted.

Figure 17A:
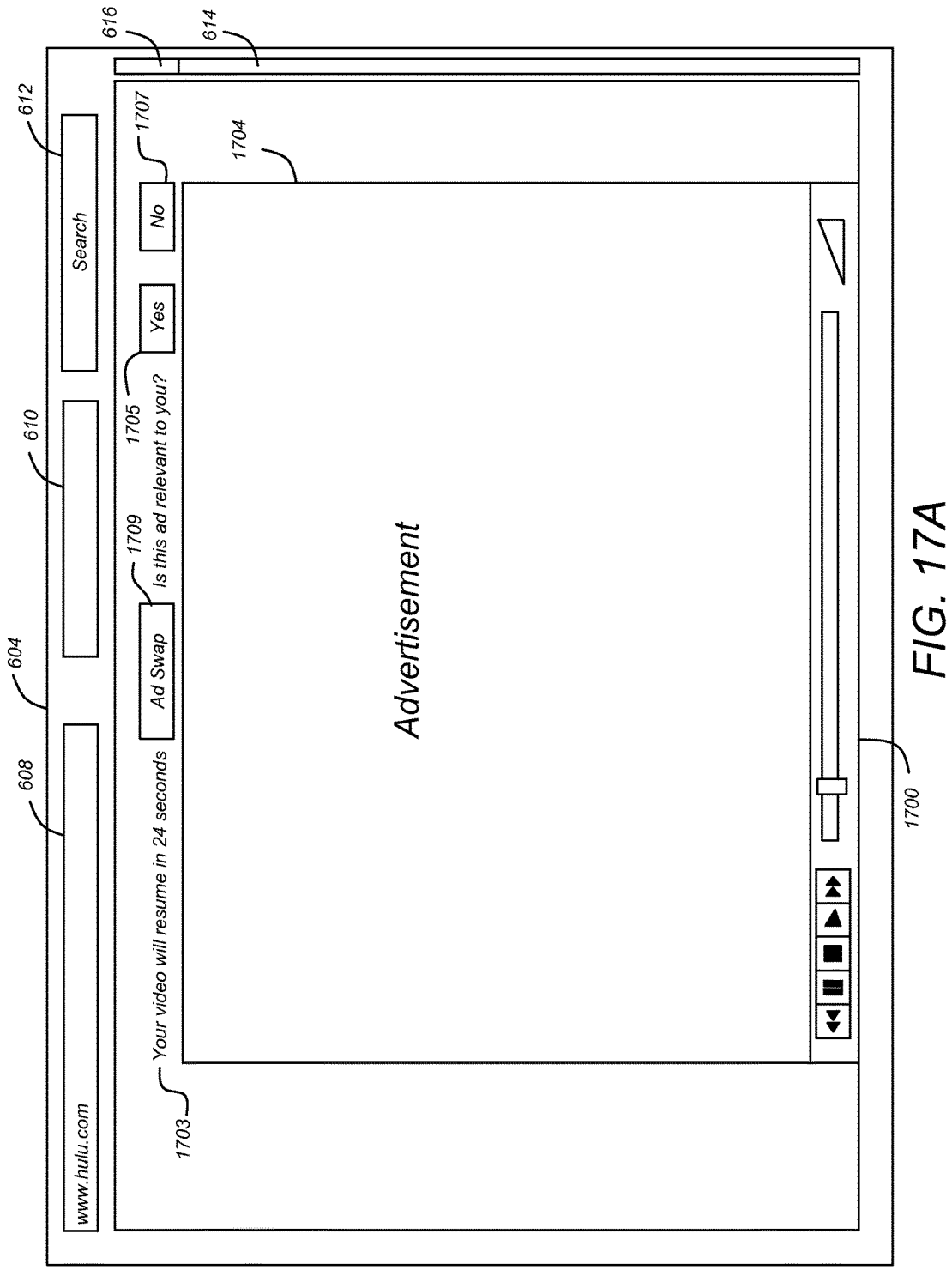
FIGS. 17A-17C is a diagram illustrating an exemplary user interfaces that can be used to interrupt the playback of an advertisement to select another advertisement and to obtain user feedback during the playing of the advertisement.
Figure 17B:
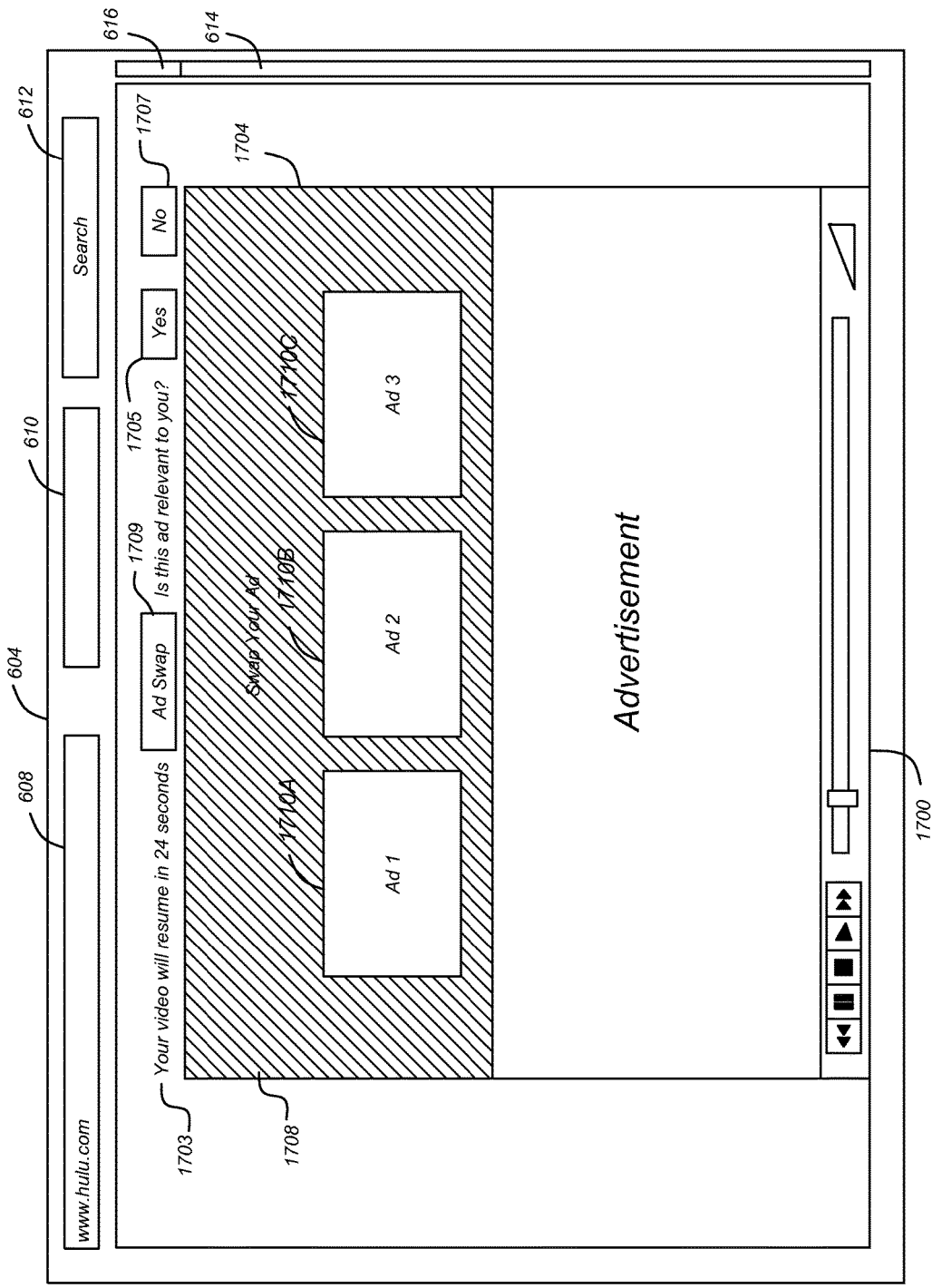

FIG. 17A is a diagram illustrating an exemplary user interface 1700 that can be used to interrupt playback of an advertisement to select another advertisement and/or to obtain user 132 feedback during the playing of the advertisement.

As illustrated, the interface includes media player interface 1704 an annunciator 1703 indicating how much time remains in the advertisement opportunity 422, and hence, how long it will be before the streaming and playback of the media program 320 will begins or resume. During the streaming and playback of the media program 320, the user can select control 1705 if the advertisement is relevant or enjoyed by the user 132 and control 1707 if the advertisement is not relevant or not enjoyed by the user. As described above, that information is transmitted (for example, via a beacon call) and used to identify future advertisements or advertisement options. The interface 1700 also may include an ad swap control 1709.

Selection of the ad swap control 1709 sends a command to the MPP 110 to send additional data updating the user interface to provide the user 132 with the ability to swap another advertisement for the one being presented to the user. In the illustrated embodiment, a portion of the player area 1704 is shaded to partially occlude the advertisement (thus permitting continued playback of the advertisement that was interrupted until another selection is made). The shaded portion 1708 includes a plurality of thumbnails 1710A-1710C, each representing an advertisement that may be substituted for the interrupted advertisement. Upon selection of one of the thumbnails, the streaming and playback of the interrupted advertisement is ceased, and the streaming and playback of the selected advertisement is commenced.

In one embodiment, advertisers are not charged or are charged less for advertisements that are interrupted. However, since the user 132 is presumably more interested in the advertisement selected to replace the interrupted ad, the MPP 110 may charge the advertiser of the second advertisement greater than that of standard advertisement.

Advertisement Feedback

As described above, one embodiment of the invention provides the user 132 with a means for providing feedback regarding the advertisements presented. This feedback can be provided during the presentation of the advertisement, or after the advertising is presented. This information can be used to learn more about the user 132 so that more suitable advertisements may be selected for presentation (whether as a set of optional advertisements for selection by the user or as advertisements that must be shown to the user).

For example, FIG. 4D shows an embodiment in which data that is used to provide advertising feedback is transmitted to the user device 102 included within or in conjunction with the streamed advertisement.

Figure 17C:
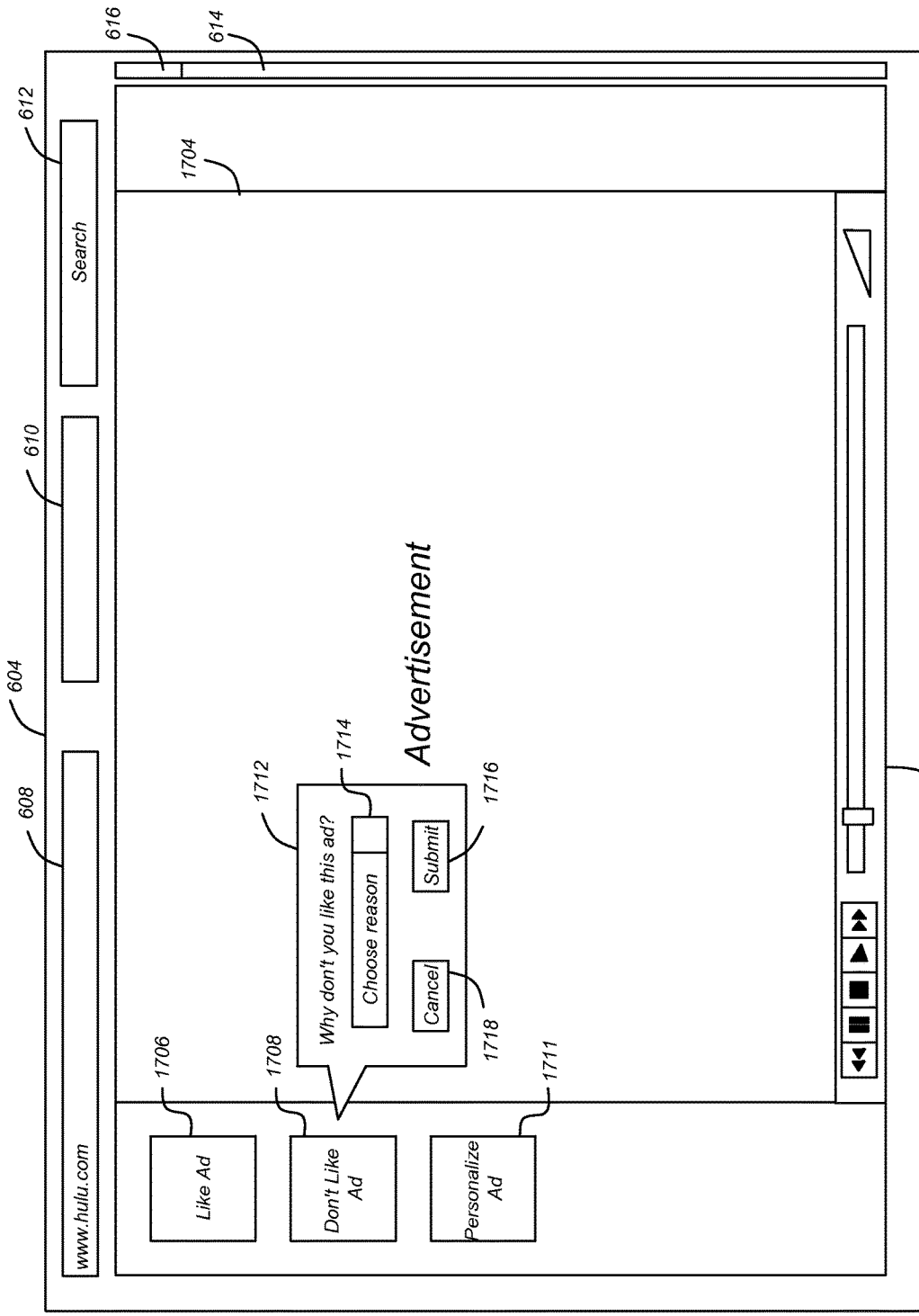

FIG. 17C is a diagram illustrating an exemplary user interface 1701 that can be provided to the user 132 after the user has viewed an advertisement. The interface 1701 includes a media player 1704, which played the advertisement, a first control 1706 for indicating that the advertisement was liked by the user 132 and a second control 1708 for indicating that the advertisement was not liked by the user 132. Selection of either the first control 1706 or the second control 1708 opens a control set 1712 in which the user 132 can indicate why they liked or didn't like the advertisement. The user 132 indicates as such by selecting a choice from a menu of choices in the input box 1714, and selecting the "submit" control 1716. If the control set 1712 is open and the user 132 has decided not to provide a reason or offer an opinion on the advertisement, the user 132 may select the "cancel" control 1718. Responses for why the user 132 likes the advertisement can include that it is entertaining or relevant, while responses for why the user does not like the advertisement can include that it is offensive, not relevant (the user does not plan on purchasing the depicted kind of product or service or prefers a different brand), repetitive, too loud, or was inserted at an inopportune time into the media program. Further, the user may be permitted to enter "other" in answer to whether they did or did not like the ad. The user may be compensated for providing feedback (e.g. in the form of reduced advertisements), or not. However, even in cases where the user is not provided direct compensation for providing feedback, the user is still provided some benefit, because the user's answers can be used to more accurately select future advertisements.

The user may also select the "personalize ad" control 1711, if the user would like to take a survey having one or more survey questions or enter other advertisement control data. In one embodiment, the survey questions are weighted towards questions or question categories that have been deemed relevant in choosing the advertisement for the user 132 to view. For example, if the user 132 had previously expressed an interest in sports cars, and the advertisement presented was for sports cars, the survey questions presented in response to the selection of the personalize ad control 1711 can be survey questions that explore the user's interest in sports cars in greater detail (e.g. do they prefer foreign or domestic sports cars or whether sports sedans of interest).

Additional Advertisement Controls/Option Interfaces

Figure 18A:
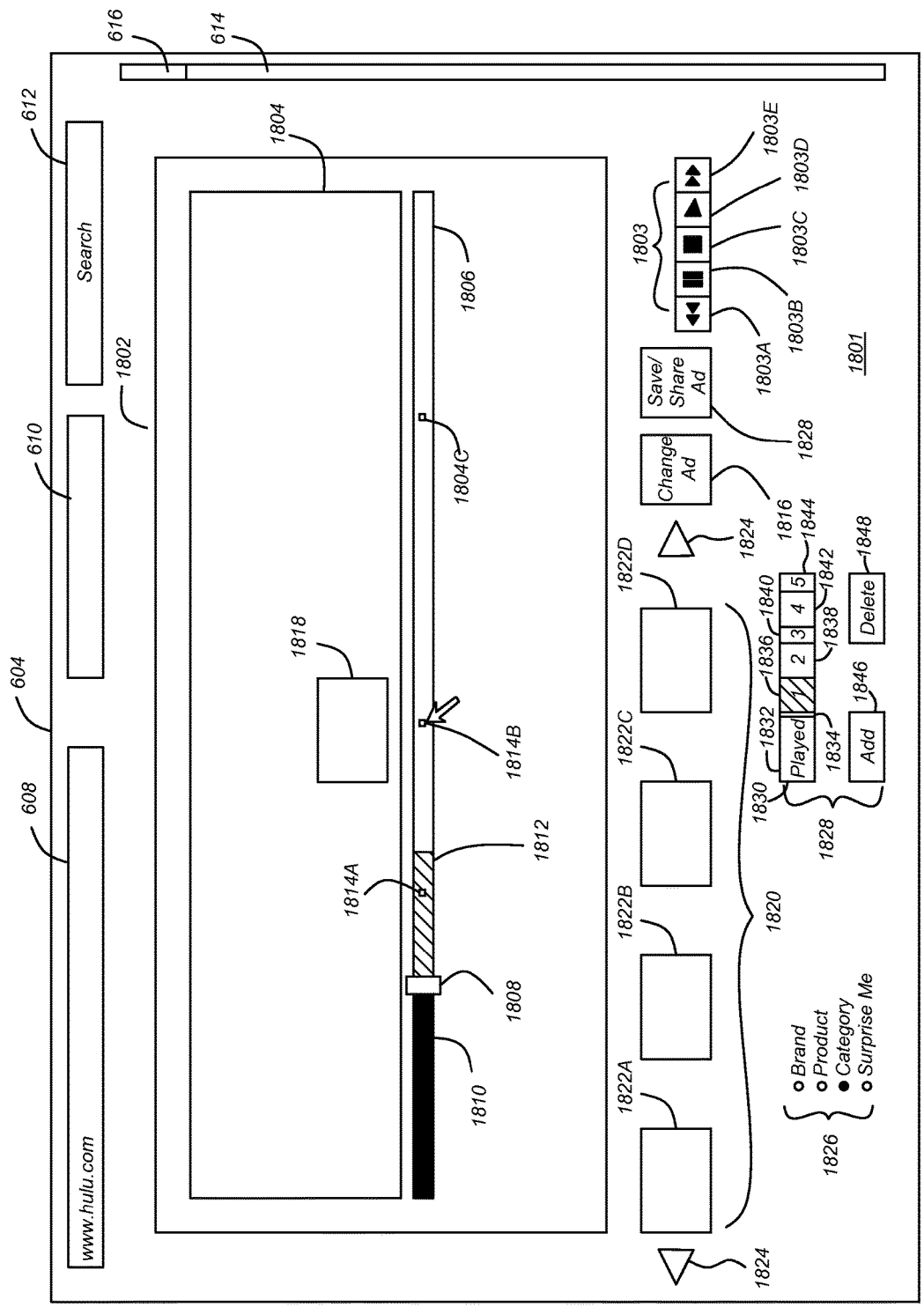
FIGS. 18A-18E are a diagram illustrating exemplary embodiments of user interfaces and processes that can be used edit the user's advertisement experience.

FIG. 18A is a diagram showing an exemplary embodiment of a user interface 1801 for controlling the presentation of advertisements. A media program player interface 1802 is presented via the user device 102. The media program player interface 1802 includes a presentation area 1804 for presenting the media program moving images, a progress bar 1806, and playback controls 1803 (which include a fast reverse control 1803A, a pause control 1803B, a stop control 1803C, a play control 1803D, and a fast forward control 1803E). The progress bar 1806 spans the length of the media program and provides an indication of the current temporal playback location of the media program, as indicated by slider 1808. The area 1810 to the left of the slider 1808 indicates the portion of the media program already presented, and an optional shaded area 1812 to the right of the slider 1808 indicates that portion of the media program that has been received and buffered for playback. In one embodiment, the progress bar 1806 also includes indicators 1814A-1814C that indicate the temporal position of advertisement breaks during presentation of the media program. For example, 1814A indicates that one or more advertisements will be shown at the indicated temporal location, as does indicator 1814B and indicator 1814C. The number of advertisements that may be shown during an advertising break may be one or a plurality of advertisements.

In one embodiment, when playback of the media program progresses to the point of an advertising break (e.g. indicated by the slider 1808 located over one of the indicators 1814A-1814C), playback of at least one of the advertisements to be played during the advertisement break begins. The user can indicate that they wish to interrupt the playback of the media program by selecting an interrupt control 1816 or by attempting to move the slider 1814 from it's current position on an indicator 1814A-1814C.

When such an interrupt command is made, the media program player 304 may simply stop playback of the current advertisement and begin playback of another advertisement selected by the media program player 304, or the user may select an advertisement to play in the interrupted advertisement's place. In embodiments wherein the user selects the replacement advertisement, the set of advertisements from which the replacement advertisement may be chosen may be presented to the user in an option area 1820 proximate the presentation area 1804. As shown in FIG. 18A, thumbnails 1822A-1822D for each of the advertisements in the set of set of candidate replacement advertisements may be displayed, and navigation arrows 1824 can be used to select thumbnails for additional candidate advertisements in the set. The advertisements that are presented for selection in the option area 1820 can be organized by brand, product/service or category of product/service, using radio buttons 1826. The user may also select a "surprise me" radio button that randomizes the options presented.

Still another embodiment allows the user to preview which advertisements will be shown at which times during the playback of the media program. For example, when the user mouses over, right clicks, or otherwise selects one of the indicators (e.g. indicator 1814B in FIG. 18A), thumbnail(s) for the advertisements that are currently planned to be shown during the advertisement break represented by the indicator can be shown proximate the moused over indicator 1814 or in the option area 1820. For example, by mousing over indicator 1814B, one or more thumbnails 1818 for the advertisement(s) planned to be shown during the advertisement break indicated by the indicator 1814B may be shown as illustrated. This feature permits the user to determine, at any time during or before playback of the media program, which advertisements are scheduled to be shown during media program playback. The user can select the thumbnail of one of the advertisements scheduled to be shown, and select a different advertisement from options presented in the option area 1820 (e.g. by dragging a thumbnail 1822 to the indicator 1814) or in a different user interface such as the interface shown in FIG. 16. In one embodiment, the user selects all of the advertisements before the media program commences playback, while in other embodiments, the media program player commences playback, and a short period of time before the advertisement is to be played, the user is given the opportunity to select the advertisement, or to change the pre-selected advertisement to another advertisement. In other embodiments, the user 132 may invoke the interface shown in FIG. 18A anytime by activation of a suitable control.

Since more than one advertisement may be played during the advertisement break, the advertisement selection user interface may be augmented with an advertisement scheduler portion 1828 that can be used to select which advertisements are replayed and when for each advertising break. FIG. 18A illustrates an example of a user interface presented when the user 132 has interrupted the playback of an advertisement played during the advertisement break indicated by indicator 1814B. The length of the advertisement break bar 1830 indicates the temporal length of the advertisement break. A first portion 1832 indicates the temporal duration of advertisements that have already been played, and the remaining length of the advertisement break bar 1830 indicate the remaining advertisement break time. The user 132 may then select advertisements from the option area and drag them to the advertising bar, placing them in the desired order relative to other advertisements to be played during the advertisement break. Time bar 1834 indicates where the user-initiated interruption of the playback of the advertisement occurred, and the distance to the right of the time bar 1834 indicates how much time remains in the advertising break to play additional advertisements. In the illustrated embodiment, five advertisements have been selected and placed in the area to the right of the time bar 1834. The relative temporal length of each advertisement is indicated by the width of the blocks 1836-1844 representing each selected advertisement. Advertisements can be placed into the advertisement break bar 1830 by any suitable method, including selecting thumbnails of candidate advertisements from the option area 1820 and dragging them to the appropriate position within the advertisement break bar 1830, or by selecting thumbnails and selecting the add button 1846 to add an advertisement or the delete 1848 button to delete the advertisement. Advertisements can also be reordered simply by selecting them and dragging them to a new position.

In a further embodiment, the saved advertisements may be transmitted to third parties, for example, friends of the user. The desired advertisement may be saved by selecting the advertisement (e.g. by selecting the thumbnail associated with the advertisement) and selecting the save/share control 1828, or by selecting the save/share control 1828 while the desired advertisement is being played. Selecting the save/share control 1828 may open a further interface giving the user a choice as to saving or sharing the advertisement. If the user chooses to save the advertisement, the software file having the advertisement may be stored by the user device 102 or a notation can be made by the media program provider 110 to the effect that the user has decided to "bookmark" the advertisement for easy access later. If the user chooses to share the advertisement, an interface may be opened in which the user 132 can (1) be presented a URL to the advertisement that can be copied, pasted, and transmitted to others via e-mail or chat message (2) share the advertisement via a social networking provider such as FACEBOOK using a suitable control or (3) be presented with code for embedding the advertisement into websites, blogs, or online forums. If the user chooses to share the advertisement, the advertisement, or a link to the advertisement may be transmitted via e-mail or personal message. The shared advertisement may also be delivered to the user internally to the media program provider 110. In other words, if the user sending the advertisement and the user receiving the advertisement are both registered with the media program provider, the user sending the advertisement (transmitting user) may simply identify the advertisement to be transmitted and the user that is to receive the advertisement (receiving user). The advertisement and the identity of the transmitting user may then be provided to the receiving user by the media program provider 110 without resort to an external e-mail or other communication system. Saved advertisements may also be added to a user's advertisement playlist as described below, and advertisements shared with another user may also, subject to approval by the other user, be added to the other user's advertising playlist.

In a still further embodiment, the user 132 may not only change which advertisements are played during the advertising breaks, but also when the advertisement breaks occur in connection with the playback of the media program.

For purposes of the discussion of FIGS. 18A-18E, we distinguish between advertising opportunities and advertising breaks. We refer to an advertising opportunity as a temporal location or interval in a media program where one or more advertisements may be inserted without substantially interrupting the flow of the presented media program. For example, advertisement opportunities are typically present at the end of one scene and before another scene begins. They may also be present after a theme or storyline of the media program has been established and another is about to begin. Or, when an aspect of the storyline of the media program is near resolution, an advertising opportunity may exist before the aspect is resolved, thus inviting the user 132 to remain to watch the remainder of the media program. Typically, media programs are produced with certain advertising breaks in mind, with the advertising breaks spaced equally throughout the program (Also for purposes of this discussion, we refer to an advertising break as an advertising opportunity which is actually used to present advertisements). For example, a media program that is to run 30 minutes with advertisements may have a single opportunity at about the 15 minute point, or may have an advertising opportunity 10 minutes after the media program begins and another 20 minutes after the media program has begun. Hence, a media program may have many advertising opportunities, but for purposes of discussing FIGS. 18A-18E, if advertisements are inserted into the media program at only one of those opportunities, the media program is said to have a single advertising break.

Figure 18B:
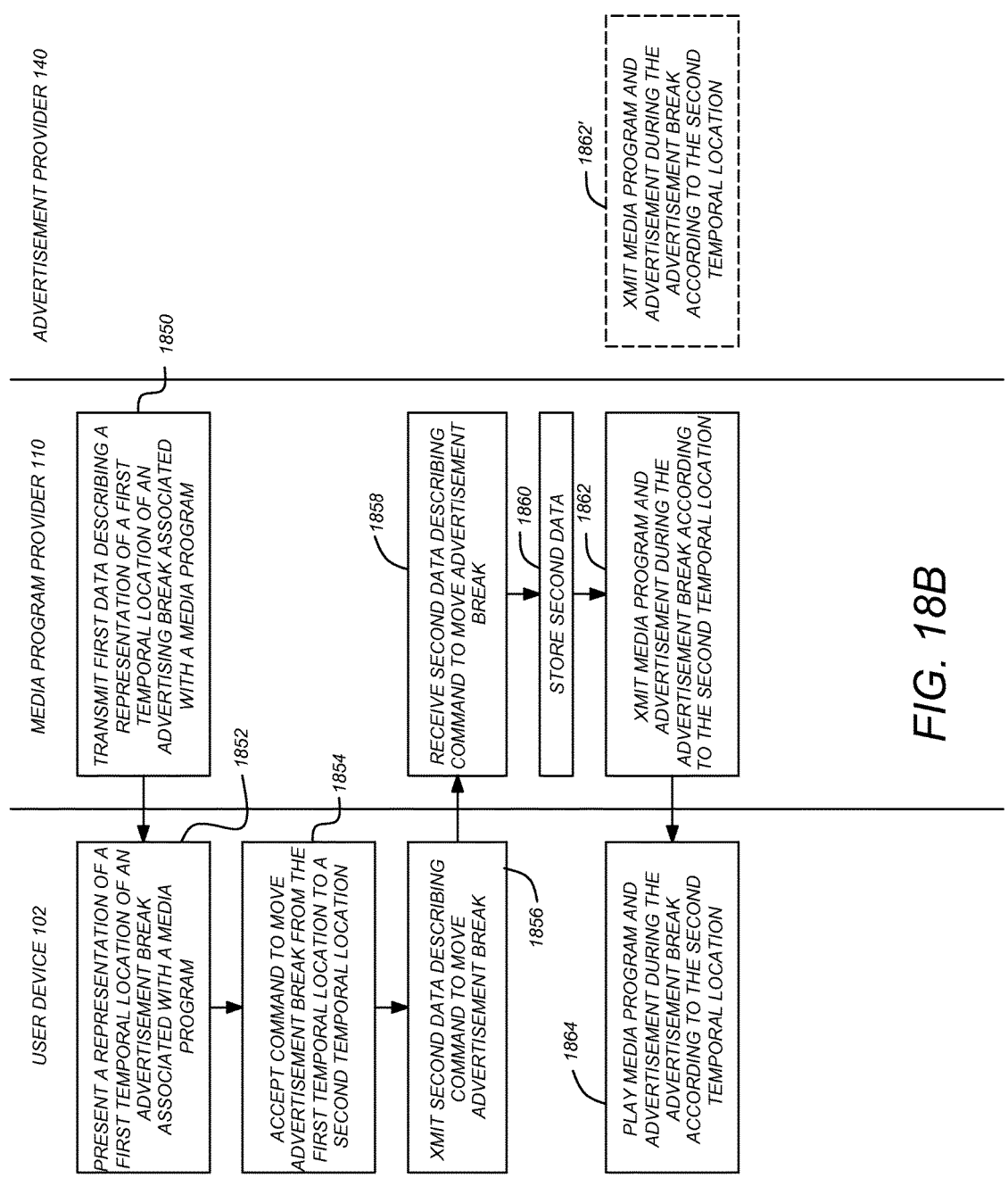
Figure 18C:
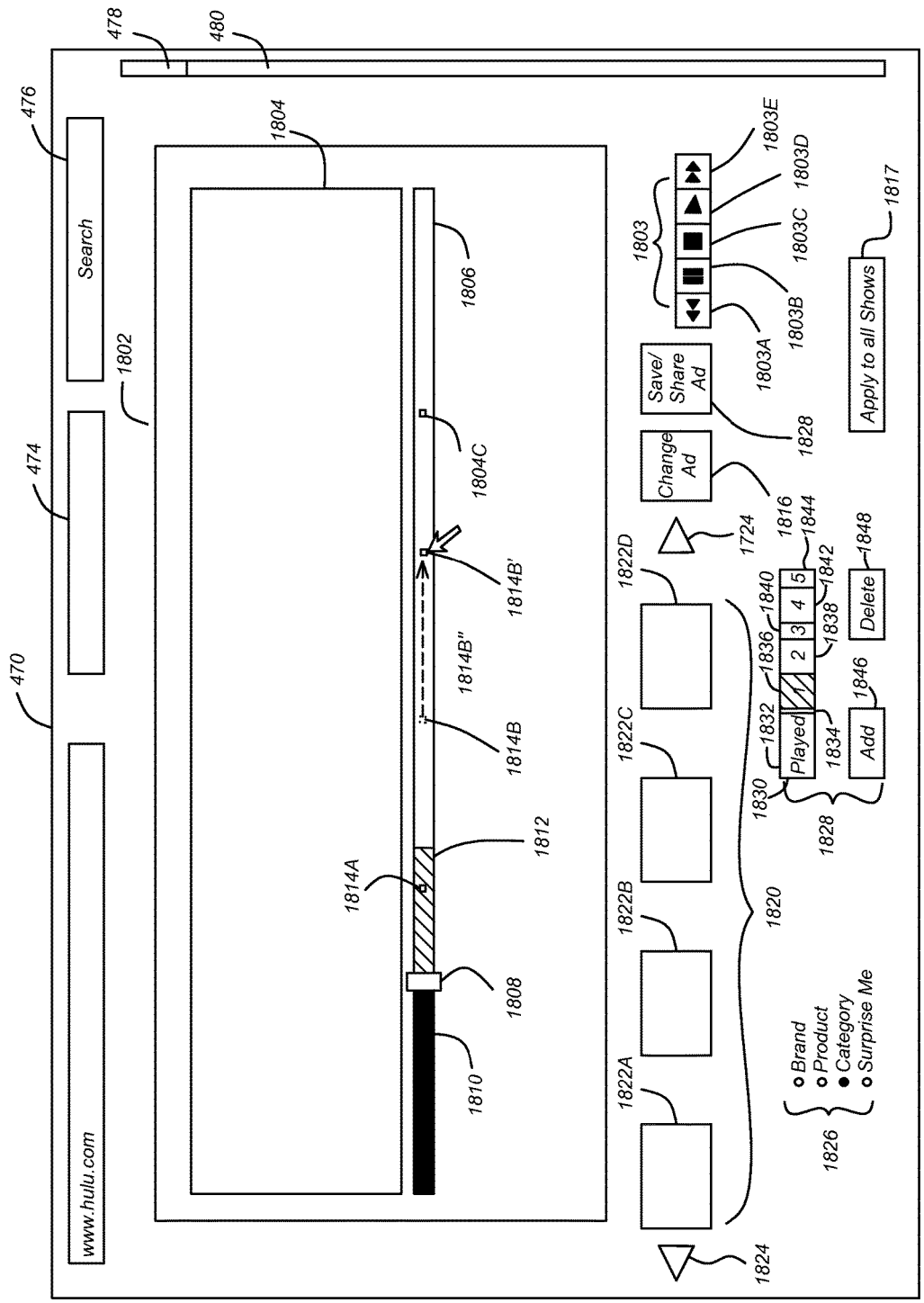

Referring now to FIG. 18B, the media program provider 110 transmits first data describing a representation of a first temporal location of an advertising break associated with a media program, as shown in block 1850. In one embodiment, this data is a webpage having data and instructions that, when executed on the user device 102, present the interface shown in FIG. 18A. In block 1852, the user device receives the first data and presents a representation of the first temporal location of the advertisement break associated with the media program. This can be performed, for example, by presenting the interface shown in FIG. 18A, with the temporal location of the advertising break shown by indicators 1814A-1814C. Next, as shown in block 1854, the user device 102 accepts a command to move the advertisement break from the first temporal location to a second temporal location in the media program, as shown in block 1854. Referring to FIG. 18C, this can be accomplished by selecting an indicator 1814 and moving it to a different location along the length of the progress bar 1806, for example, moving indicator 1814B to location 1814B'. This command indicates that the user 132 desires to move the advertisement break from a first temporal location indicated by 1814B later within the media program to a second temporal location indicated by 1814B'. In response to this command, the user device 102 transmits second data to the media program provider that describes the command to move the advertising break. For example, this data may simply identify the advertising break and indicate the desired temporal position. In block 1858, the media program provider receives the second data, and in block 1860, the data can be stored. In block 1862, the media program provider 110 transmits the media program and the advertisement(s) that are to have been played during the advertising break to the user device 102 in accordance with the second temporal location. Finally, in block 1864, the user device receives and plays the media program and the advertisement(s) during the advertising break according to the second temporal location.

As described herein, the media program may instead be transmitted directly from a server of the media program source 120 and the advertisements may be transmitted directly from the advertising provider 140. Further, although the foregoing has been described in an embodiment in which the media program and advertisements are streamed to the user device 102, other embodiments are possible wherein the media program and the advertisements are downloaded to the user device in advance of a playback command. Since the media program and advertisements are not streamed in this embodiment, the operations shown in block 1856-1862 are not necessary, and the temporal location of the advertising break may be controlled within user device 102.

Using the above techniques, the user 132 may move an advertisement break anywhere in a media program. However, it is possible for the user to place the advertisement break in an undesirable temporal location of the media program. For example, the user may inadvertently move the indicator 1814B to a location 1814B' that is within a scene. Without correction, this would result in an advertisement break being placed such that it interrupts a scene or even dialog of a scene, perhaps in mid-sentence. To prevent this undesirable result, one embodiment moves the selected temporal location of the advertising break to a third temporal location.

Figure 18D:
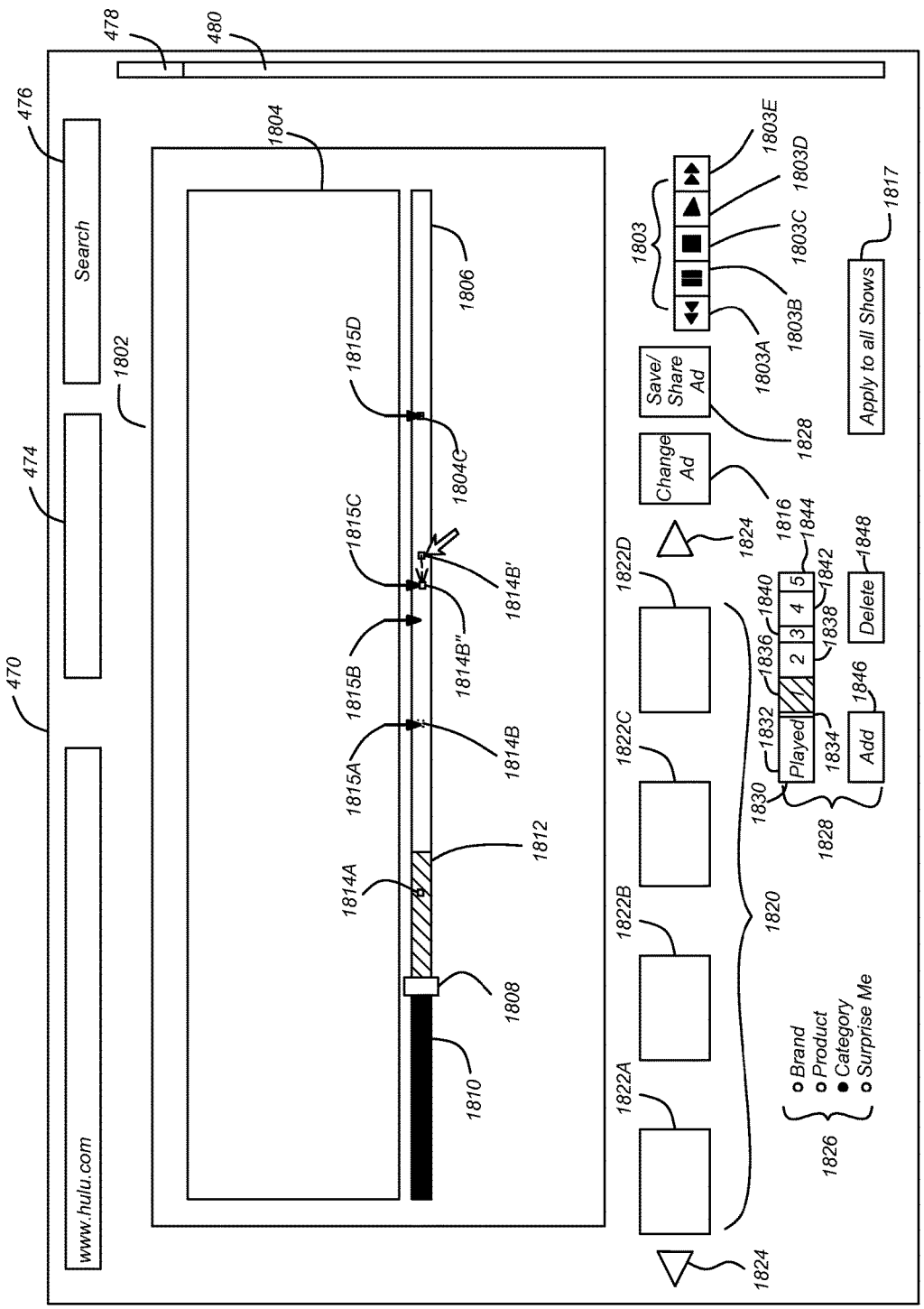

FIG. 18D is a diagram illustrating how the advertisement break may be further moved to a third and more desirable temporal location. In this embodiment, the progress bar 1806 may include a representation of advertising opportunities 1815A-1815D, and the selected temporal location 1814B' is moved to a temporal location 1814"B corresponding to a nearby advertising opportunity 1815. In one embodiment, for example, the selected temporal location of the advertising break is moved to advertising opportunity 1815C that is temporally closest to the second temporal location (shown by indicator 1814B'). In doing so, the result is that the advertising break is moved according to the second temporal location selected by the user 132, but it is additionally moved so that the advertisement break is placed in a suitable temporal location.

The logic moving the temporal location from the second location to the third temporal location 1814B" may be implemented in the user device 102 or the media program provider 110. For example, the location of the advertising opportunities 1815 may be transmitted from the media program provider 110 to the user device 102 as a part of the first data, and thereafter, the user device compares the commanded second temporal location 1814B' with the advertising opportunities 1815 to determine which advertising opportunity 1815 the advertising break will be moved to. This data may then be included in the second data transmitted to the media program provider 110 in block 1856. This allows the user device 102 to immediately "snap" the selected temporal location of the advertisement break to one of the advertisement opportunities. The advertising opportunities transmitted from the media program provider 110 may also be fewer than all possible advertisement opportunities, so as to limit the user's control over where the advertisement breaks may be placed. Alternatively, the logic moving the temporal location from the second temporal location to the third temporal location may be implemented in the media program provider 110.

The commanded temporal location may be used only for the media program presented on the interface, or may be used with all media programs of similar length. This allows the user 132 to designate where they would like advertisement breaks to be placed, and have those advertisement breaks placed in those locations for all of the media programs that the user 132 views thereafter, particularly those that are of similar length.

For example, the user 132 may perform the above operations to specify advertising breaks after the first third of the media program has been played and after the second third of the media program has been played. After doing so, the user 132 may select a control such as control 1817 that applies the desired location of the advertisement breaks to all media programs. Thereafter, all media programs will include advertising breaks after the first third of the media program has been played and again after the second third of the media program has been played. To assure that the advertisement breaks are inserted into the appropriate locations, they may be adjusted to occur at the nearest advertising opportunity to the ½ and ⅔ locations. Further, the user 132 may also distribute advertisement breaks differently for media programs of different length, and apply those advertisement break distributions only to media programs of analogous length.

Figure 18E:
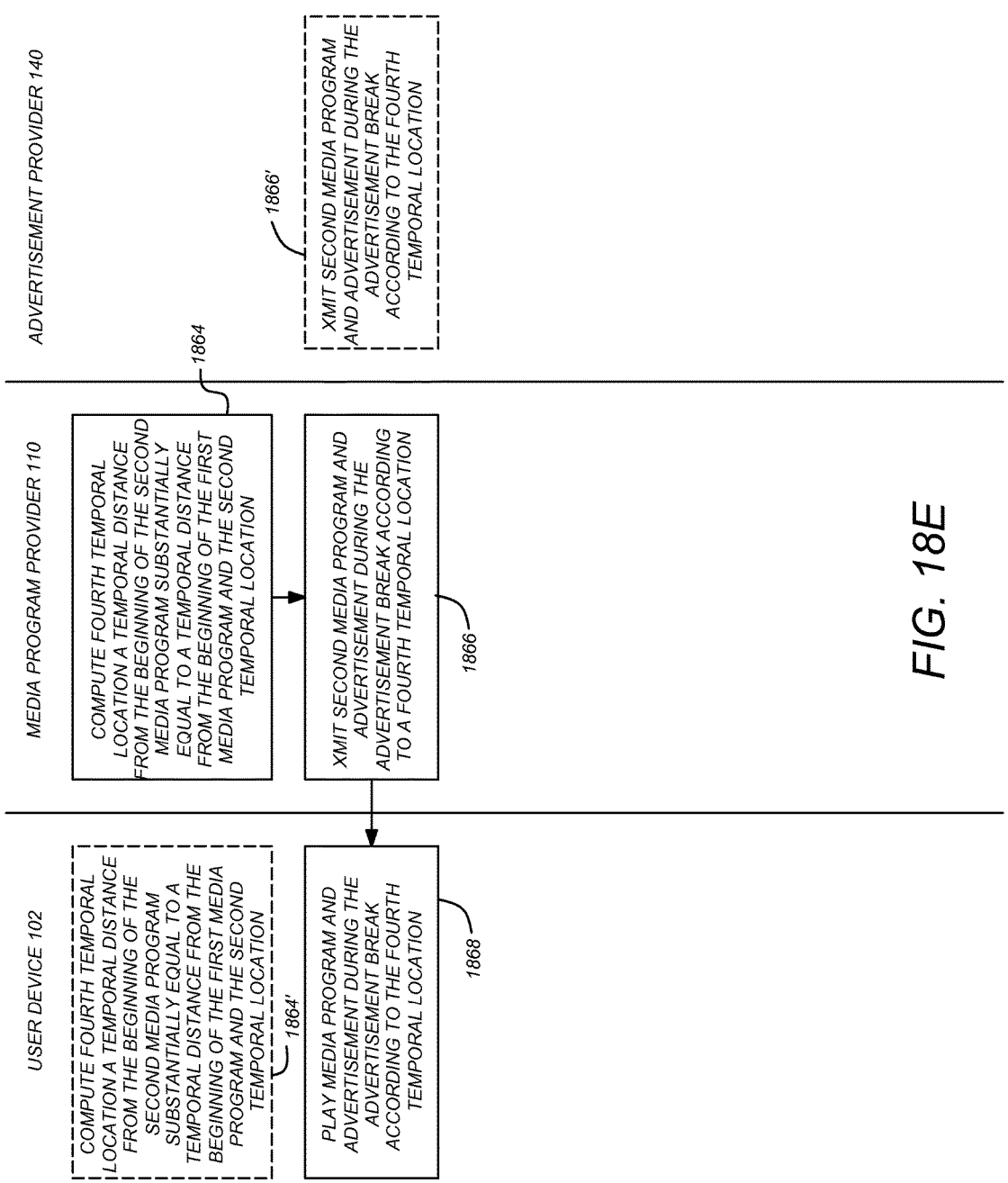

FIG. 18E is a flow chart illustrating functionality that can be used to apply advertisement break temporal settings to a second media program. In block 1864, a fourth temporal location is computed. The fourth temporal location is a temporal distance from the beginning of the second media program substantially equal to the temporal distance from the beginning of the first media program and the commanded second temporal location. This allows the media program provider to compute where the advertisement break should be located for another media program. As shown in block 1864', this may also be performed in the user device 102. Next, in block 1866, the second media program and any advertisements associated therewith are transmitted to the user device 102, with the advertising break temporally located according to the fourth temporal location. In block 1868, the user device 102 recites the media program and advertisement(s) and plays them at the appropriate time.

The foregoing interface may also be used to add or subtract advertising breaks from the media program. For example, the user may prefer that a single advertising break before the media program is played (analogous to a prefacing advertisement) in which all advertisements for the media program be played, and thereafter, receive no further advertisements in conjunction with that media program. This may be implemented by selecting on the indicators 1814 associated with the advertisement breaks that the user 132 would like to delete, and selecting the delete control 1848. Similarly, the user 132 may add advertising breaks by selecting the temporal location where they would like the advertising break to be located, and selecting the add control 1846, thereafter moving the advertisement break to the desired location. In one embodiment, the total length of all advertisements played in conjunction with the media program does not change, but instead, the distribution of those advertisements among the advertisement breaks is changed. For example, if six advertisements are to be shown in conjunction with the media program and the user includes two advertising breaks, three advertisements may be shown in each advertising break, while if the user 132 includes three advertising breaks, two advertisements may be shown in each advertising break. The allocation of advertisements to advertisement breaks may instead be based on time so that approximately the same length of advertising is shown in each advertising break. Furthermore, although the initial allocation of advertisements may be distributed as described above, it may be changed by the user by grabbing advertisement representations and moving them with the indicators 1814 for another advertisement, and further edited if necessary using the interface as described above.

The foregoing can provide the user 132 with the ability to directly control the timing and number of advertising breaks presented with the media program. However, in some instances, it may be beneficial to place limits on the user's ability to control the advertising breaks as described above. For example, without limits, it might be possible for a user to begin one viewing session with the media program provider 110 to view a media program, then use the foregoing techniques to move all advertisement breaks so that the advertisements are presented near the end of the media program, while concurrently opening another session with the media program provider 110 and moving all of the advertisement breaks to present the advertisements at the beginning of the program. The user 132 may then watch the first session until the mid point of the media program, then switch to the second session to watch the remainder, thus viewing the entire media program with zero advertisements.

To discourage this and similar abuse, the media program provider may enforce advertisement delivery goals. For example, logic could be implemented that would constrain the use of the advertisement break moving functionality to assure that the user 132 has provided specified number of advertising impressions (viewings) by a certain time and date. If the media program provider 110 calculated the delivery and viewing of advertisements was behind the desired amount by x % (a configurable parameter that the operators of the ad service 316 could change based on need) the user's ability to control advertising breaks would be limited, even to the point of denying the option to move ad breaks for that piece of media content.

This solution can be taken a step further, where the media program provider 110 would still allow the user to use move advertising breaks even if advertisement delivery were behind by x %, but the user 132 is permitted to move only a subset of the ad breaks that would otherwise be allowed. For example, the user may be prevented from moving the prefacing ad breaks and/or some combination of intervening ad breaks.

In another embodiment, the media program provider 110 may monitor how much content and advertising each user 132 has consumed, and the advertising break moving functionality be available only if the ratio between consumed content and advertising was above a particular value. This can be done through a combination of registration data, beacons and/or IP addresses. This solution is particularly relevant for content that can only be viewed by users that are registered and logged in.

Furthermore, the advertising break moving functionality can be made available only to users who have registered and are logged in. The availability of the functionality may be offered to users 132 who are not registered and logged in but if and when the user 132 were to attempt to use the feature, the user 132 would receive a login/registration prompt. Once logged in, the media program provider 110 may monitor how many advertising break moves have been used by that user 132 and thus ration the feature accordingly. For example, the user 132 may be limited to use the functionality 5 times in a 24 hour period or limited to move only one advertising break per media program.

Advertisement Playlists

FIGS. 19-21C are diagrams illustrating an embodiment in which the user 132 can manage the presentation of advertisements, including the creation and management advertisement playlists.

Typically, this is initiated via a user command as shown in block 404 of FIG. 4A), however, this may also be initiated by the media program provider 110 at an advertisement opportunity, as shown in block 402 of FIG. 4A. Consistent with the previous discussion, the ability to create and manage advertisement playlists may be limited to users 132 that have provided some indicia of compensation, or may be provided to all users 132. In the illustrations that follow, the advertising option comprises a user-editable advertisement playlist of a plurality of advertisements that may include a temporally ordered list of advertisements to be played in the listed temporal order. For example, the list may include an advertisement for the TOYOTA SIENNA, DOWNEY fabric softener, COCA-COLA ZERO, DENON audio products, and BRIDGESTONE tires, in that order, thus defining advertisements to be played and the order in which they are to be played.

The user 132 enters a selection of advertising options, and the user device 102 accepts the selection. In block 42, the selected advertisement option(s) are transmitted to the media program provider 110. In block 433, the media program provider 110 receives the selection of the advertising options, where they are stored as shown in block 438. The media program(s) and advertisement(s) are transmitted to the user device 102 according to the received advertising options, and the user device 102 receives the media program(s) and advertisement(s) and plays them according to the selected advertising option(s).

Advertisement options may refer only to advertisements that are to be played in conjunction with a particular media program, or may be advertising options that apply to advertisements that are to be played in conjunction with all media programs that are played on the user device 102 or for that individual user 132 (whether based on a media program playlist or media programs played independently from a media program playlist), including situations where the user logs off and logs back in.

For example, the user 132 may select a media program for playback and before or during the playback of the media program, the user 132 may be presented with options to define which advertisements will be presented with the media program and how they may be presented. Or, the user 132 may simply sign on to a user account to view media programs or advertisements in a playlist without having made a media program selection, and make selections describing which advertisements they want to view and how those advertisements may be presented.

In a specific example, the user 132 may define and manage a queue of advertisements (or a playlist) that are to be played with all media programs that are played for the user, as further described below. Or, the user 132 may specify if and when they would like to see long and short duration advertisements. In any case, the user 132 may be allowed to specify particular preferences that apply to the playback of all media programs to the user 132 until such time as the preferences are changed or the media program provider deems it necessary (based on business rules) to deliver advertising outside of these preferences. For example if the user chooses to receive advertisements only from one particular advertiser, that choice may be overridden if that advertiser no longer supplies advertisements to the media program provider 110.

In another embodiment, the advertising option in includes a choice between either a first advertisement or a second advertisement, or a plurality of choices may be offered for the user 132 to select a single advertisement.

For example, FIG. 19 is a diagram of a user interface presented to the user 132 on the user device 102 to present an option of choosing a first advertisement or a second advertisement. In this embodiment, the user 132 is presented with the option of viewing an advertisement for a PANASONIC camera or GEICO insurance. A representation 1902A (as illustrated, a thumbnail) of the first advertisement and a representation 1902B of the second advertisement may be presented, and the user 132 may select one of the advertisements by selecting the associated representation or other control (1904A, 1904B).

In embodiments wherein the user 132 is provided a choice between a plurality of advertisements, the advertisements can be presented organized by category. FIG. 14A is an example of a user interface offering the user 132 to make an advertisement choice organized by category (minivan, SUV, or sports sedan).

FIG. 20A is a diagram illustrating another embodiment in which the user is provided with a first set of advertisements that have been preselected for viewing with the media program. In the illustrated embodiment, a plurality of representations 2002A-2002C of advertisements that have been preselected for the user 132 are presented. These advertisements may be those that are preselected for viewing with a currently selected media program, the next media program in a media program playlist (also editable and managed by the user), or viewing with any media program. The user 132 can then select which of the advertisements the user 132 is interested in viewing by selecting the appropriate representation 2002A-2002C (alternatively, the user 132 may designate those advertisements that they are not interested in viewing, thereby selecting those that they are interested in viewing). In either case, those that remain to be played are illustrated, and candidate advertisements that will replace those that were not selected for viewing may be presented. For example, if the user selects the PANASONIC camera advertisement and GIBSON guitar advertisement by selecting representation 2002A and 2002C to be retained for playing, the resulting interface may simply replace the (unselected) GEICO insurance representation 2002B with a representation for another advertisement that the user 132 may be interested in.

Figure 20B:
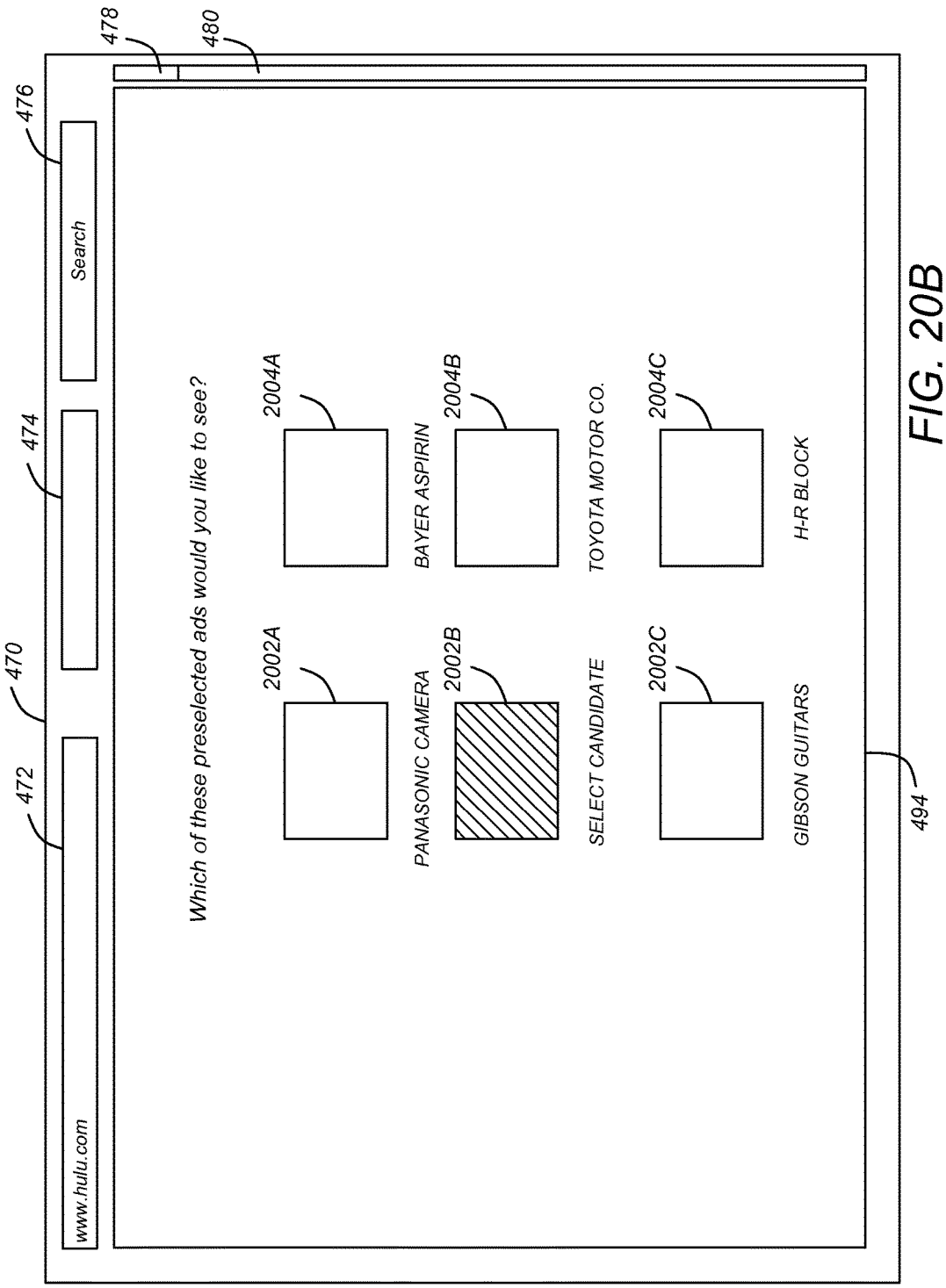

Alternatively, the user 132 may be presented with a set of candidate advertisements for replacing the unselected preselected advertisements, such as the representations 2004A-2004C shown in FIG. 20B. The user 132 may select the appropriate representation 2004 and drag it to the location formerly occupied by GEICO insurance, or simply select the candidate advertisement.

The initially presented preselected advertisements may be preselected by the user 132 or by the media program provider 110, with the preselection based upon data such as information regarding which advertisements previously presented to the user 132. For example, advertisements that have already been played may not be included among the preselected advertisements. Or, advertisements that have already been played a threshold number of times may not be included among the preselected advertisements. Or, advertisements that have already been played a threshold number of times may not be preselected until an amount of time has elapsed. Or, advertisements that have been played and that the user 132 has liked or not indicated a dislike may be preselected. In other embodiments, the preselected advertisements may be determined by advertising options previously selected by the user 132.

In one embodiment, the preselected advertisements are those which are to be played with a particular media program, and the user can select those advertisements that are desired. In other embodiments, the preselected advertisements represent a temporally ordered queue or playlist of advertisements that are to be shown with the currently selected (or queued) media program or with all future media programs to be played to the user (whether from a playlist or played one at a time without benefit of a playlist). This allows the user 132 to define and manage not only a playlist of media programs, but also a playlist of advertisements that are to be played with that playlist of media programs or media programs that are individually selected for playback. In embodiments wherein the preselected advertisements include a playlist, the preselected list of advertisements to be played may be ordered such that advertisements already played to the user 132 may be removed from the playlist (at least temporarily), or may be demoted to a lower temporal position in the playlist.

Figure 21A:
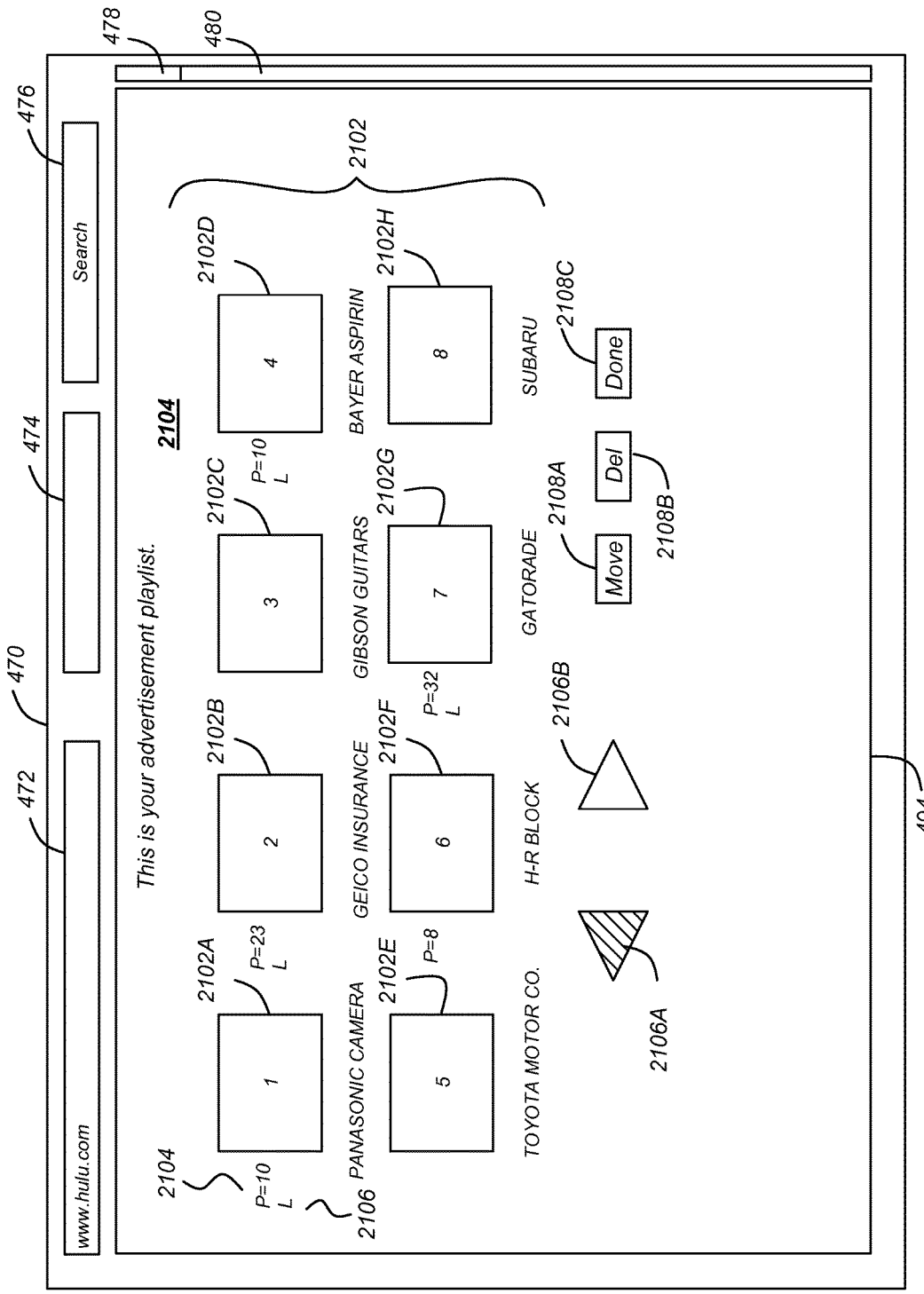
Figure 21B:
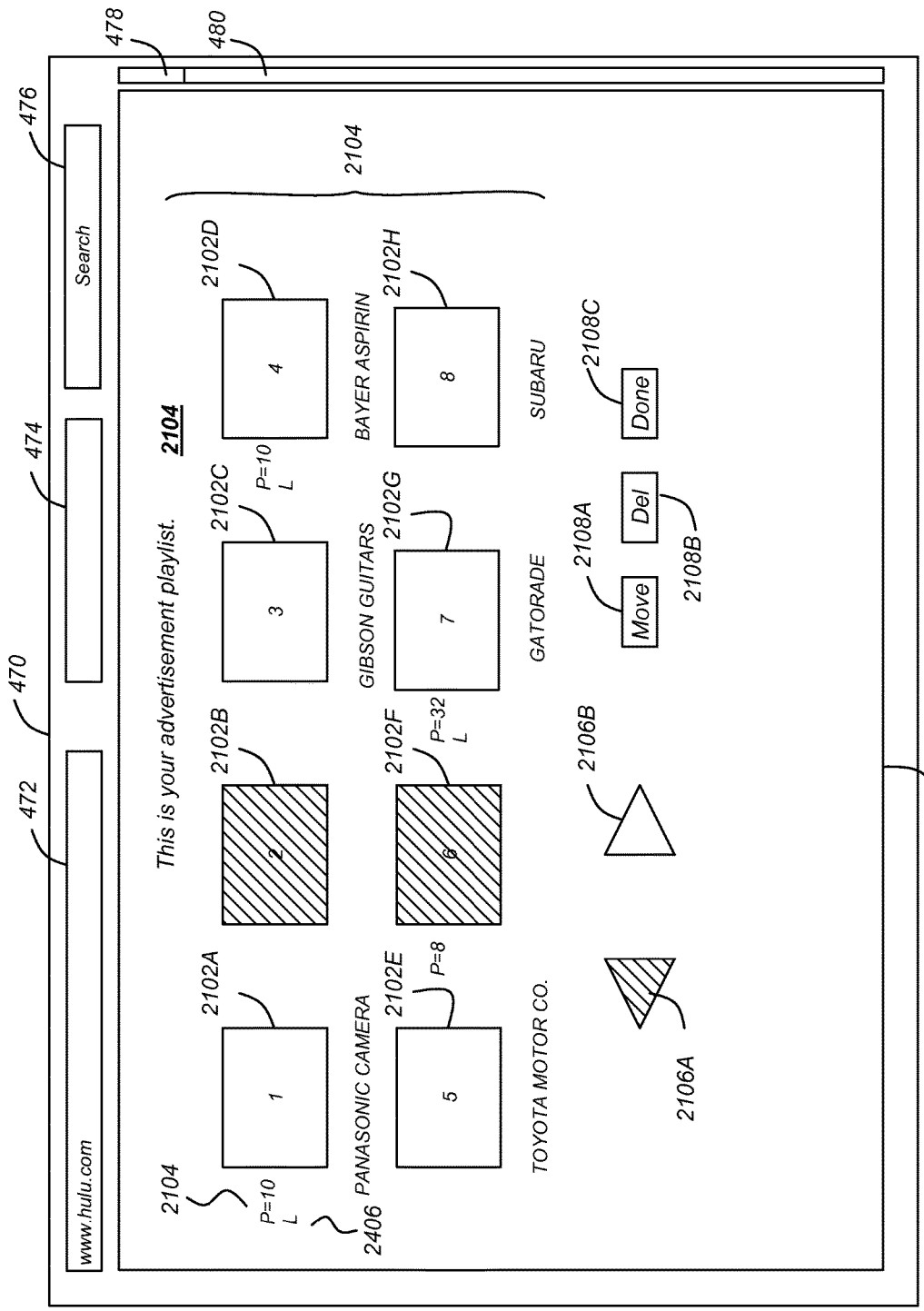

FIGS. 21A-FIG. 21C are diagrams presenting one embodiment of how a queue or playlist 2104 of advertisements can be presented and selected. As described above, the playlist 2104 may initially be preselected for the user 132 by the media program provider 110 by the user 132.

In one embodiment, the playlist 2104 excludes advertisements that have expired. Advertisements may expire because they should only be played for users 132 until a certain date and time (for example, an advertisement for an event will have expired after the event has taken place) or because of the agreed to playcount for the advertisement has been reached. For example, the advertiser may have contracted with the media program provider 110 for the playing of the advertisement N times, and after the advertisement has be played for a user N times (playcount=N), the advertisement expires. More specifically, with regard to the SUBARU advertisement indicated by representation 2102H in FIG. 21C, the SUBARU or it's agents may have entered an agreement with the media program provider 110 providing that $1000 will be paid for 1000 showings of the advertisement. After the advertisement has been shown 1000 times (considering all users), the playcount for the advertisement will have expired and the advertisement will be removed from the playlist.

In the embodiment illustrated in FIG. 21A, the representation 2102A-2102H of a first set 2104 of playlisted advertisements is presented in temporal order, with the PANASONIC camera advertisement (associated with representation 2102A) being queued to play first, and the SUBARU advertisement (associated with representation 2102H) being queued to replay last of the first set 2104 of advertisements. By selecting the representations associated with the advertisements, the user 132 may select and move the advertisements to a different order, or select the advertisement for replacement with another advertisement. The user 132 may also view other subsets of advertisements that are playlisted for playback after the SUBARU advertisement by selecting navigation control 2106B, and after doing so, can return to the illustrated interface by selecting navigation control 2106A (shaded in FIG. 21B to indicate the user 132 is at the top of the advertisement playlist).

The user 132 may edit the playlist 2104 to reorder the displayed advertisements by selecting and dragging the associated representation 2102 to the desired position in the playlist. For example, if the user 132 would like to see the SUBARU advertisement in the advertisement opportunity immediately following the opportunity in which the PANASONIC camera advertisement is currently scheduled to be shown, the user 132 may select the move control 2108A, then select representation 2104H and move it to a location between the PANASONIC camera representation 2102A and the GEICO insurance representation 2102B. When the user 132 has completed moving the SUBARU advertisement and any other advertisements into the desired order, the user 132 may indicate as such by selecting the done control 2108C.

Similarly, the user 132 may select advertisements that are to be removed from the playlist by selecting the representation 2102 associated with the advertisement(s) and selecting the delete control 2108B. Remaining advertisements have been selected to be retained in the advertisement playlist 2104 and will be retained. A second set of advertisements that are mutually exclusive from the first set (thus preventing duplication) may then be presented to the user 132 as candidates to replace the unretained advertisements in the playlist 2104. For example, if the user 132 is not interested in seeing the GEICO insurance advertisement and the H-R BLOCK advertisement, the user 132 may indicate as such by selecting representations 2102B and 2102F, and selecting the delete control 2108B. One embodiment of how the selected advertisements may be indicated is shown in FIG. 21B.

A second set of advertisements may then be presented to replace the advertisements that were unretained from the first set. Such replacements may be user-selected or selected by the media program provider 110. After a selection of one or more of the second set of advertisements is accepted, the playlist is updated to reflect these choices.

FIG. 21C is an illustration of one embodiment of how the second set of advertisements may be presented. Continuing with the example above, the GEICO insurance and H-R BLOCK advertisement representations (2102B and 2102F) may be removed after selection of the done control 2108C, resulting in the interface shown. In one embodiment, the slots vacated by the unretained advertisements are filled in with the advertisements that followed the last of the first set of advertisements (in the illustrated example, the SUBARU advertisement). For example, if the 9th and 10th advertisements in the playlist before editing were advertisements for STARBUCKS coffee and SCOTT bicycles, a representation of the STARBUCKS coffee advertisement may be placed at representation 2102B and a representation of the SCOTT bicycles advertisement may be placed at representation 2102F. Or, alternatively, the retained advertisements may each be shifted up in order, and the STARBUCKS coffee and SCOTT bicycles advertisements may be placed in positions 7 and 8, respectively. Alternatively, the user 132 may select another advertisement that is not currently in the playlist using an interface such as the interface shown in FIG. 14A, 14B, 15, 19, 20A or 20B (where the advertisement may be selected by category, product, or brand, or by random selection). The appropriate user interface elements from FIG. 14A, 14B, 15, 19, 20A or 20B may be accessed by selection of a suitable control in FIG. 21B (thus closing the interface shown in FIG. 21B and opening an interface like shown in FIG. 14A, 14B, 15, 19, 20A or 20B, or can be placed within the FIG. 21B interface in region 2110.

A first subset of the advertisements may be played with a first media program (for example, the advertisements associated with representations 2102A-2102H), then a second subset (for example the advertisements that temporally follow the first subset, viewable by selecting control 2106B) may be played with the next media program in the order indicated.

Further, the playlist 2104 may include an indication that the advertisement has already been played to the user 132 before, and perhaps the number of times the advertisement has been played 2104. If the user 132 has indicated that they liked the advertisement after a previous playing, that may also be indicated 2106 in the playlist proximate the representation of the advertisement.

The above-described interface may be shown at any time, by user 132 command. For example, after the user 132 may communicate login information to the media program provider 100, and be presented with a control that presents the advertising playlist management interface such as shown in FIG. 18A or 21A-21C. Also, the advertisement playlist management interface may be presented automatically when the user selects a media program for playing, illustrating the advertisements on the playlist that are scheduled for playback with the media program. The advertisement playlist may also be presented in response to a user 132 selection of a control presented during playback of a media program or an advertisement.

The advertisement playlist management interface may also be presented in conjunction with a media program playlist management interface, so that the playing of the advertisements and media programs can be managed and controlled together. For example, the media program playlist may be presented on a first portion of a display or window, and the advertisement playlist presented on a second portion of the same display or window, so that one can be viewed and/or edited while the other is viewed and/or edited. Alternatively, a single playlist having both media programs and advertisements may be presented, with media programs and advertisements being played in the order indicated on by the single playlist. For example, the list may designate the playback of media program A, followed by media program B, with advertisements 1, 2, and 3 being played in conjunction with media program A in the indicated order, and advertisements 4 and 5 being played in conjunction with media program B.

Finally, the playlist may be displayed and/or edited during an advertising opportunity disposed within the media program, allowing the user to play a first portion of the media program before the advertisement opportunity, edit the advertisement playlist during the advertisement opportunity (for example, via an interrupt command), and continue by playing a second portion of the media program temporally following the first portion.

It is noted that the foregoing techniques actively involve the user in the selection of the advertisements that they desire to view as a part of their viewing experience. This user input can be used to select further advertisements or further advertisement options/candidates to the user. Since the user has made active choices regarding which advertisements they wish to see and which they do not, this input is more directly relevant to determine which advertisements the user would like to see during presentation of a media program than other data that might be collected.

Saving Advertisements

In one embodiment, the user 132 can not only select advertisements to be played during advertising opportunities 422, but also select advertisements 424 to be saved or indexed for later replay at a time convenient and desirable to the user 132. This embodiment recognizes that the user 132 will view advertisements that are relevant to possible future purchases, which may be relevant to friends of the user 132, or which are simply enjoyable to watch. The ability to locally or remotely store or index such advertisements 424 allows the user 132 to save an advertisement 424 of interest for later viewing and additional consideration, or to forward it to another user. The user 132 may designate an advertisement as one to be saved by mousing over and selecting the advertisement 424 while it is playing, thus opening an interface whereby the advertisement itself or an index to it may be locally or remotely saved. Alternatively or in addition, the media program player 304 may include a "save" or "save advertisement" control that can be selected to save the advertisement. Also alternatively or in addition, the media program player 304, upon completing playback of the advertisement, may present an interface giving the user 132 a yes/no question as to whether they would like to save the advertisement. In any of such cases, a further interface may be presented which allows the user to define where the advertisement is to be saved.

It is noted that the foregoing techniques actively involve the user in the selection of the advertisements that they desire to view as a part of their viewing experience. This user input can be used to select further advertisements or further advertisement options/candidates to the user. Since the user has made active choices regarding which advertisements they wish to see and which they do not, this input is more directly relevant to determine which advertisements the user would like to see during presentation of a media program than other data that might be collected.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
displaying, by a computing device, an interface for playback of a media program that includes a set of ad slots, the interface including a progress bar and a progress slider that shows a current location of playback of the media program;
displaying, by the computing device, a set of indicators for the set of ad slots indicating pre-set locations of the set of ad slots within the media program, the set of indicators associated with the progress bar of the interface and indicating a transition from the playback of the media program to playback of an advertisement;
accepting, by the computing device, a command in the interface from a user to move an indicator in the set of indicators from a pre-set location associated with the progress bar to a user defined location associated with the progress bar, wherein the pre-set location corresponds to a first temporal location within the media program;
moving, by the computing device, the indicator on the interface to indicate a different location associated with the interface from the pre-set location, the different location determined based on the user defined location, wherein a respective ad slot for the indicator is moved from the first temporal location within the media program to a second temporal location within the media program that corresponds to the different location; and
when the progress slider moves to reach the indicator in the different location on the progress bar, transitioning, by the computing device, from playing the media program to playing an advertisement on the interface during the ad slot at the second temporal location within the media program.

2. The method of claim 1, wherein
the different location is the same as the user defined location.

3. The method of claim 1, further comprising:
moving the user defined location to the different location on the progress bar, the different location being different from the pre-set location and the user defined location.

4. The method of claim 3, wherein the different location is determined based on characteristics of the media program.

5. The method of claim 1, further comprising:
playing the media program, wherein the progress slider moves along the progress bar as playback of the media program proceeds, wherein movement of the progress slider does not move the set of indicators.

6. The method of claim 1, wherein accepting the command comprises:
accepting a selection of the indicator on the interface; and
accepting a movement of the indicator on the interface.

7. The method of claim 1, further comprising:
transmitting information for the moving of the indicator on the progress bar based on the user defined location to a server, wherein the server is configured to change the ad slot from the first temporal location to the second temporal location within the media program based on the user defined location.

8. The method of claim 1, further comprising:
receiving the advertisement from a server during the ad slot at the second temporal location within the media program.

9. A method comprising:
causing, by a computing device, display of an interface for playback of a media program including a set of ad slots on a user device, the interface including a progress bar and a progress slider that shows a current location of playback of the media program;

causing, by the computing device, display of a set of indicators for the set of ad slots indicating pre-set locations of the set of ad slots within the media program, the set of indicators associated with the progress bar of the interface and indicating a transition from the playback of the media program to playback of an advertisement;

receiving, by the computing device, information for a command in the interface from a user to move an indicator in the set of indicators from a pre-set location associated with the progress bar to a user defined location associated with the progress bar, wherein the pre-set location corresponds to a first temporal location within the media program, wherein the indicator is moved on the interface to indicate a different location associated with the interface from the pre-set location, the different location determined based on the user defined location, and wherein a respective ad slot for the indicator is moved from the first temporal location within the media program to a second temporal location within the media program that corresponds to the different location;

changing, by the computing device, the ad slot in the media program based on the second temporal location, wherein when the progress slider moves to reach the indicator in the different location on the progress bar, a transition from sending the media program to sending an advertisement during the ad slot is caused.

10. The method of claim 9, wherein
the different location is different from the pre-set location and the user defined location.

11. The method of claim 10, wherein the different location is determined based on characteristics of the media program.

12. The method of claim 9, further comprising:
causing playing of the media program, wherein the progress slider moves along the progress bar as playback of the media program proceeds, wherein movement of the progress slider does not move the set of indicators.

13. The method of claim 9, wherein receiving information for the command comprises:
receiving information for a selection of the indicator on the interface; and
receiving information for a movement of the indicator on the interface.

14. The method of claim 9, further comprising:
sending the media program to the user device;
determining when the playing of the media program reaches the ad slot at the second temporal location in the media program associated with the moved indicator; and
when the ad slot is reached, sending an advertisement during the ad slot to the interface.

15. The method of claim 9, further comprising:
sending information for the changing of the ad slot in the media program based on the second temporal location to an ad server configured to send the advertisement.

16. An apparatus comprising:
one or more computer processors; and
a non-transitory computer-readable storage medium comprising instructions, that when executed, control the one or more computer processors to be configured for:
displaying an interface for playback of a media program that includes a set of ad slots, the interface including a progress bar and a progress slider that shows a current location of playback of the media program;
displaying a set of indicators for the set of ad slots indicating pre-set locations of the set of ad slots within the media program, the set of indicators associated with the progress bar of the interface and indicating a transition from the playback of the media program to playback of an advertisement;
accepting a command in the interface from a user to move an indicator in the set of indicators from a pre-set location associated with the progress bar to a user defined location associated with the progress bar, wherein the pre-set location corresponds to a first temporal location within the media program;
moving the indicator on the interface to indicate a different location associated with the interface from the pre-set location, the different location determined based on the user defined location, wherein a respective ad slot for the indicator is moved from the first temporal location within the media program to a second temporal location within the media program that corresponds to the different location; and
when the progress slider moves to reach the indicator in the different location on the progress bar, transitioning from playing the media program to playing an advertisement on the interface during the ad slot at the second temporal location within the media program.

17. The apparatus of claim 16, wherein
the different location is the same as the user defined location.

18. The apparatus of claim 16, further comprising:
moving the user defined location to the different location, the different location being different from the pre-set location and the user defined location.

19. The apparatus of claim 16, further comprising:
playing the media program, wherein the progress slider moves along the progress bar as playback of the media program proceeds, wherein movement of the progress slider does not move the set of indicators.

20. The apparatus of claim 16, further comprising:
transmitting information for the moving of the indicator on the progress bar based on the user defined location to a server, wherein the server is configured to change the ad slot from the first temporal location to the second temporal location within the media program based on the user defined location.

21. The apparatus of claim 16, further comprising:
receiving the advertisement from a server during the ad slot at the second temporal location within the media program.

* * * * *